(12) United States Patent
Elshafie et al.

(10) Patent No.: US 11,831,375 B2
(45) Date of Patent: Nov. 28, 2023

(54) SUB-BAND CHANNEL STATE INFORMATION REPORTING FOR ULTRA-RELIABLE LOW LATENCY COMMUNICATIONS

(71) Applicant: QUALCOMM Incorporated, San Diego, CA (US)

(72) Inventors: Ahmed Elshafie, San Diego, CA (US); Yi Huang, San Diego, CA (US); Wei Yang, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/148,486

(22) Filed: Jan. 13, 2021

(65) Prior Publication Data

US 2022/0224387 A1    Jul. 14, 2022

(51) Int. Cl.
*H04B 7/06* (2006.01)
*H04L 1/00* (2006.01)
(Continued)

(52) U.S. Cl.
CPC ......... *H04B 7/0626* (2013.01); *H04B 7/0632* (2013.01); *H04L 1/0003* (2013.01);
(Continued)

(58) Field of Classification Search
CPC ... H04B 7/0626; H04B 7/0632; H04L 1/0003; H04L 1/0026; H04L 5/0055; H04W 72/042
See application file for complete search history.

(56) References Cited

U.S. PATENT DOCUMENTS

2015/0016288 A1 * 1/2015 Maattanen ............... H04L 1/003
370/252
2015/0163039 A1 * 6/2015 Davydov ............... H04W 72/23
370/329
(Continued)

FOREIGN PATENT DOCUMENTS

WO    WO-2018064313 A1 *  4/2018    ........... H04L 27/261
WO    WO-2021086499 A1 *  5/2021    ........... H04L 1/0026
WO    WO-2021163162 A1 *  8/2021    ........... H04L 1/0026

OTHER PUBLICATIONS

Huawei, HiSilicon, 3GPP TSG RAN WG1 Meeting #102-e R1-2005244; Aug. 17-28, 2020 hereinafter 3GPP. (Year: 2020).*
(Continued)

*Primary Examiner* — Charles C Jiang
*Assistant Examiner* — Shawn D Miller
(74) *Attorney, Agent, or Firm* — Loza & Loza, LLP

(57) ABSTRACT

Aspects relate to mechanisms for wireless communication devices to report sub-band (SB) channel state information (SB-CSI). A UE receives a physical downlink shared channel (PDSCH) transmission from a base station. The UE transmits either an acknowledgement (ACK) transmission or a negative acknowledgement (NACK) transmission to the base station in response to a reception of the PDSCH transmission. The UE determines whether to transmit a sub-band (SB) channel state information (SB-CSI) report to the base station based on whether the ACK transmission is transmitted to the base station or whether the NACK transmission is transmitted to the base station.

20 Claims, 37 Drawing Sheets

(51) Int. Cl.
H04L 5/00 (2006.01)
H04W 72/23 (2023.01)

(52) U.S. Cl.
CPC .......... H04L 1/0026 (2013.01); H04L 5/0055 (2013.01); H04W 72/23 (2023.01)

(56) References Cited

U.S. PATENT DOCUMENTS

| | | | | |
|---|---|---|---|---|
| 2016/0142176 | A1* | 5/2016 | Gao | H04L 1/1621 370/252 |
| 2017/0353976 | A1* | 12/2017 | Yerramalli | H04W 74/004 |
| 2019/0239216 | A1 | 8/2019 | Kundu et al. | |
| 2019/0349121 | A1* | 11/2019 | Tian | H04L 1/1671 |
| 2020/0235797 | A1* | 7/2020 | Kim | H04W 72/085 |
| 2021/0045105 | A1* | 2/2021 | Yoon | H04L 5/0055 |

OTHER PUBLICATIONS

Huawei., et al., "CSI Feedback Enhancements", 3GPP Draft, 3GPP TSG RAN WG1 Meeting #102-e, R1-2005244, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 8, 2020 (Aug. 8, 2020), XP051917292, 4 Pages, Retrieved from the Internet: URL: https://ftp.3gpp.org/tsg_ran/WG1_RL1/TSGR1_102-e/Docs/R1-2005244.zip. R1-2005244.docx [Retrieved on Aug. 8, 2020], Section 2 "A-CSI on PUCCH triggered by DL DCI" and Section 3 "Enhanced CSI feedback mode", Sections 2 and 3.

International Search Report and Written Opinion—PCT/US2022/011482—ISA/EPO—Apr. 21, 2022.

Nokia., et al., "On UCI Enhancements for URLLC," 3GPP Draft, 3GPP TSG RAN WG1 Ah Hoc Meeting 1901, R1-1900928 EURLLC UCI ENH, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 20, 2019 (Jan. 20, 2019), XP051593772, 13 Pages, Retrieved from the Internet: URL: https://www.3gpp.org/ftp/TSG_RAN/WG1_RL1/TSGR1_AH/NR_AH_1901/Docs/R1-1900928.zip, [retrieved on Jan. 20, 2019] paragraph [02.1], Section 4.

ZTE: "Discussion on CSI Feedback Enhancements for eURLLC", 3GPP TSG RAN WG1 #102-e, 3GPP Draft, R1-2005432, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), pp. 1-6, XP051917457, Retrieved from the Internet: URL: https://ftp.3gpp.org/tsg_ran/WG1_RL1/TSGR1_102-e/Docs/R1-2005432.zip, R1-2005432 Discussion on CSI feedback enhancements for eURLLC.docx, [retrieved on Aug. 8, 2020], Sections 2.1 and 2.2.

ZTE., et al., "URLLC PHY Enhancements", 3GPP Draft, 3GPP TSG RAN WG1 Meeting #94, R1-1808211, URLLC PHY Enhancements, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051515596, 10 Pages, Retrieved from the Internet: URL: http://www.3gpp.org/ftp/tsg%5Fran/WG1%5FRL1/TSGR1%5F94/Docs/R1%2D1808211%2Ezip. [Retrieved on Aug. 11, 2018] The Whole Document, Section 4.4.

* cited by examiner

4-BIT CQI TABLE

| CQI Index | Modulation | Code Rate x 1024 | Efficiency |
|---|---|---|---|
| 0 | | Out of Range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 8

Mapping Spatial Differential CQI Values to Offset Levels

| Spatial Differential CQI Value | Offset Level |
|---|---|
| 0 | 0 |
| 1 | 1 |
| 2 | 2 |
| 3 | ≥3 |
| 4 | ≤-4 |
| 5 | -3 |
| 6 | -2 |
| 7 | -1 |

FIG. 9

| BITS VALUE | Representation |
|---|---|
| 00 | NACK with reporting configured report |
| 01 | NACK with reporting SB CQI with full resolution |
| 10 | ACK |

FIG. 10

| BITS VALUE | Representation |
|---|---|
| 100 | NACK with reporting SB CQI with full resolution and SB RI |
| 101 | NACK with reporting SB CQI with full resolution and WB RI |
| 110 | NACK with reporting configured report |
| 111 | ACK |

| BITS VALUE | Representation |
|---|---|
| 0 | NACK |
| 1 | ACK |

| BITS VALUE | Representation |
|---|---|
| 00 | Use configured report |
| 01 | Report SB CQI with full resolution and WB RI |
| 11 | Report SB CQI with full resolution and SB RI |

1352, 1354

SUB-BAND CHANNEL STATE INFORMATION REPORTING FOR ULTRA-RELIABLE LOW LATENCY COMMUNICATIONS

TECHNICAL FIELD

The technology discussed below relates generally to wireless communication systems, and more particularly, to sub-band (SB) channel state information (SB-CSI) reporting, for example, for ultra-reliable low latency communications (URLLC).

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

For ultra-reliable low latency communications (URLLCs) applications reliability may be crucial. Generally, data is transmitted from a base station and delivered to a user equipment (UE) within two transmissions. The specified block error rate (BLER) for these data transmissions is $10^{-5}$ which provides for a narrow margin particularly when interference exists. Interference may be a challenge for enabling URLLC applications while maintaining a specified quality of service.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method of wireless communication operable at a user equipment (UE) is provided. The method includes receiving a physical downlink shared channel (PDSCH) transmission from a base station. The method also includes transmitting either an acknowledgement (ACK) transmission or a negative acknowledgement (NACK) transmission to the base station in response to a reception of the PDSCH transmission. The method further includes determining whether to transmit a sub-band (SB) channel state information (SB-CSI) report to the base station based on whether the ACK transmission is transmitted to the base station or whether the NACK transmission is transmitted to the base station.

In some aspects, transmitting either the ACK transmission or the NACK transmission to the base station in response to the reception of the PDSCH transmission may include transmitting either the ACK transmission or the NACK transmission to the base station based on an ability of the UE to decode the PDSCH transmission. In some aspects, the method may further include receiving downlink control information (DCI) associated with the PDSCH transmission, where the DCI indicates a first modulation coding scheme (MCS) value associated the PDSCH transmission, configuring the reception of the DCI for receiving the PDSCH transmission, and measuring a second MCS value associated with the received PDSCH transmission. In some aspects, transmitting either the ACK transmission or the NACK transmission to the base station in response to the reception of the PDSCH transmission may include transmitting either the ACK transmission or the NACK transmission to the base station based on a threshold difference between the first MCS value and the second MCS value.

In some aspects, the method may further include transmitting the SB-CSI report to the base station when the ACK transmission is transmitted to the base station, and transmitting the SB-CSI report to the base station when the NACK transmission is transmitted to the base station. In some aspects, the method may further include transmitting the SB-CSI report to the base station when the NACK transmission is transmitted to the base station, or abstaining from transmitting the SB-CSI report when the ACK transmission is transmitted to the base station. In some aspects, when determining to transmit the SB-CSI report to the base station, the method may further include determining to include with the SB-CSI report SB reporting with full resolution, where the SB reporting with full resolution indicates one or more channel quality information (CQI) values each associated with a sub-band of a plurality of sub-bands utilized by the PDSCH transmission, or determining to include with the SB-CSI report SB reporting without full resolution, wherein SB reporting without full resolution indicates one or more spatial differential CQI values each associated with an offset level, and where the offset level includes a difference between a CQI value associated with a sub-band of the plurality of sub-bands utilized by the PDSCH transmission and an average CQI value associated with the plurality of sub-bands utilized by the PDSCH transmission. In some aspects, the one or more CQI values may include at least one of a CQI index, a modulation scheme, a code rate, or an efficiency.

In some aspects, determining to include with the SB-CSI report SB reporting with full resolution or determining to include with the SB-CSI report SB reporting without full-resolution is based on at least a quality of a decoding of the PDSCH transmission. In some aspect, the method may further include receiving a control message from the base station indicating whether to include with the SB-CSI report the SB reporting with full resolution or the SB reporting without full resolution. In some aspects, determining whether to include with the SB-CSI report the SB reporting with full resolution or the SB reporting without full resolution is based at least on the control message. In some aspects, the control message may include at least one of a radio resource control (RRC) message, a medium access control (MAC) control element (MAC-CE), or a downlink control information (DCI).

In some aspects, when determining to include with the SB-CSI report the SB reporting with full resolution, the method may further include determining whether to include a rank indication per sub-band with the SB reporting with full resolution, where the rank indication per sub-band indicates a quantity of sub-bands utilized by the PDSCH transmission that are able to be supported by the UE. In some aspects, at least one of the ACK transmission or the NACK transmission may include an indication that the rank indication is to be included with the SB reporting with full resolution. In some aspects, the method may further include receiving downlink control information (DCI) associated with the PDSCH transmission, where the DCI indicates a first modulation coding scheme (MCS) value associated with the PDSCH transmission, configuring the reception of the DCI for receiving the PDSCH transmission, and measuring a second MCS value associated with the received PDSCH transmission. In some aspects, determining whether to include the rank indication per sub-band with the SB reporting with full resolution is based on a threshold difference between the first MCS value and the second MCS value.

A method of wireless communication operable at a base station is provided. The method includes transmitting a physical downlink shared channel (PDSCH) transmission to a user equipment (UE). The method also includes receiving either an acknowledgement (ACK) transmission or a negative acknowledgement (NACK) transmission from the UE in response to the transmission of the PDSCH transmission. The method further includes receiving a sub-band (SB) channel state information (SB-CSI) report from the UE based on whether the ACK transmission is transmitted by the UE or the NACK transmission is transmitted by the UE.

In some aspects, receiving either the ACK transmission or the NACK transmission from the UE in response to the transmission of the PDSCH transmission may include receiving either the ACK transmission or the NACK transmission from the UE based on an ability of the UE to decode the PDSCH transmission. In some aspects, the method may further include transmitting downlink control information (DCI) associated with the PDSCH transmission, where the DCI indicates a first modulation coding scheme (MCS) value associated with the PDSCH transmission. In some aspects, receiving either the ACK transmission or the NACK transmission from the UE in response to the transmission of the PDSCH transmission may include receiving either the ACK transmission or the NACK transmission from the UE based on a threshold difference between the first MCS value and a second measured MCS value associated with the PDSCH transmission.

In some aspects, the method may further include receiving the SB-CSI report from the UE when the ACK transmission is received from the UE, and receiving the SB-CSI report from the UE when the NACK transmission is received from the UE. In some aspects, the method may further include receiving the SB-CSI report from the UE when the NACK transmission is received from the UE, or determining that the SB-CSI report is not received from the UE when the ACK transmission is received from the UE. In some aspects, when receiving the SB-CSI report from the UE, at least one of the ACK transmission or the NACK transmission may include an indication that the SB-CSI report is to be received from the UE. In some aspects, the SB-CSI report may include one of SB reporting with full resolution, where the SB reporting with full resolution indicates one or more channel quality information (CQI) values each associated with a sub-band of a plurality of sub-bands utilized by the PDSCH transmission or SB reporting without full resolution, where the SB reporting without full resolution indicates one or more spatial differential CQI values each associated with an offset level, and where the offset level comprises a difference between a CQI value associated with a sub-band of the plurality of sub-bands utilized by the PDSCH transmission and an average CQI value associated with the plurality of sub-bands utilized by the PDSCH transmission. In some aspects, the one or more CQI values may include at least one of a CQI index, a modulation scheme, a code rate, or an efficiency.

In some aspects, the SB-CSI report may include either the SB reporting with full resolution or the SB reporting without full resolution based on at least a quality of a decoding of the PDSCH transmission by the UE. In some aspects, the method may include transmitting a control message to the UE indicating whether the UE is to transmit the SB-CSI report with the SB reporting with full resolution or the SB reporting without full resolution. In some aspects, receiving the SB-CSI report with the SB reporting with full resolution or the SB-CSI report with the SB reporting without full resolution is based on at least the control message. In some aspects, the control message may include at least one of a radio resource control (RRC) message, a medium access control (MAC) control element (MAC-CE), or a downlink control information (DCI).

In some aspects, the SB reporting with full resolution may include a rank indication per sub-band indicating a quantity of sub-bands utilized by the PDSCH transmission that are able to be supported by the UE. In some aspects, when the SB reporting with full resolution includes the rank indication per sub-band, at least one of the ACK transmission or the NACK transmission may include an indication that the rank indication is to be included with the SB reporting with full resolution. In some aspects, the method may include transmitting downlink control information (DCI) associated with the PDSCH transmission, wherein the DCI includes a first modulation coding scheme (MCS) value associated with the PDSCH transmission. In some aspects, the SB reporting with full resolution may include the rank indication per sub-band based on a threshold difference between the first MCS value and a second measured MCS value associated with the PDSCH transmission.

A user equipment (UE) in a wireless communication system is provided. The UE includes a wireless transceiver. The UE also includes a memory. The UE further includes a processor communicatively coupled to the wireless transceiver and the memory. The processor and the memory are configured to receive a physical downlink shared channel (PDSCH) transmission from a base station. The processor and the memory are also configured to transmit either an acknowledgement (ACK) transmission or a negative acknowledgement (NACK) transmission to the base station in response to a reception of the PDSCH transmission. The processor and the memory are further configured to determine whether to transmit a sub-band (SB) channel state information (SB-CSI) report to the base station based on whether the ACK transmission is transmitted to the base station or whether the NACK transmission is transmitted to the base station.

A base station in a wireless communication system is provided. The base station includes a wireless transceiver. The base station also includes a memory. The base station further includes a processor communicatively coupled to the wireless transceiver and the memory. The processor and the memory are configured to transmit a physical downlink shared channel (PDSCH) transmission to a user equipment (UE). The processor and the memory are also configured to receive either an acknowledgement (ACK) transmission or a negative acknowledgement (NACK) transmission from the UE in response to the transmission of the PDSCH transmission. The processor and the memory are further configured to receive a sub-band (SB) channel state information (SB-CSI) report from the UE based on whether the ACK transmission is transmitted by the UE or the NACK transmission is transmitted by the UE.

A non-transitory, processor-readable storage medium of a user equipment (UE) having instructions stored thereon is provided. The instructions, when executed by a processing circuit, cause the processing circuit to receive a physical downlink shared channel (PDSCH) transmission from a base station. The instructions, when executed by the processing circuit, also cause the processing circuit to transmit either an acknowledgement (ACK) transmission or a negative acknowledgement (NACK) transmission to the base station in response to a reception of the PDSCH transmission. The instructions, when executed by the processing circuit, further cause the processing circuit to determine whether to transmit a sub-band (SB) channel state information (SB-CSI) report to the base station based on whether the ACK transmission is transmitted to the base station or whether the NACK transmission is transmitted to the base station.

A non-transitory, processor-readable storage medium of a base station having instructions stored thereon is provided. The instructions, when executed by a processing circuit, cause the processing circuit to transmit a physical downlink shared channel (PDSCH) transmission to a user equipment (UE). The instructions, when executed by the processing circuit, also cause the processing circuit to receive either an acknowledgement (ACK) transmission or a negative acknowledgement (NACK) transmission from the UE in response to the transmission of the PDSCH transmission. The instructions, when executed by the processing circuit, further cause the processing circuit to receive a sub-band (SB) channel state information (SB-CSI) report from the UE based on whether the ACK transmission is transmitted by the UE or the NACK transmission is transmitted by the UE.

A user equipment (UE) is provided. The UE includes a means for receiving a physical downlink shared channel (PDSCH) transmission from a base station. The UE also includes a means for transmitting either an acknowledgement (ACK) transmission or a negative acknowledgement (NACK) transmission to the base station in response to a reception of the PDSCH transmission. The UE further includes a means for determining whether to transmit a sub-band (SB) channel state information (SB-CSI) report to the base station based on whether the ACK transmission is transmitted to the base station or whether the NACK transmission is transmitted to the base station.

A base station is provided. The base station includes a means for transmitting a physical downlink shared channel (PDSCH) transmission to a user equipment (UE). The base station also includes a means for receiving either an acknowledgement (ACK) transmission or a negative acknowledgement (NACK) transmission from the UE in response to the transmission of the PDSCH transmission. The base station further includes a means for receiving a sub-band (SB) channel state information (SB-CSI) report from the UE based on whether the ACK transmission is transmitted by the UE or the NACK transmission is transmitted by the UE.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 is an illustration of a 4-bit channel quality indicator (CQI) table according to some aspects.

FIG. 9 is an illustrating of a table mapping spatial differential CQI values to offset level according to some aspects.

FIG. 10 is an illustration of a first example table correlating bits values with acknowledgement (ACK) transmission and negative acknowledgement (NACK) transmission types according to some aspects.

FIG. 12 is an illustration of a third example table correlating bits values with acknowledgement (ACK) transmission and negative acknowledgement (NACK) transmission types according to some aspects.

FIG. 13A is an illustration of a fourth example table correlating bits values with acknowledgement (ACK) transmission and negative acknowledgement (NACK) transmission types according to some aspects.

FIG. 13B is an illustration of a fifth example table correlating bit value with transmission types according to some aspects.

DETAILED DESCRIPTION

Figure 1:
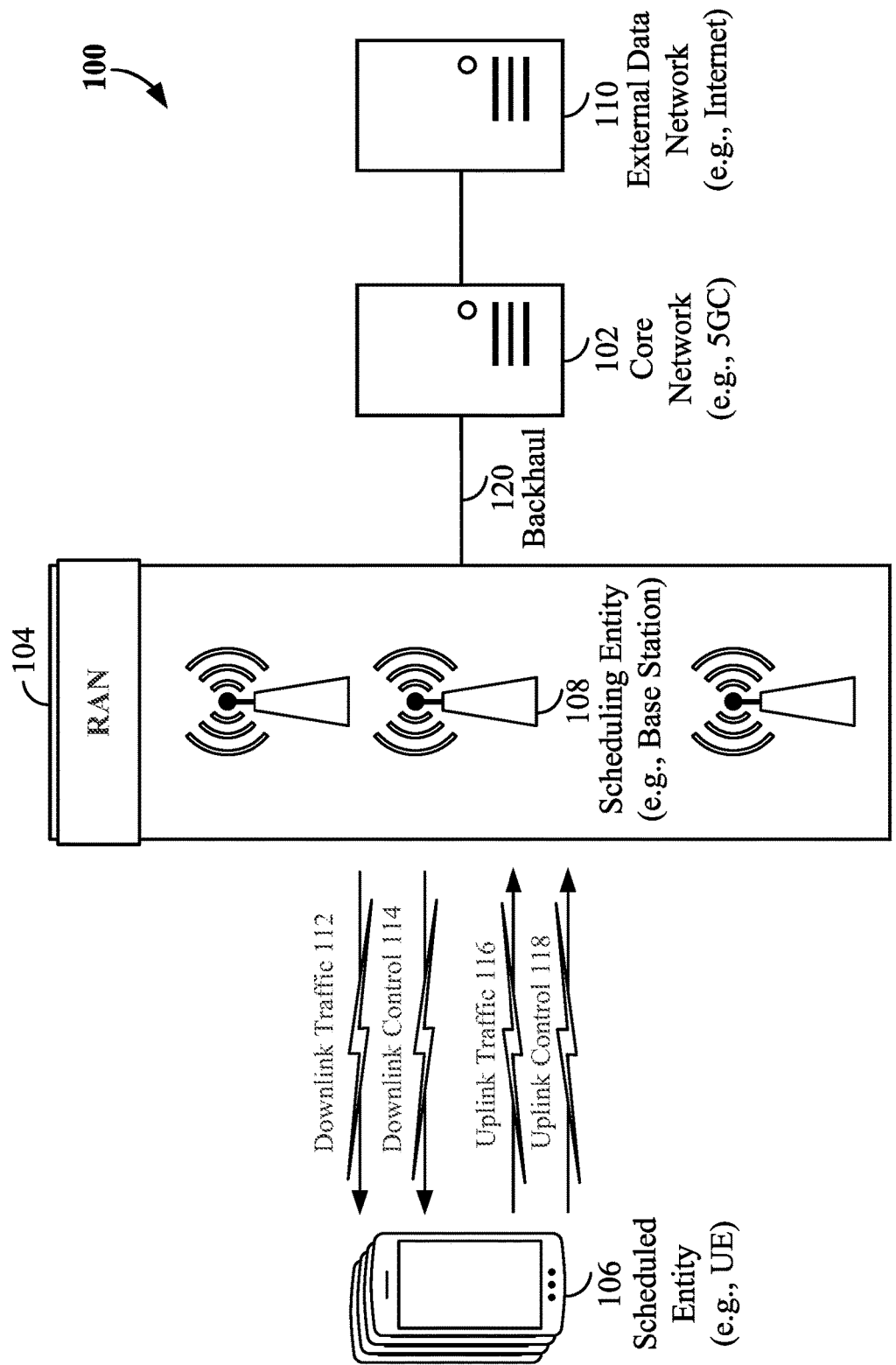
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

For ultra-reliable low latency communications (URLLCs) reliability is crucial. Generally, data is transmitted from a base station and delivered to a user equipment (UE) within two transmissions. The specified block error rate (BLER) for these data transmissions is $10^{-5}$ which provides for a narrow margin particularly when interference exists. Interference is a challenge for enabling URLLC applications while maintaining a specified quality of service.

In some aspects, a user equipment (UE) may always transmit a report with differential channel quality information (CQI) of sub-bands with high resolution to a base station. In some cases, this may be referred to as a SB-CSI report with full resolution. A report with differential CQI of sub-bands with high resolution may include one or more CQI values each associated with a sub-band of a plurality of sub-bands utilized by a physical downlink shared channel (PDSCH) transmission. However, an SB-CSI report with full resolution can occupy a relatively large amount of payload and provide the base station with unnecessary information, for example, when the UE transmits an ACK transmission indicating relatively low interference or an ability of the UE to at least partially decode the PDSCH transmission.

In some aspects, a user equipment (UE) may transmit a report with one or more spatial differential CQI values each associated with an offset level, where the offset level includes a difference between a CQI value associated with a sub-band of the plurality of sub-bands utilized by the PDSCH transmission and an average CQI value associated with the plurality of sub-bands utilized by the PDSCH transmission. In some cases, this may be referred to as an SB-CSI report without full resolution. A UE may transmit to a base station an SB-CSI report without full resolution to a base station because such a report may occupy a relatively small amount of payload. However, such a report may not provide the base station with all the necessary information (e.g., relatively low resolution) to update a PDSCH transmission when the UE transmits a NACK transmission indicating relatively high interference or an inability of the UE to at least partially decode the PDSCH transmission.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108 (e.g., a RAN entity, RAN node, or the like). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), aNode B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
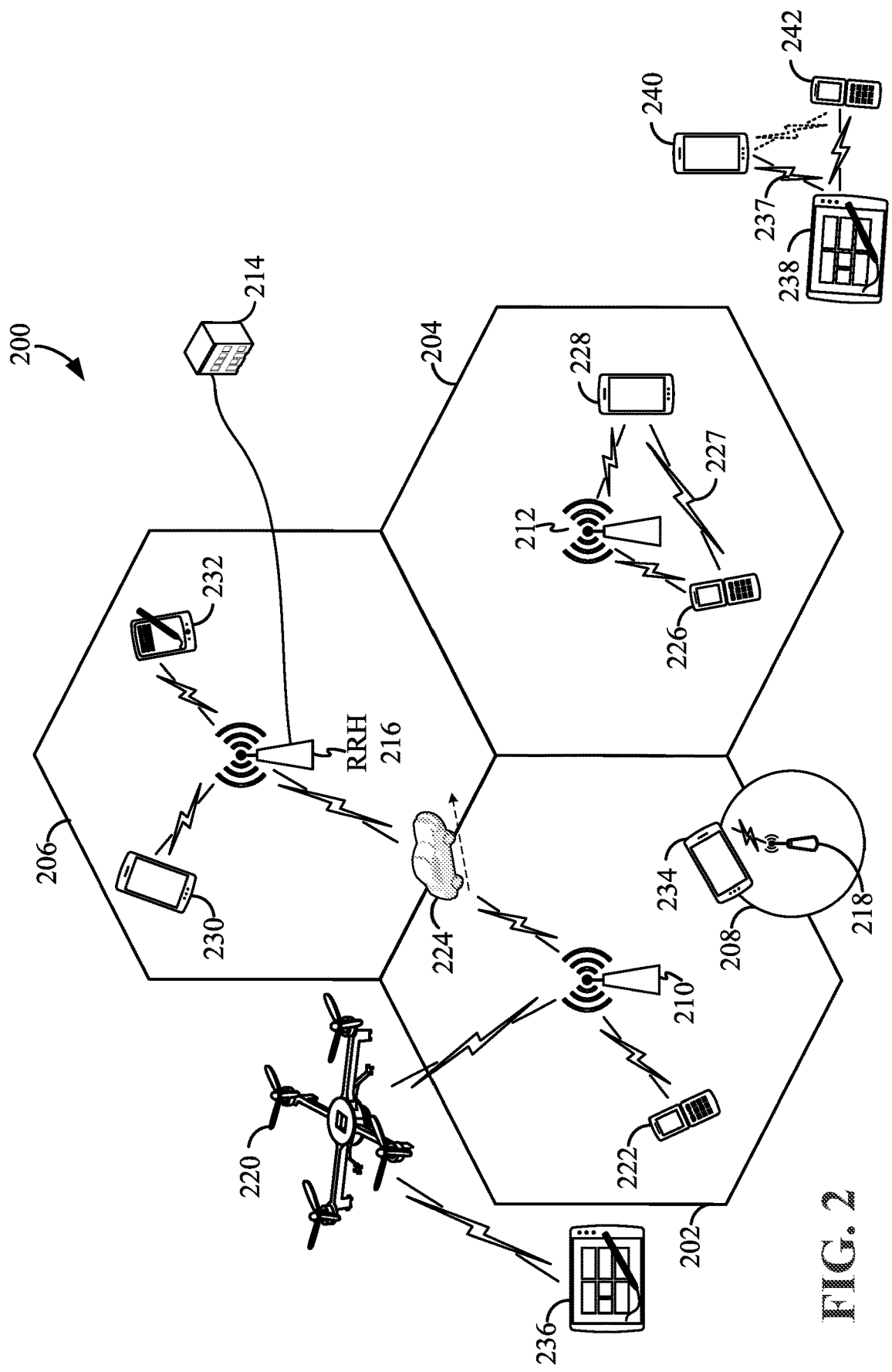
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIGS. 1 and/or 2) for all the UEs in the respective cells. For example, UEs 222 and 224 may be in communication with base station 210; UEs 226 and 228 may be in communication with base station 412; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

Base stations 210, 212, 214, 218 may operate as scheduling entities, scheduling resources for communication among the UEs within their service areas or cells 202, 204, 206, 208, respectively. However, base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 246. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the RAN 200, the ability for a UE to communicate while moving, independent of its location, is referred to as mobility. The various physical channels between the UE and the radio access network are generally set up, maintained, and released under the control of an AMF.

A RAN 200 may utilize DL-based mobility or UL-based mobility to enable mobility and handovers (e.g., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
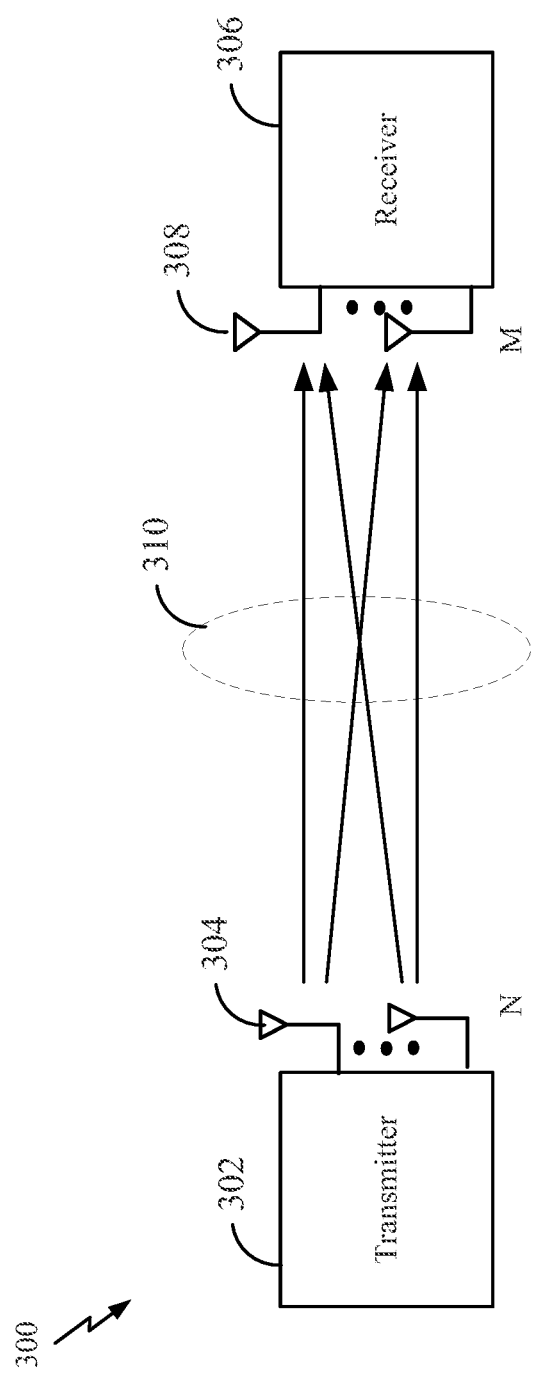
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (e.g., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306. A beam may be formed by, but not limited to, an antenna, an antenna port, an antenna element, a group of antennas, a group of antenna ports or a group of antenna elements. The beam may be alternatively made with a certain reference signal resource. The beam may be equivalent to a spatial domain filtering by which an electromagnetic (EM) radiation is transmitted.

In 5G New Radio (NR) systems, particularly for mmWave systems, beamformed signals may be utilized for most downlink channels, including the physical downlink control channel (PDCCH) and physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

Figure 4:
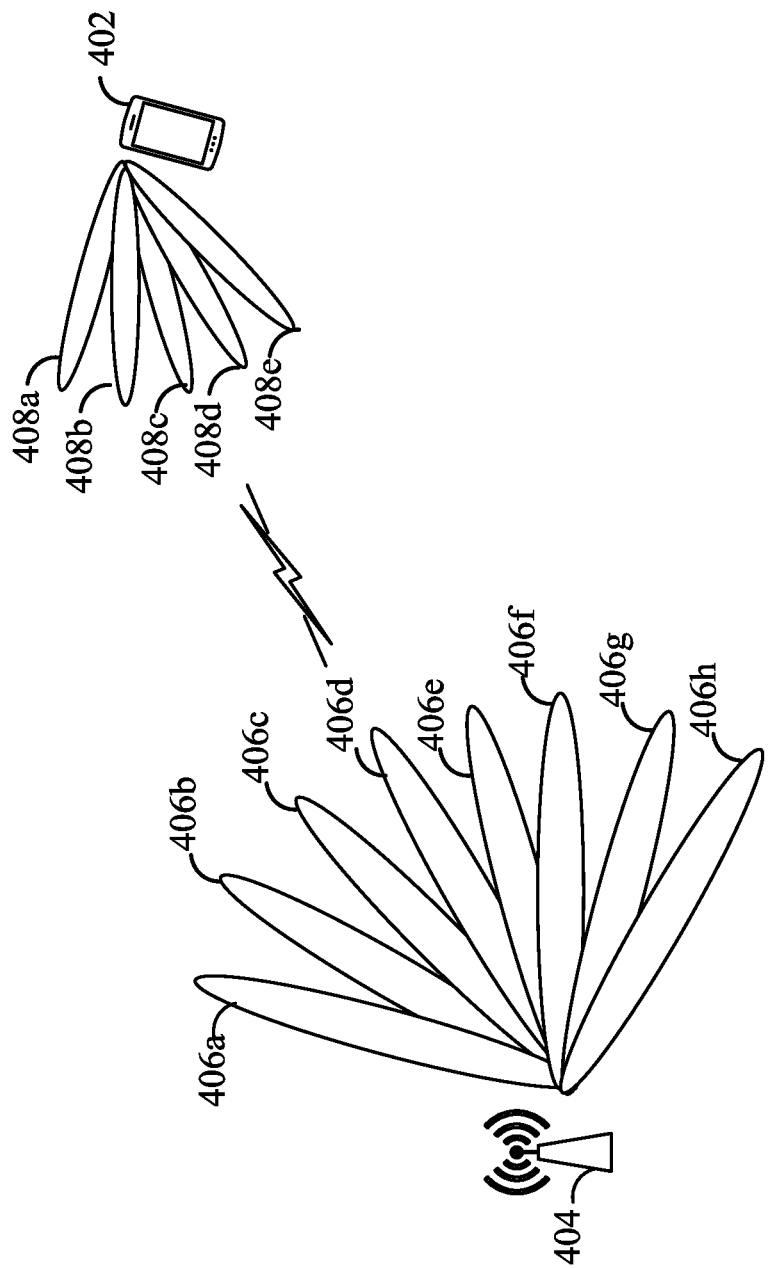
FIG. 4 is a diagram illustrating an example of communication between a base station and a UE using beamforming according to some aspects.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1-3, and the UE 402 may be any of the UEs or scheduled entities illustrated in FIGS. 1-3.

The base station 404 may generally be capable of communicating with the UE 402 using one or more transmit beams, and the UE 402 may further be capable of communicating with the base station 404 using one or more receive beams. As used herein, the term transmit beam refers to a beam on the base station 404 that may be utilized for downlink or uplink communication with the UE 402. In addition, the term receive beam refers to a beam on the UE 402 that may be utilized for downlink or uplink communication with the base station 404.

In the example shown in FIG. 4, the base station 404 is configured to generate a plurality of transmit beams 406a, 406b, 406c, 406d, 406e, 406f, 406g, and 406h (406a-406h), each associated with a different spatial direction. In addition, the UE 402 is configured to generate a plurality of receive beams 408a, 408b, 408c, 408d, and 408e (408a-408e), each associated with a different spatial direction. It should be noted that while some beams are illustrated as adjacent to one another, such an arrangement may be different in different aspects. For example, transmit beams 406a-406h transmitted during a same symbol may not be adjacent to one another. In some examples, the base station 404 and UE 402 may each transmit more or less beams distributed in all directions (e.g., 360 degrees) and in three-dimensions. In addition, the transmit beams 406a-406h may include beams of varying beam width. For example, the base station 404 may transmit certain signals (e.g., synchronization signal blocks (SSBs)) on wider beams and other signals (e.g., CSI-RSs) on narrower beams.

The base station 404 and UE 402 may select one or more transmit beams 406a-406h on the base station 404 and one or more receive beams 408a-408e on the UE 402 for communication of uplink and downlink signals therebetween using a beam management procedure. In one example, during initial cell acquisition, the UE 402 may perform a P1 beam management procedure to scan the plurality of transmit beams 406a-406h on the plurality of receive beams 408a-408e to select a beam pair link (e.g., one of the transmit beams 406a-406h and one of the receive beams 408a-408e) for a physical random access channel (PRACH) procedure for initial access to the cell. For example, periodic SSB beam sweeping may be implemented on the base station 404 at certain intervals (e.g., based on the SSB periodicity). Thus, the base station 404 may be configured to sweep or transmit an SSB on each of a plurality of wider transmit beams 406a-406h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 404 and UE 402 may perform a P2 beam management procedure for beam refinement at the base station 404. For example, the base station 404 may be configured to sweep or transmit a CSI-RS on each of a plurality of narrower transmit beams 406a-406h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)). The UE 402 is configured to scan the plurality of CSI-RS transmit beams 406a-406h on the plurality of receive beams 408a-408e. The UE 402 then performs beam measurements (e.g., RSRP, SINR, etc.) of the received CSI-RSs on each of the receive beams 408a-408e to determine the respective beam quality of each of the CSI-RS transmit beams 406a-406h as measured on each of the receive beams 408a-408e.

The UE 402 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 406a-406h on one or more of the receive beams 408a-408e to the base station 404. The base station 404 may then select one or more CSI-RS transmit beams on which to communicate downlink and/or uplink control and/ or data with the UE 402. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 402 may further select a corresponding receive beam on the UE 402 for each selected serving CSI-RS transmit beam to form a respective beam pair link (BPL) for each selected serving CSI-RS transmit beam. For example, the UE 402 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 404 may configure the UE 402 to perform SSB beam measurements and provide an L1 measurement report containing beam measurements of SSB transmit beams 406a-406h. For example, the base station 404 may configure the UE 402 to perform SSB beam measurements and/or CSI-RS beam measurements for beam failure detection (BRD), beam failure recovery (BFR), cell reselection, beam tracking (e.g., for a mobile UE 402 and/or base station 404), or other beam optimization purpose.

In addition, when the channel is reciprocal, the transmit and receive beams may be selected using an uplink beam management scheme. In an example, the UE 402 may be configured to sweep or transmit on each of a plurality of receive beams 408a-408e. For example, the UE 402 may transmit an SRS on each beam in the different beam directions. In addition, the base station 404 may be configured to receive the uplink beam reference signals on a plurality of transmit beams 406a-406h. The base station 404 then performs beam measurements (e.g., RSRP, SINR, etc.) of the beam reference signals on each of the transmit beams 406a-406h to determine the respective beam quality of each of the receive beams 408a-408e as measured on each of the transmit beams 406a-406h.

The base station 404 may then select one or more transmit beams on which to communicate downlink and/or uplink control and/or data with the UE 402. In some examples, the selected transmit beam(s) have the highest RSRP. The UE 402 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 406d) on the base station 404 and a single receive beam (e.g., beam 408c) on the UE may form a single BPL used for communication between the base station 404 and the UE 402. In another example, multiple CSI-RS transmit beams (e.g., beams 406c, 406d, and 406e) on the base station 404 and a single receive beam (e.g., beam 408c) on the UE 402 may form respective BPLs used for communication between the base station 404 and the UE 402. In another example, multiple CSI-RS transmit beams (e.g., beams 406c, 406d, and 406e) on the base station 404 and multiple receive beams (e.g., beams 408c and 408d) on the UE 402 may form multiple BPLs used for communication between the base station 404 and the UE 402. In this example, a first BPL may include transmit beam 406c and receive beam 408c, a second BPL may include transmit beam 408d and receive beam 408c, and a third BPL may include transmit beam 408e and receive beam 408d.

Various aspects of the present disclosure will be described with reference to an OFDM waveform, schematically illustrated in FIG. 5. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 5:
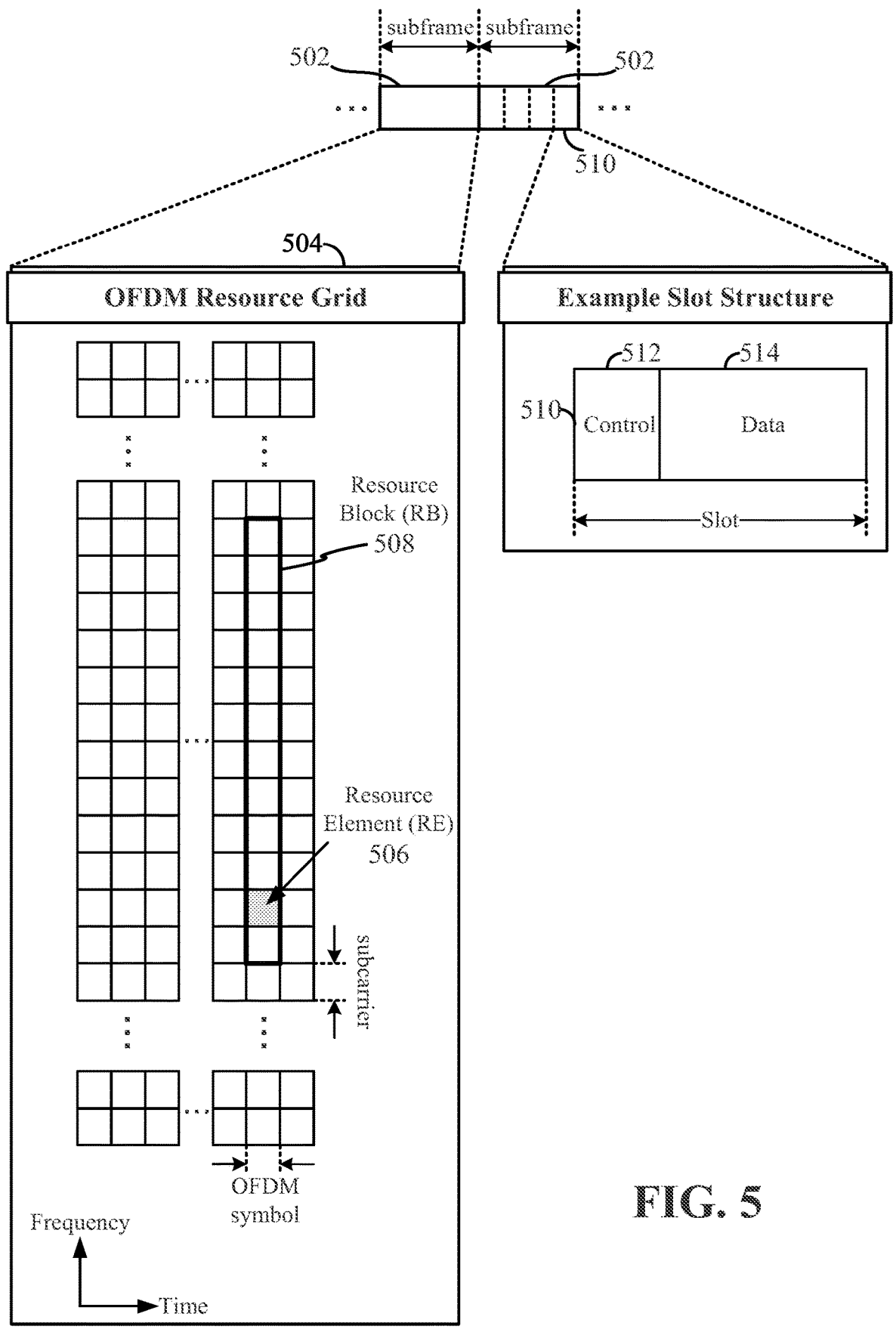
FIG. 5 is a schematic illustration of an organization of wireless resources in an air interface utilizing orthogonal frequency divisional multiplexing (OFDM) according to some aspects.

Referring now to FIG. 5, an expanded view of an exemplary DL subframe 502 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 504 may be used to schematically represent time-frequency resources for a given antenna port. That is, in a multiple-input-multiple-output (MIMO) implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 508 entirely corresponds to a single direction of communication (either transmission or reception for a given device).

Scheduling of UEs (e.g., scheduled entities) for downlink or uplink transmissions typically involves scheduling one or more resource elements 506 within one or more sub-bands. Thus, a UE generally utilizes only a subset of the resource grid 504. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each 1 ms subframe 502 may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 510 illustrates the slot 510 including a control region 512 and a data region 514. In general, the control region 512 may carry control channels, and the data region 514 may carry data channels. Of course, a slot may contain all DL, all UL, or at least one DL portion and at least one UL portion. The structure illustrated in FIG. 5 is merely exemplary in nature, and different slot structures may be utilized, and may include one or more of each of the control region(s) and data region(s).

Although not illustrated in FIG. 5, the various REs 506 within a RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In some examples, the slot 510 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 506 (e.g., within the control region 512) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 506 (e.g., in the control region 512 or the data region 514) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 506 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), e.g., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 506 (e.g., within the data region 514) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 506 within the data region 514 may be configured to carry other signals, such as one or more SIBs and DMRSs.

In an example of sidelink communication over a sidelink carrier via a proximity service (ProSe) PC5 interface, the control region 512 of the slot 510 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 514 of the slot 510 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 506 within slot 510. For example, HARQ feedback information may be transmitted in a physical sidelink feedback channel (PSFCH) within the slot 510 from the receiving sidelink device to the transmitting sidelink device. In addition, one or more reference signals, such as a sidelink SSB and/or a sidelink CSI-RS, may be transmitted within the slot 510.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described herein are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 6:
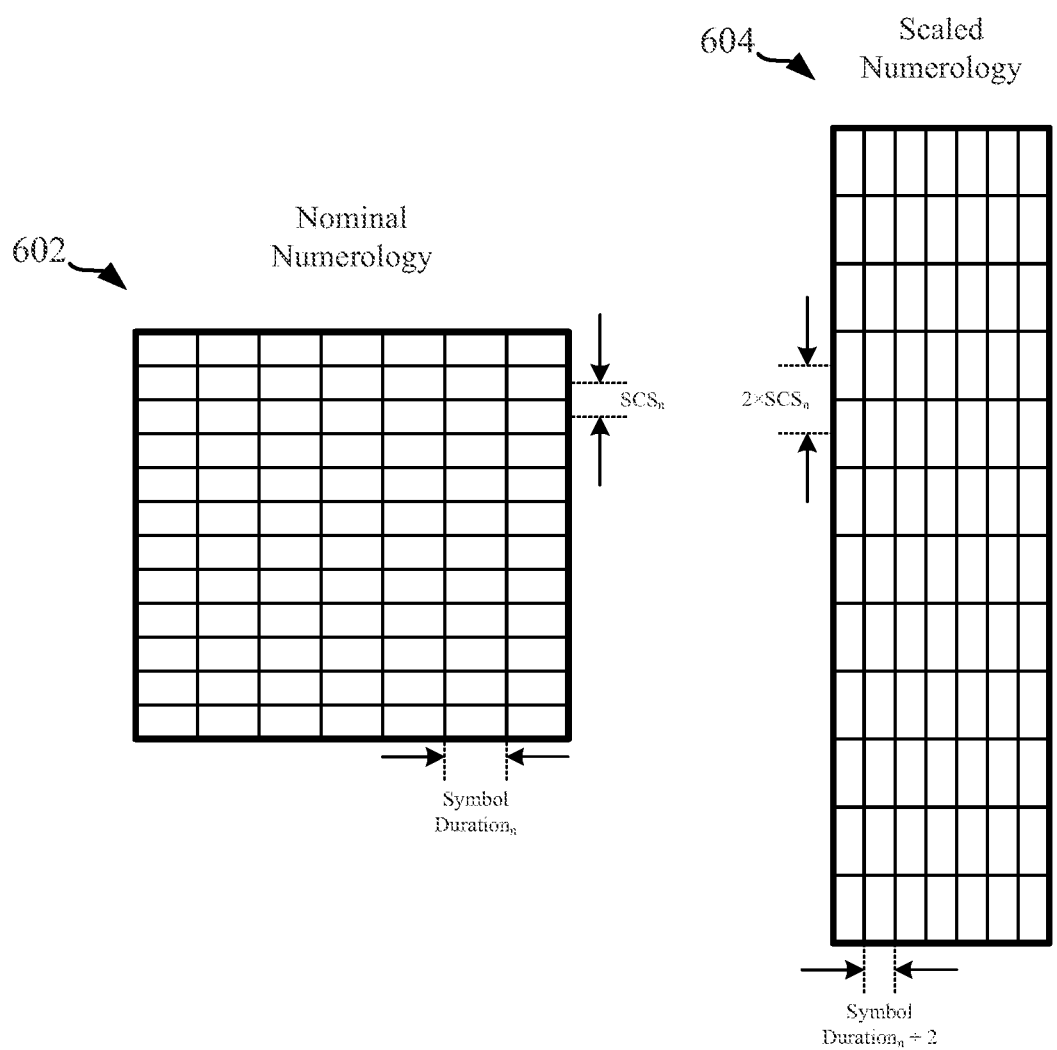
FIG. 6 is a schematic illustration of an OFDM air interface utilizing a scalable numerology according to some aspects.

To illustrate this concept of a scalable numerology, FIG. 6 shows a first RB 602 having a nominal numerology, and a second RB 604 having a scaled numerology. As one example, the first RB 602 may have a 'nominal' subcarrier spacing ($SCS_n$) of 30 kHz, and a 'nominal' symbol duration$_n$ of 333 ρs. Here, in the second RB 604, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 604, the scaled numerology includes a scaled symbol duration of half the nominal symbol duration, or (symbol duration$_n$)÷2=167 μs.

For ultra-reliable low latency communications (URLLCs) reliability is crucial. Generally, data is transmitted from a base station and delivered to a user equipment (UE) within two transmissions. The specified block error rate (BLER) for these data transmissions is $10^{-5}$ which provides for a narrow margin particularly when interference exists. Interference is a challenge for enabling URLLC applications while maintaining a specified quality of service.

In some aspects, a user equipment (UE) may always transmit a report with differential channel quality information (CQI) of sub-bands with high resolution to a base station. In some cases, this may be referred to as a SB-CSI report with full resolution. A report with differential CQI of sub-bands with high resolution may include one or more CQI values each associated with a sub-band of a plurality of sub-bands utilized by a physical downlink shared channel (PDSCH) transmission. However, an SB-CSI report with full resolution can occupy a relatively large amount of payload and provide the base station with unnecessary information, for example, when the UE transmits an ACK transmission indicating relatively low interference or an ability of the UE to at least partially decode the PDSCH transmission.

In some aspects, a user equipment (UE) may transmit a report with one or more spatial differential CQI values each associated with an offset level, where the offset level includes a difference between a CQI value associated with a sub-band of the plurality of sub-bands utilized by the PDSCH transmission and an average CQI value associated with the plurality of sub-bands utilized by the PDSCH transmission. In some cases, this may be referred to as an SB-CSI report without full resolution. A UE may transmit to a base station an SB-CSI report without full resolution to a base station because such a report may occupy a relatively small amount of payload. However, such a report may not provide the base station with all the necessary information (e.g., relatively low resolution) to update a PDSCH transmission when the UE transmits a NACK transmission indicating relatively high interference or an inability of the UE to at least partially decode the PDSCH transmission.

Figure 7:
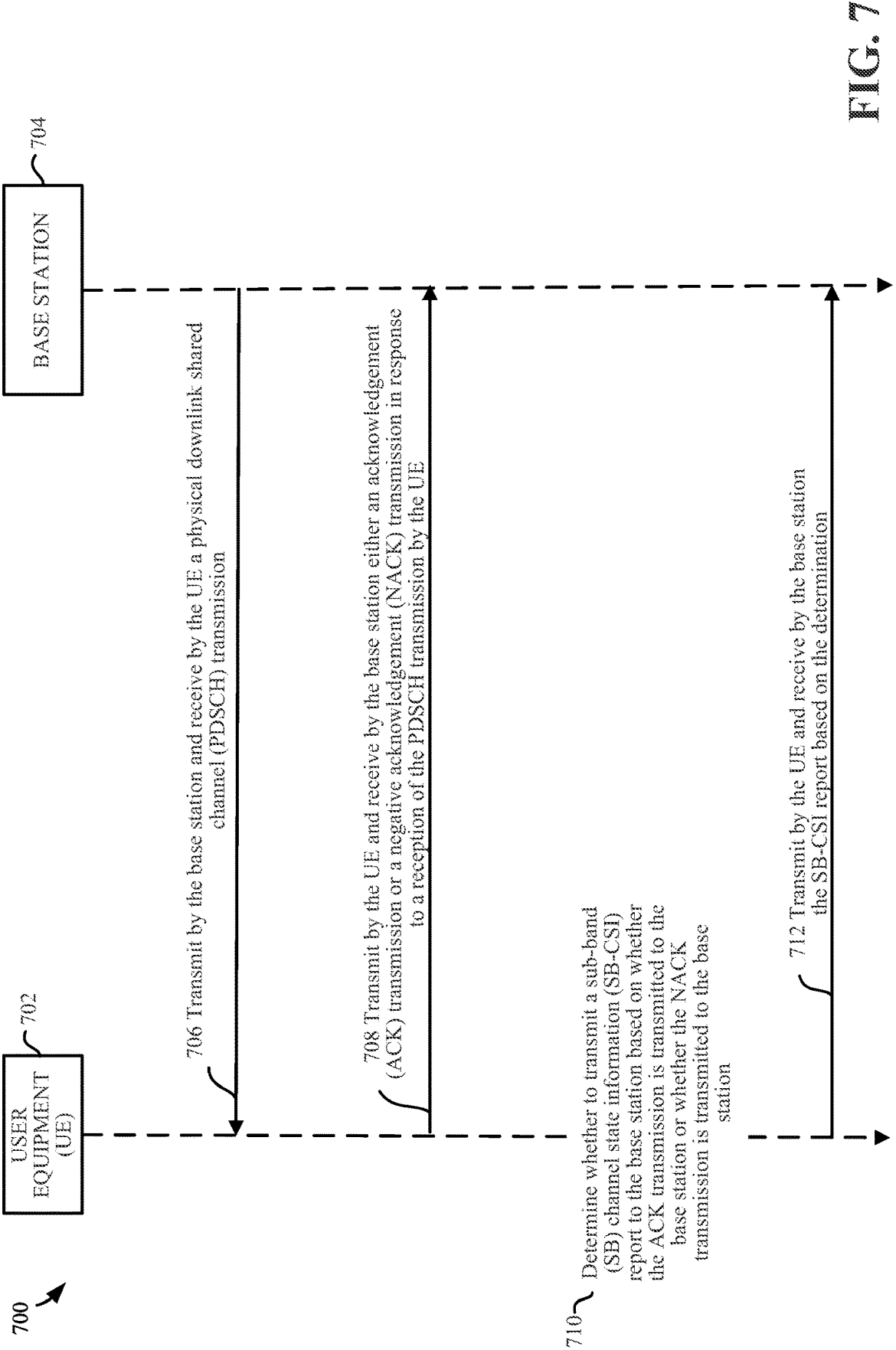
FIG. 7 is a conceptual signaling diagram illustrating an exemplary procedure for reporting sub-band (SB) channel state information (SB-CSI) according to some aspects.

FIG. 7 is a conceptual signaling diagram 700 illustrating an exemplary procedure for reporting sub-band (SB) channel state information (SB-CSI) according to some aspects. In the example shown in FIG. 7, a user equipment (UE) 702 is in wireless communication with a base station 704 over one or more wireless communication links. Each of the UE 702 and the base station 704 may correspond to any of the entities, gNodeBs, UEs, or the like as shown in FIGS. 1-4.

At 706, the UE 702 may receive a physical downlink shared channel (PDSCH) transmission from the base station 704. At 708, the UE 702 may transmit either an acknowledgement (ACK) transmission or a negative acknowledgement (NACK) transmission to the base station in response to a reception of the PDSCH transmission. For example, the UE 702 may receive the PDSCH transmission from the base station 704 and attempt to decode the PDSCH transmission. Based on an ability of the UE 702 to decode the PDSCH transmission, the UE 702 may transmit either an ACK transmission or a NACK transmission. In some aspects, when the UE 702 is unable to decode the PDSCH transmission, the UE 702 may transmit a NACK transmission to the base station 704 and when the UE 702 is able to decode the PDSCH transmission, the UE 702 may transmit an ACK transmission.

In some aspects, before receiving the PDSCH transmission from the base station 704, the UE 702 may receive downlink control information (DCI) associated with the PDSCH transmission. The DCI may indicate a first modulation coding scheme (MCS) value associated with the PDSCH transmission. The UE 702 may also configure the reception of the DCI for receiving the PDSCH transmission. Subsequently, the UE 702 may receive the PDSCH transmission from the base station 704 and measure a second MCS value associated with the received PDSCH transmission. The UE 702 may transmit either the ACK transmission or the NACK transmission to the base station in response to receiving the PDSCH transmission and based on a threshold difference between the first MCS value and the second MCS value. For example, when the difference between the first MCS value and the second MCS value is greater than the threshold difference, the UE 702 may transmit the NACK transmission. However, when the difference between the first MCS value and the second MCS value is no greater than the threshold difference, the UE 702 may transmit the ACK transmission.

At 710, the UE 702 may determine whether to transmit a sub-band (SB) channel state information (SB-CSI) report to the base station 704 based on whether the ACK transmission is transmitted to the base station 704 or whether the NACK transmission is transmitted to the base station 704. In some aspects, the UE 702 may determine to transmit an SB-CSI report to the base station 704 when a NACK transmission is transmitted to the base station 704 and may determine to abstain from transmitting an SB-CSI report to the base station 704 when an ACK transmission is transmitted to the base station 704. In some examples, the UE 702 may determine to transmit a CSI configured report to the base station 704, as described herein, when a NACK transmission is transmitted to the base station 704. Additionally, or alternatively, the UE 702 may determine not to transmit a CSI configured report to the base station 704 when an ACK transmission is transmitted to the base station 704. In some aspects, the UE 702 may determine to transmit an SB-CSI report or a CSI configured report to the base station 704 when a NACK transmission is transmitted to the base station and/or when an ACK transmission is transmitted to the base station 704. For example, the UE 702 may determine to transmit an SB-CSI report or a CSI configured report to the base station 704 regardless of whether an ACK transmission or a NACK transmission is transmitted to the base station 704.

At 712, the UE 702 may transmit the SB-CSI report to the base station 704 based on whether the ACK transmission is transmitted to the base station 704 or whether the NACK transmission is transmitted to the base station 704. In some aspects, the UE 702 may transmit an SB-CSI report to the base station 704 when a NACK transmission is transmitted to the base station 704 and may abstain from transmitting an SB-CSI report to the base station 704 when an ACK transmission is transmitted to the base station 704. In some examples, the UE 702 may transmit a CSI configured report to the base station 704, as described herein, when a NACK transmission is transmitted to the base station 704. Additionally, or alternatively, the UE 702 may not transmit a CSI configured report to the base station 704 when an ACK transmission is transmitted to the base station 704. In some aspects, the UE 702 may transmit an SB-CSI report or a CSI configured report to the base station 704 when a NACK transmission is transmitted to the base station and/or when an ACK transmission is transmitted to the base station 704. For example, the UE 702 may transmit an SB-CSI report or a CSI configured report to the base station 704 regardless of whether an ACK transmission or a NACK transmission is transmitted to the base station 704.

In some aspects, when the UE 702 determines to transmit the SB-CSI report to the base station, the UE 702 may also include, with the SB-CSI report, SB reporting with full resolution, where the SB-CSI report with full resolution indicates one or more channel quality information (CQI) values each associated with a sub-band of a plurality of sub-bands utilized by the PDSCH transmission or SB reporting without full resolution, where the SB reporting without full resolution indicates one or more spatial differential CQI values each associated with an offset level, and where the offset level includes a difference between a CQI value associated with a sub-band of the plurality of sub-bands utilized by the PDSCH transmission and an average CQI value associated with the plurality of sub-bands utilized by the PDSCH transmission. In some examples, the one or more CQI values may include at least one of a CQI index, a modulation scheme, a code rate, or an efficiency. In some examples, the UE 702 determining whether to transmit to the base station 704 the SB-CSI report including the SB reporting with full resolution or transmit the SB-CSI report including the SB reporting without full resolution having one or more spatial differential CQI values each associated with an offset level may be based on at least a quality of a decoding of the PDSCH transmission.

FIG. 8 is an illustration of a table 800 of 4-bit channel quality indicators (CQI) according to some aspects. The table 800 may be an example of SB reporting with full resolution that may be included with an SB-CSI report. As shown in FIG. 8, the table 800 includes a column of CQI indices 802, a column of modulations 804, a column of code rates 806, and a column of efficiencies 808. Each modulation, code rate, and efficiency in a particular row aligns with a CQI index sharing that same particular row. Each of the CQI indexes may be indicative of a particular sub-band. Generally, the SB reporting with full resolution provides better resolution than SB reporting without full resolution but also occupies a greater payload during transmission, for example, on a physical uplink control channel (PUCCH). Because of this, the UE 702 may determine to include, with the transmission of the SB-CSI report, the SB reporting with full resolution when there is a bad signal or decoding of the PDSCH transmission fails in order to provide the base station 704 with the resolution needed to remedy the bad signal or the failed decoding.

FIG. 9 is an illustrating of a table 900 mapping spatial differential CQI values to offset level according to some aspects. The table 900 may be an example of SB reporting without full resolution that may be included with an SB-CSI report. The table 900 maps spatial differential CQI values to offset levels. As shown in FIG. 9, the table 900 includes a column of spatial differential CQI values 902 and a column of offset levels 904. Each offset level in a particular row aligns with a spatial differential CQI index value sharing that same particular row. Generally, the SB reporting without full resolution does not provide the same amount of resolution that the SB reporting with full resolution provides. However, the SB reporting without full resolution also occupies a lesser payload than the SB reporting with full resolution during transmission, for example, on a physical uplink control channel (PUCCH). Because of this, the UE 702 may determine to transmit the SB-CSI report including the SB reporting without full resolution to the base station 704 when a signal is above a threshold or decoding of the PDSCH transmission is at least partially successful in order to provide the base station 704 with some resolution at a reduced transmission payload.

In some aspects, the UE 702 may determine not to transmit an SB-CSI report to the base station 704. For example, instead of transmitting an SB-CSI report to the base station 704, the UE 702 may transmit a CSI configured report. A CSI configured report may include wideband (WB) reporting of CQI values and one or more WB rank indications (e.g., ranking a quantity or number of layers). In some aspects, a CSI configured report may include SB reporting without full resolution and also one or more WB rank indications.

In some examples, before the UE 702 determines whether to transmit the SB-CSI report, the UE 702 may receive from the base station 704 a control message indicating whether the UE 702 is to transmit the SB-CSI report including the SB reporting with full resolution to the base station, or whether the UE 702 is to transmit the SB-CSI report including SB reporting without full resolution. The UE 702 may receive the control message and determine whether to transmit the SB-CSI report including the SB reporting with full resolution to the base station or the SB-CSI report with the SB reporting without full resolution based at least on the control message. In some aspects, the UE 702 may receive the control message and determine to transmit a CSI configured report instead of an SB-CSI report based at least on the control message. The control message may include at least one of a radio resource control (RRC) message, a medium access control (MAC) control element (MAC-CE), or a downlink control information (DCI).

In some examples, the UE may include a rank indication (RI) with an SB-CSI report. An RI may be on a per sub-band basis and indicate a rank of a particular sub-band amongst a plurality of sub-bands. For example, in response to determining that a NACK transmission is transmitted to the base station 704, the UE 702 may determine to include an RI with the SB-CSI report for transmission to the base station 704. In some aspects, the RI may indicate to the base station 704 a quantity of sub-bands utilized by the PDSCH transmission that are able to be supported by the UE 702.

In some aspects, the base station 704 transmit to the UE 702 a table through RRC signal or a medium access control (MAC) control element (MAC-CE) to correlate bit values with types of SB-CSI report transmissions. The UE 702 may also provide an indication (e.g., one or more bit values) based on the table in an ACK transmission or a NACK transmission to the base station 704 and in response to receiving the PDSCH transmission so that the base station 704 expects to receive a particular type of SB-CSI report from the UE 702.

FIGS. 10, 11, 12, 13A, and 13B are illustrations of tables correlating bits values with acknowledgement (ACK) transmission and negative acknowledgement (NACK) transmission types according to some aspects. As shown in FIG. 10, table 1000 includes a column with bit value 1002, and in this case, three bit values "00", "01", and "10". The table 1000 correlates each bit value with a representation of a SB-CSI report type 1004. For example, the bit value "00" correlates with a NACK transmission and a CSI configured report. As another example, the bit value "01" correlates with a NACK transmission and an SB-CSI report with full resolution. As yet another example, the bit value "10" correlates with an ACK transmission. Thus, based on the table 1000 received from the base station 704, the UE 702 may transmit a bit value to the base station 704 indicating a NACK or an ACK and whether the base station 704 should expect to receive a CSI configured report or an SB-CSI report with full resolution.

Figure 11:
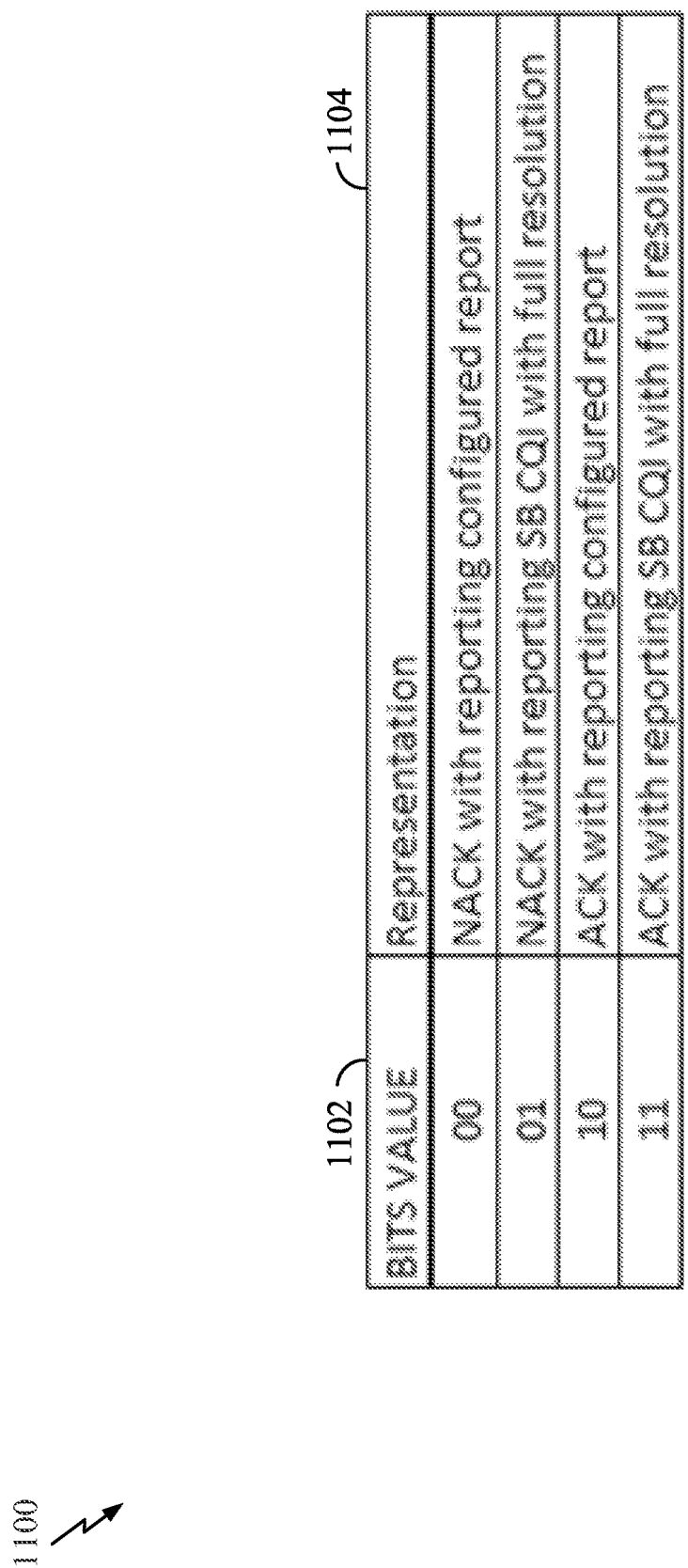
FIG. 11 is an illustration of a second example table correlating bits values with acknowledgement (ACK) transmission and negative acknowledgement (NACK) transmission types according to some aspects.

As shown in FIG. 11, table 1100 includes a column with bit value 1102, and in this case, four bit values "00", "01", "10", and "11." The table 1100 correlates each bit value with a representation of a SB-CSI report type 1104. For example, the bit value "00" correlates with a NACK transmission and a CSI configured report. As another example, the bit value "01" correlates with a NACK transmission and an SB-CSI report with full resolution. As yet another example, the bit value "10" correlates with an ACK transmission and a CSI configured report. As another example, the bit value "11" correlates with an ACK transmission and an SB-CSI report with full resolution. Thus, based on the table 1200 received from the base station 704, the UE 702 may transmit a bit value to the base station 704 indicating a NACK or an ACK and whether the base station 704 should expect to receive a CSI configured report or an SB-CSI report with full resolution.

As shown in FIG. 12, table 1200 includes a column with bit value 1202, and in this case, four bit values "100", "101", "110", and "111." The table 1200 correlates each bit value with a representation of a SB-CSI report type 1204. For example, the bit value "100" correlates with a NACK transmission and an SB-CSI report with full resolution and sub-band (SB) rank indication (RI). As another example, the bit value "101" correlates with a NACK transmission, an SB-CSI report with full resolution, and wideband RI. As yet another example, the bit value "110" correlates with an NACK transmission and a CSI configured report. As another example, the bit value "111" correlates with an ACK transmission. Thus, based on the table 1200 received from the base station 704, the UE 702 may transmit a bit value to the base station 704 indicating a NACK or an ACK and whether the base station 704 should expect to receive an SB-CSI report with full resolution and one or more SB rank indications, an SB-CSI report with full resolution and one or more WB rank indications, or a CSI configured report.

As shown in FIG. 13A, table 1300 includes a column with bit value 1302, and in this case, two bit values "0" and "1." The table 1300 correlates each bit value with a representation of an indication of an acknowledgement (ACK) transmission or an indication of a negative acknowledgement (NACK) transmission. For example, the bit value "0" correlates with a NACK transmission. As another example, the bit value "1" correlates with an ACK transmission. Thus, based on the table 1300 received from the base station 704, the UE 702 may transmit a bit value to the base station 704 indicating a NACK or an ACK.

As shown in FIG. 13B, table 1350 includes a column with bit value 1352, and in this case, three bit values "00", "01", and "11." The table 1350 correlates each bit value with a representation of an indication of an SB report type 1354. For example, the bit value "00" correlates with transmitting a CSI configured report. As another example, the bit value "01" correlates with transmitting an SB CSI report with full resolution and WB rank indication. As yet another example, the bit value "11" correlates with transmitting an SB CSI report with full resolution and SB rank indication. Thus, based on the table 1350 received from the base station 704, the UE 702 may transmit a bit value to the base station 704 indicating whether the base station 704 should expect to receive a CSI configured report, an SB-CSI report with full resolution and WB rank indication, or an SB-CSI report with full resolution and SB rank indication.

In some aspects, the bits values from the tables illustrated in FIGS. 13A and 13B may be combined in a transmission from the UE 702 to the base station 704. For example, the UE 702 may transmit a bit value of "100" which indicates to the base station 704 that an ACK transmission is being transmitted and that a CSI configured report is to be transmitted to the base station. As another example, the UE 702 may transmit a bit value of "101" which indicates to the base station 704 that an ACK transmission is being transmitted and that an SB CSI report with full resolution and WB rank indication is to be transmitted to the base station. As another example, the UE 702 may transmit a bit value of "111" which indicates to the base station 704 that an ACK transmission is being transmitted and that an SB CSI report with full resolution and SB rank indication is to be transmitted to the base station. As yet another example, the UE 702 may transmit a bit value of "o00" which indicates to the base station 704 that a NACK transmission is being transmitted and that a CSI configured report is to be transmitted to the base station. As yet another example, the UE 702 may transmit a bit value of "001" which indicates to the base station 704 that a NACK transmission is being transmitted and that an SB CSI report with full resolution and WB rank indication is to be transmitted to the base station. As yet another example, the UE 702 may transmit a bit value of "011" which indicates to the base station 704 that a NACK transmission is being transmitted and that an SB CSI report with full resolution and SB rank indication is to be transmitted to the base station.

In some aspects, before receiving the PDSCH transmission from the base station 704, the UE 702 may receive downlink control information (DCI) associated with the PDSCH transmission. The DCI may indicate a first modulation coding scheme (MCS) value associated with the PDSCH transmission. The UE 702 may also configure the reception of the DCI for receiving the PDSCH transmission. Subsequently, the UE 702 may receive the PDSCH transmission from the base station 704 and measure a second MCS value associated with the received PDSCH transmission. The UE 702 may determine whether to transmit a rank indication (RI) per sub-band, for example, with an SB-CSI report with full resolution for reception by the base station based on a threshold difference between the first MCS value and the second MCS value. For example, when the difference between the first MCS value and the second MCS value is greater than the threshold difference, the UE 702 may transmit the rank indication per sub-band. However, when the difference between the first MCS value and the second MCS value is no greater than the threshold difference, the UE 702 may abstain from transmitting the rank indication per sub-band. In some examples, the UE 702 may determine whether to transmit a wideband (WB) rank indication (RI), for example, with a CSI configured report for reception by the base station based on a threshold difference between the first MCS value and the second MCS value. For example, when the difference between the first MCS value and the second MCS value is greater than the threshold difference, the UE 702 may transmit the WB rank indication. However, when the difference between the first MCS value and the second MCS value is no greater than the threshold difference, the UE 702 may abstain from transmitting the WB rank indication. It should be understood that the threshold difference between the first MCS value and the second MCS value used to determine whether to include the RI per sub-band with the SB-CSI report may be the same threshold difference or a different threshold difference used to determine whether to include the WB RI with CSI configured report.

Figure 14:
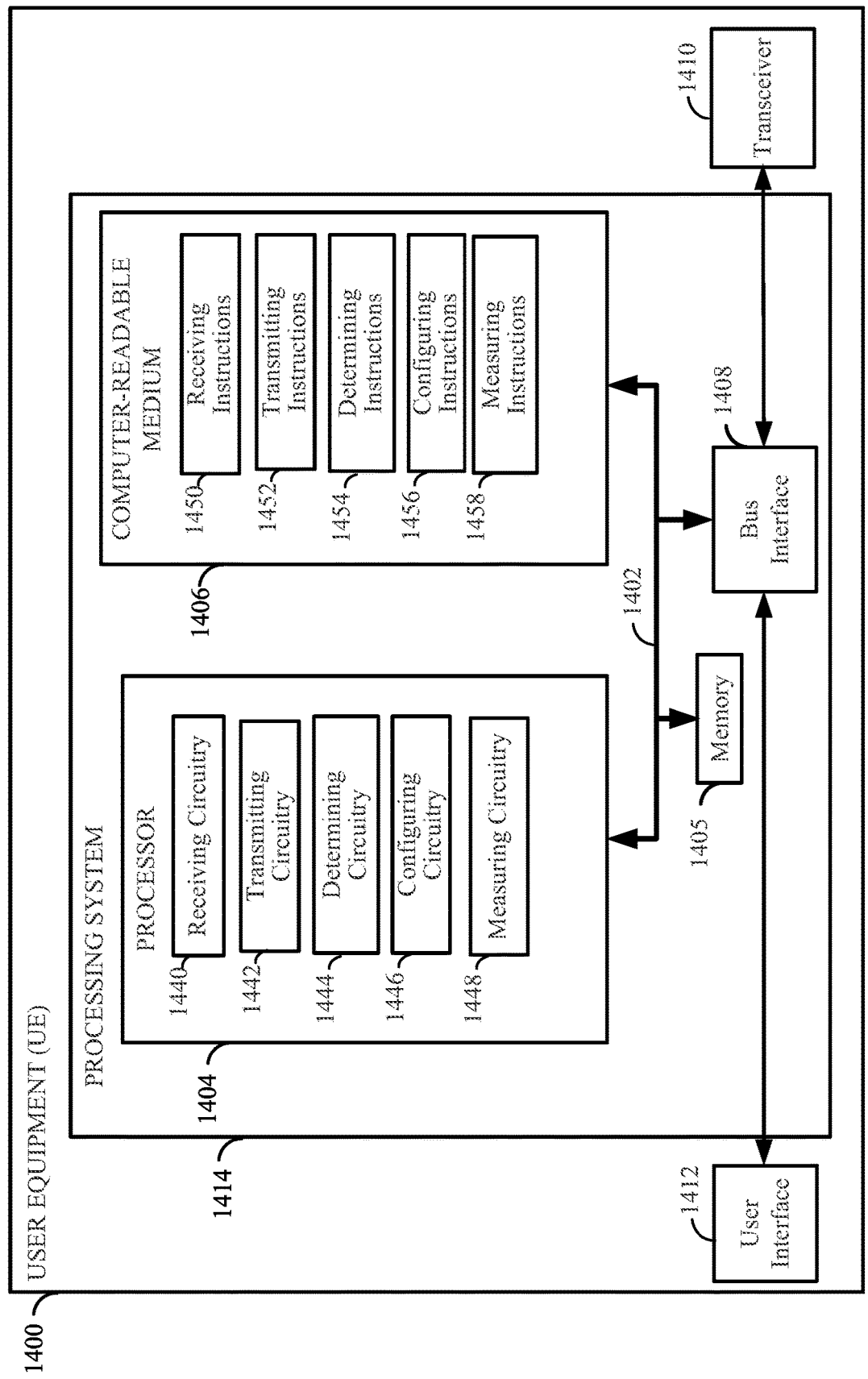
FIG. 14 is a block diagram conceptually illustrating an example of a hardware implementation for a user equipment (UE) according to some aspects.

FIG. 14 is a block diagram illustrating an example of a hardware implementation for a user equipment (UE) 1400 employing a processing system 1414. For example, the UE 1400 may be any of the user equipment (UEs) or base stations (e.g., gNB or eNB) illustrated in any one or more of FIGS. 1-4 and 7.

The UE 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1400 may be configured to perform any one or more of the functions described herein. That is, the processor 1404, as utilized in a UE 1400, may be used to implement any one or more of the processes described herein. The processor 1404 may in some instances be implemented via a baseband or modem chip and in other implementations, the processor 1404 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), and computer-readable media (represented generally by the computer-readable storage medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a means for communicating with various other apparatus over a transmission medium (e.g., air interface). A user interface 1412 (e.g., keypad, display, speaker, microphone, joystick) may also be provided.

The processor 1404 is responsible for managing the bus 1402 and general processing, including the execution of software stored on the computer-readable storage medium 1406. The software, when executed by the processor 1404, causes the processing system 1414 to perform the various functions described herein for any particular apparatus. The computer-readable storage medium 1406 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1406.

The computer-readable storage medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1406 may reside in the processing system 1414, external to the processing system 1414, or distributed across multiple entities including the processing system 1414. The computer-readable storage medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. For example, the processor 1404 may include receiving circuitry 1440 configured to receive a physical downlink shared channel (PDSCH) transmission from a base station. The receiving circuitry 1440 may also be configured to receive downlink control information (DCI) associated with the PDSCH transmission, where the DCI indicates a first modulation coding scheme (MCS) value associated the PDSCH transmission. The receiving circuitry 1440 may also be configured to receive a control message from the base station indicating whether to transmit the SB-CSI report as the SB-CSI report with full resolution to the base station or whether to transmit the SB-CSI report as the CSI configured report. The receiving circuitry 1440 may be configured to execute receiving instructions 1450 stored in the computer-readable storage medium 1406 to implement any of the one or more of the functions described herein.

In some aspects of the disclosure, the processor 1404 may also include transmitting circuitry 1442 configured to transmit either an acknowledgement (ACK) transmission or a negative acknowledgement (NACK) transmission to the base station in response to a reception of the PDSCH transmission. The transmitting circuitry 1442 may also be configured to transmit the SB-CSI report to the base station when the ACK transmission is transmitted to the base station and transmit the SB-CSI report to the base station when the NACK transmission is transmitted to the base station. The transmitting circuitry 1442 may also be configured to transmit the SB-CSI report to the base station when the NACK transmission is transmitted to the base station or abstain from transmitting the SB-CSI report when the ACK transmission is transmitted to the base station. The transmitting circuitry 1442 may be configured to execute transmitting instructions 1452 stored in the computer-readable storage medium 1406 to implement any of the one or more of the functions described herein.

In some aspects of the disclosure, the processor 1404 may further include determining circuitry 1444 configured to determine whether to transmit a sub-band (SB) channel state information (SB-CSI) report to the base station based on whether the ACK transmission is transmitted to the base station or whether the NACK transmission is transmitted to the base station. The determining circuitry 1444 may also be configured to, when determining to transmit the SB-CSI report to the base station, determine whether to transmit the SB-CSI report as an SB-CSI report with full resolution to the base station, where the SB-CSI report with full resolution includes one or more channel quality information (CQI) values each associated with a sub-band of a plurality of sub-bands utilized by the PDSCH transmission; or transmit the SB-CSI report as a channel state information (CSI) configured report including one or more spatial differential CQI values each associated with an offset level, where the offset level comprises a difference between a CQI value associated with a sub-band of the plurality of sub-bands utilized by the PDSCH transmission and an average CQI value associated with the plurality of sub-bands utilized by the PDSCH transmission. The determining circuitry 1444 may also be configured to, when determining to transmit the SB-CSI report as the SB-CSI report with full resolution to the base station, determine whether to include a rank indication per sub-band with the SB-CSI report with full resolution for reception by the base station, where the rank indication per sub-band indicates a quantity of sub-bands utilized by the PDSCH transmission that are able to be supported by the UE. The determining circuitry 1444 may be configured to execute receiving instructions 1454 stored in the computer-readable storage medium 1406 to implement any of the one or more of the functions described herein.

In some aspects of the disclosure, the processor 1404 may include configuring circuitry 1446 configured to configuring the reception of the DCI for receiving the PDSCH transmission. The configuring circuitry 1446 may be configured to execute configuring instructions 1456 stored in the computer-readable storage medium 1406 to implement any of the one or more of the functions described herein.

In some aspects of the disclosure, the processor 1404 may also include measuring circuitry 1448 configured to measuring a second MCS value associated with the received PDSCH transmission. The measuring circuitry 1448 may be configured to execute measuring instructions 1458 stored in the computer-readable storage medium 1406 to implement any of the one or more of the functions described herein.

Figure 15:
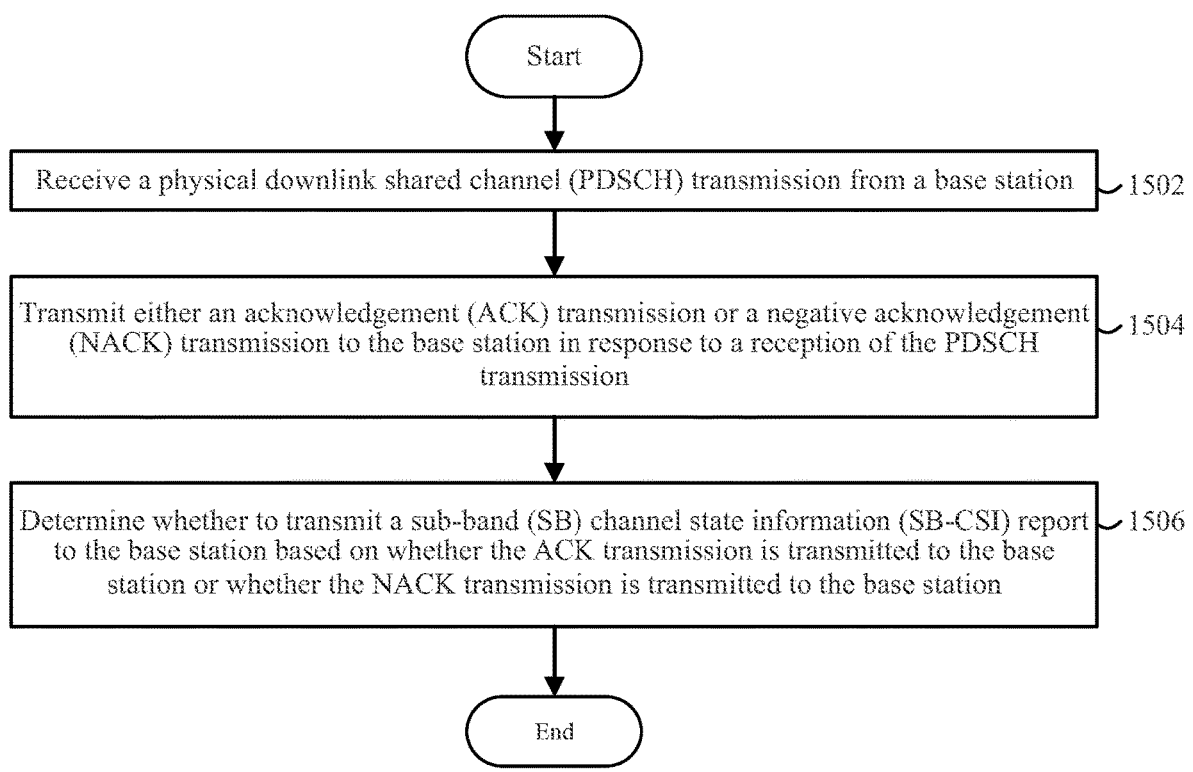
FIG. 15 is a flow chart of a first example method for reporting SB-CSI according to some aspects.

FIG. 15 is a flow chart 1500 of a method for reporting sub-band (SB) channel state information (SB-CSI) according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 1502, the UE 1400 may receive a physical downlink shared channel (PDSCH) transmission from a base station. At block 1504, the UE 1400 may transmit either an acknowledgement (ACK) transmission or a negative acknowledgement (NACK) transmission to the base station in response to a reception of the PDSCH transmission. For example, the UE 1400 may receive the PDSCH transmission from the base station and attempt to decode the PDSCH transmission. Based on an ability of the UE 1400 to decode the PDSCH transmission, the UE 1400 may transmit either an ACK transmission or a NACK transmission. In some aspects, when the UE 1400 is unable to decode the PDSCH transmission, the UE 1400 may transmit a NACK transmission to the base station and when the UE 1400 is able to decode the PDSCH transmission, the UE 1400 may transmit an ACK transmission.

In some aspects, before receiving the PDSCH transmission from the base station, the UE 1400 may receive downlink control information (DCI) associated with the PDSCH transmission. The DCI may indicate a first modulation coding scheme (MCS) value associated with the PDSCH transmission. The UE 1400 may also configure the reception of the DCI for receiving the PDSCH transmission. Subsequently, the UE 1400 may receive the PDSCH transmission from the base station and measure a second MCS value associated with the received PDSCH transmission. The UE 1400 may transmit either the ACK transmission or the NACK transmission to the base station in response to receiving the PDSCH transmission and based on a threshold difference between the first MCS value and the second MCS value. For example, when the difference between the first MCS value and the second MCS value is greater than the threshold difference, the UE 1400 may transmit the NACK transmission. However, when the difference between the first MCS value and the second MCS value is no greater than the threshold difference, the UE 1400 may transmit the ACK transmission.

At block 1506, the UE 1400 may determine whether to transmit an SB-CSI report to the base station based on whether the ACK transmission is transmitted to the base station or whether the NACK transmission is transmitted to the base station. In some aspects, the UE 1400 may determine to transmit an SB-CSI report to the base station when a NACK transmission is transmitted to the base station and may determine to abstain from transmitting an SB-CSI report to the base station when an ACK transmission is transmitted to the base station. In some examples, the UE 1400 may determine to transmit a CSI configured report to the base station, as described herein, when determining to abstain from transmitting an SB-CSI report to the base station. Alternatively, the UE 1400 may determine not to transmit a CSI configured report to the base station when determining to abstain from transmitting an SB-CSI report to the base station. In some aspects, the UE 1400 may determine to transmit an SB-CSI report to the base station when a NACK transmission is transmitted to the base station and/or when an ACK transmission is transmitted to the base station. For example, the UE 1400 may determine to transmit an SB-CSI report to the base station regardless of whether an ACK transmission or a NACK transmission is transmitted to the base station.

The UE 1400 may transmit the SB-CSI report to the base station based on whether the ACK transmission is transmitted to the base station or whether the NACK transmission is transmitted to the base station. In some aspects, the UE 1400 may transmit an SB-CSI report to the base station when a NACK transmission is transmitted to the base station and may abstain from transmitting an SB-CSI report to the base station when an ACK transmission is transmitted to the base station. In some examples, the UE 1400 may transmit a CSI configured report to the base station, as described herein, when abstaining from transmitting an SB-CSI report to the base station. Alternatively, the UE 1400 may not transmit a CSI configured report to the base station when abstaining from transmitting an SB-CSI report to the base station. In some aspects, the UE 1400 may transmit an SB-CSI report to the base station when a NACK transmission is transmitted to the base station and/or when an ACK transmission is transmitted to the base station. For example, the UE 1400 may transmit an SB-CSI report to the base station regardless of whether an ACK transmission or a NACK transmission is transmitted to the base station.

In some aspects, the when the UE 1400 determines to transmit the SB-CSI report to the base station, the UE 1400 may also include, with the SB-CSI report, SB reporting with full resolution, where the SB-CSI report with full resolution indicates one or more channel quality information (CQI) values each associated with a sub-band of a plurality of sub-bands utilized by the PDSCH transmission or SB reporting without full resolution, where the SB reporting without full resolution indicates one or more spatial differential CQI values each associated with an offset level, and where the offset level includes a difference between a CQI value associated with a sub-band of the plurality of sub-bands utilized by the PDSCH transmission and an average CQI value associated with the plurality of sub-bands utilized by the PDSCH transmission. In some examples, the one or more CQI values may include at least one of a CQI index, a modulation scheme, a code rate, or an efficiency. In some examples, the UE 1400 determining whether to transmit to the base station the SB-CSI report including the SB reporting with full resolution or transmit the SB-CSI report including the SB reporting without full resolution and having one or more spatial differential CQI values each associated with an offset level may be based on at least a quality of a decoding of the PDSCH transmission.

In some aspects, a table may be used as SB reporting with full resolution and may include a column of CQI indices, a column of modulations, a column of code rates, and a column of efficiencies. Each modulation, code rate, and efficiency in a particular row aligns with a CQI index sharing that same particular row. Each of the CQI indexes may be indicative of a particular sub-band. Generally, the SB reporting with full resolution provides better resolution than SB reporting without full resolution but also occupies a greater payload during transmission, for example, on a physical uplink control channel (PUCCH). Because of this, the UE 1400 may determine to include, with the transmission of the SB-CSI report, the SB reporting with full resolution when there is a bad signal or decoding of the PDSCH transmission fails in order to provide the base station with the resolution needed to remedy the bad signal or the failed decoding.

In some aspects, a table may be used as SB reporting without full resolution and may include a column of spatial differential CQI values and a column of offset levels. Each offset level in a particular row aligns with a spatial differential CQI index value sharing that same particular row. Generally, the SB reporting without full resolution does not provide the same amount of resolution that the SB reporting with full resolution provides. However, the SB reporting without full resolution also occupies a lesser payload than the SB reporting with full resolution during transmission, for example, on a physical uplink control channel (PUCCH). Because of this, the UE 1400 may determine to transmit the SB-CSI report including the SB reporting without full resolution to the base station when a signal is above a threshold or decoding of the PDSCH transmission is at least partially successful in order to provide the base station with some resolution at a reduced transmission payload.

In some aspects, the UE 1400 may determine not to transmit an SB-CSI report to the base station. For example, instead of transmitting an SB-CSI report to the base station, the UE 1400 may transmit a CSI configured report. A CSI configured report may include wideband (WB) reporting of CQI values and one or more WB rank indications (e.g., ranking a quantity or number of layers). In some aspects, a CSI configured report may include SB reporting without full resolution and also one or more WB rank indications.

In some examples, before the UE 1400 determines whether to transmit the SB-CSI report, the UE 1400 may receive from the base station a control message indicating whether the UE 1400 is to transmit the SB-CSI report including the SB reporting with full resolution to the base station or whether the UE 1400 is to transmit the SB-CSI report including the SB reporting without full resolution to the base station. The UE 1400 may receive the control message and determine whether to transmit the SB-CSI report including the SB reporting with full resolution to the base station or to transmit the SB-CSI report with the SB reporting without full resolution based at least on the control message. In some aspects, the UE 1400 may receive the control message and determine to transmit a CSI configured report instead of an SB-CSI report based at least on the control message. The control message may include at least one of a radio resource control (RRC) message, a medium access control (MAC) control element (MAC-CE), or a downlink control information (DCI).

In some examples, the UE 1400 may include a rank indication (RI) with an SB-CSI report. An RI may be on a per sub-band basis and indicate a rank of a particular sub-band amongst a plurality of sub-bands. For example, in response to determining that a NACK transmission is transmitted to the base station, the UE 1400 may determine to include an RI with the SB-CSI report for transmission to the base station. In some aspects, the RI may indicate to the base station a quantity of sub-bands utilized by the PDSCH transmission that are able to be supported by the UE 1400.

In some aspects, the base station may transmit to the UE 1400 a table through RRC signal or a medium access control (MAC) control element (MAC-CE) to correlate bit values with types of SB-CSI report transmissions. The UE 1400 may also provide an indication (e.g., one or more bit values) based on the table in an ACK transmission or a NACK transmission to the base station and in response to receiving the PDSCH transmission so that the base station expects to receive a particular type of SB-CSI report from the UE 1400. FIGS. 10, 11, 12, 13A, and 13B, described herein, are illustrations of tables correlating bits values with acknowledgement (ACK) transmission and negative acknowledgement (NACK) transmission types according to some aspects. As described herein, based on the tables received from the base station, the UE 1400 may transmit a bit value to the base station indicating a NACK or an ACK and whether the base station should expect to receive SB reporting with full resolution, SB reporting without full resolution, or a CSI configured report as well as whether the base station should expect to receive a SB rank indication or a WB rank indication.

In some aspects, before receiving the PDSCH transmission from the base station, the UE 1400 may receive downlink control information (DCI) associated with the PDSCH transmission. The DCI may indicate a first modulation coding scheme (MCS) value associated with the PDSCH transmission. The UE 1400 may also configure the reception of the DCI for receiving the PDSCH transmission. Subsequently, the UE 1400 may receive the PDSCH transmission from the base station and measure a second MCS value associated with the received PDSCH transmission. The UE 1400 may determine whether to transmit a rank indication (RI) per sub-band, for example, with an SB-CSI report with full resolution for reception by the base station based on a threshold difference between the first MCS value and the second MCS value. For example, when the difference between the first MCS value and the second MCS value is greater than the threshold difference, the UE 1400 may transmit the rank indication per sub-band. However, when the difference between the first MCS value and the second MCS value is no greater than the threshold difference, the UE 1400 may abstain from transmitting the rank indication per sub-band. In some examples, the UE 1400 may determine whether to transmit a wideband (WB) rank indication (RI), for example, with a CSI configured report for reception by the base station based on a threshold difference between the first MCS value and the second MCS value. For example, when the difference between the first MCS value and the second MCS value is greater than the threshold difference, the UE 1400 may transmit the WB rank indication. However, when the difference between the first MCS value and the second MCS value is no greater than the threshold difference, the UE 1400 may abstain from transmitting the WB rank indication. It should be understood that the threshold difference between the first MCS value and the second MCS value used to determine whether to include the RI per sub-band with the SB-CSI report may be the same threshold difference or a different threshold difference used to determine whether to include the WB RI with CSI configured report.

Figure 16:
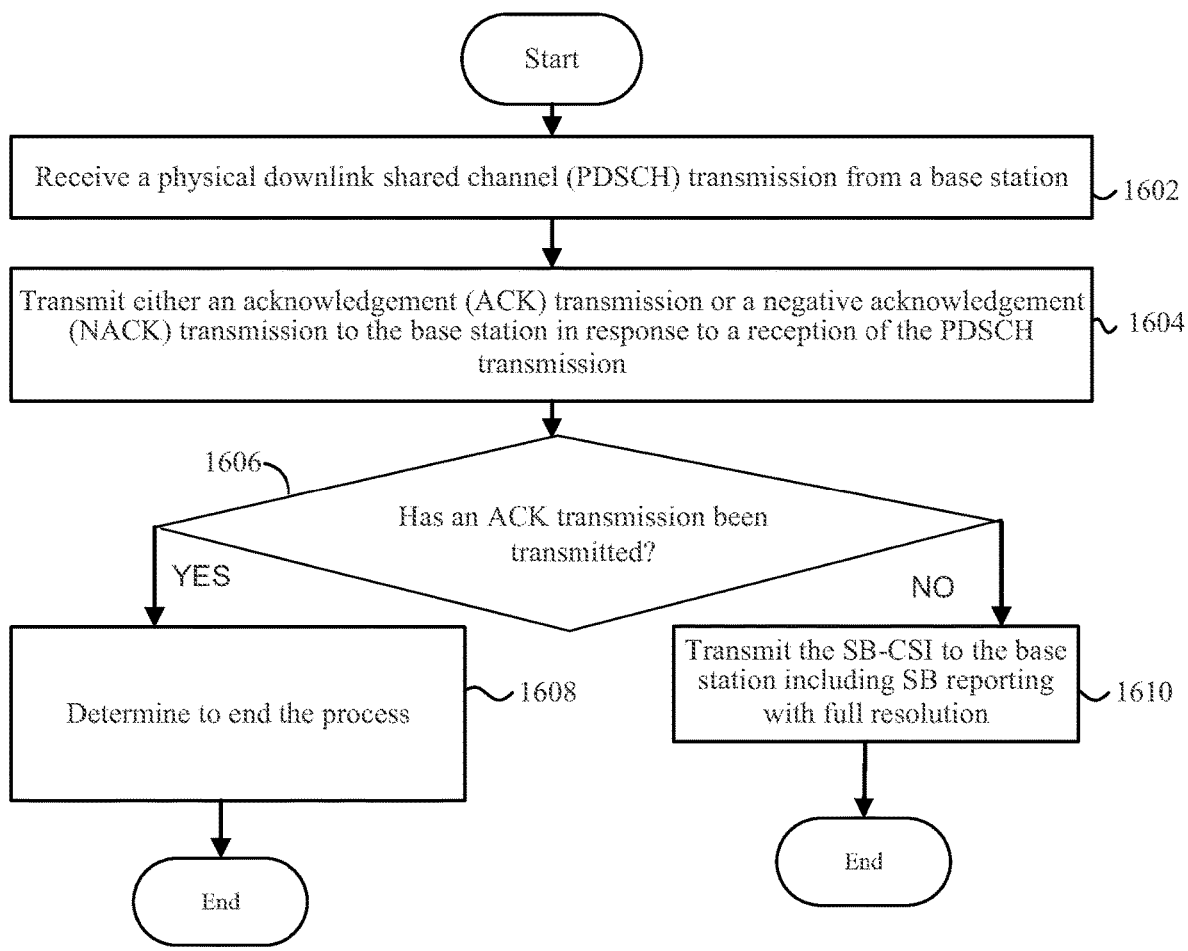
FIG. 16 is a flow chart of a second example method for reporting SB-CSI according to some aspects.

FIG. 16 is a flow chart 1600 of a method for reporting sub-band (SB) channel state information (SB-CSI) according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 1602, the UE 1400 may receive a physical downlink shared channel (PDSCH) transmission from a base station. The features of block 1602 may be the same as or at least similar to one or more features described herein at least with respect to block 1502 of FIG. 15. At block 1604, the UE 1400 may transmit either an acknowledgement (ACK) transmission or a negative acknowledgement (NACK) transmission to the base station in response to a reception of the PDSCH transmission. The features of block 1604 may be the same as or at least similar to one or more features described herein at least with respect to block 1504 of FIG. 15.

At block 1606, the UE 1400 may determine whether an ACK transmission has been transmitted to the base station. If the UE 1400 determines that an ACK transmission has been transmitted to the base station, for example, in response to a reception of the PDSCH transmission, then, at block 1608, the UE 1400 may determine to end the process. For example, the UE 1400 may determine not to transmit an SB-CSI report to the base station. If the UE 1400 determines that an ACK transmission has not be transmitted to the base station, for example, in response to a reception of the PDSCH transmission, then, at block 1610, the UE 1400 may transmit the SB-CSI report to the base station with SB reporting with full resolution.

Figure 17:
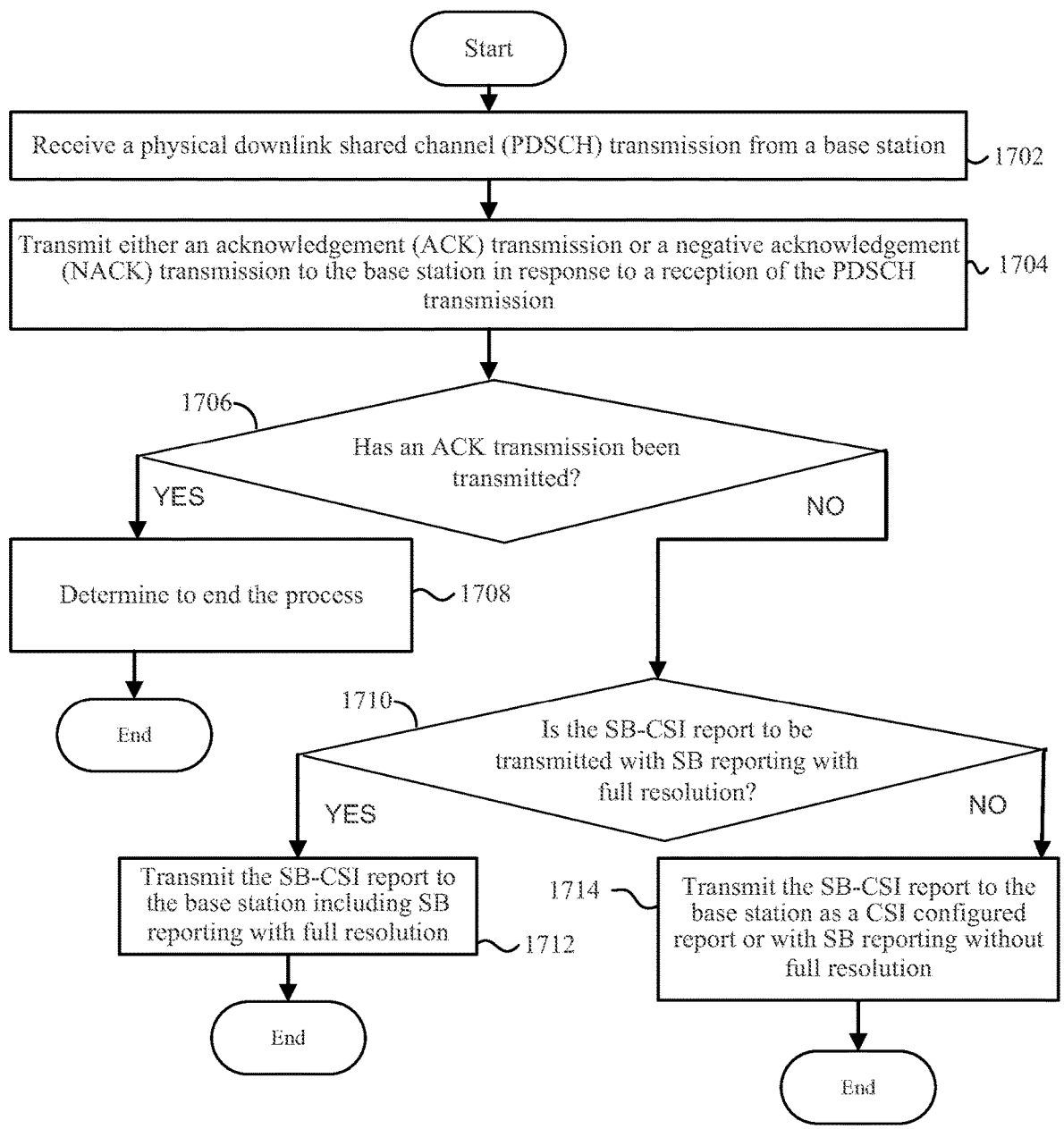
FIG. 17 is a flow chart of a third example method for reporting SB-CSI according to some aspects.

FIG. 17 is a flow chart 1700 of a method for reporting sub-band (SB) channel state information (SB-CSI) according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 1702, the UE 1400 may receive a physical downlink shared channel (PDSCH) transmission from a base station. The features of block 1702 may be the same as or at least similar to one or more features described herein at least with respect to block 1502 of FIG. 15. At block 1704, the UE 1400 may transmit either an acknowledgement (ACK) transmission or a negative acknowledgement (NACK) transmission to the base station in response to a reception of the PDSCH transmission. The features of block 1704 may be the same as or at least similar to one or more features described herein at least with respect to block 1504 of FIG. 15.

At block 1706, the UE 1400 may determine whether an ACK transmission has been transmitted to the base station. If the UE 1400 determines that an ACK transmission has been transmitted to the base station, for example, in response to a reception of the PDSCH transmission, then, at block 1708, the UE 1400 may determine to end the process. For example, the UE 1400 may determine not to transmit an SB-CSI report to the base station. If the UE 1400 determines that an ACK transmission has not be transmitted to the base station, for example, in response to a reception of the PDSCH transmission, then, at block 1710, the UE 1400 may determine whether the SB-CSI report is to be transmitted to the base station as a SB-CSI report with full resolution. If the UE 1400 determines that the SB-CSI report is to be transmitted to the base station as an SB-CSI report with full resolution, then, at block 1712, the UE 1400 may transmit the SB-CSI report to the base station with SB reporting with full resolution. If the UE 1400 determines that the SB-CSI report is not to be transmitted to the base station as an SB-CSI report with full resolution, then, at block 1714, the UE 1400 may transmit the SB-CSI report to the base station as a CSI configured report or with SB reporting without full resolution.

Figure 18:
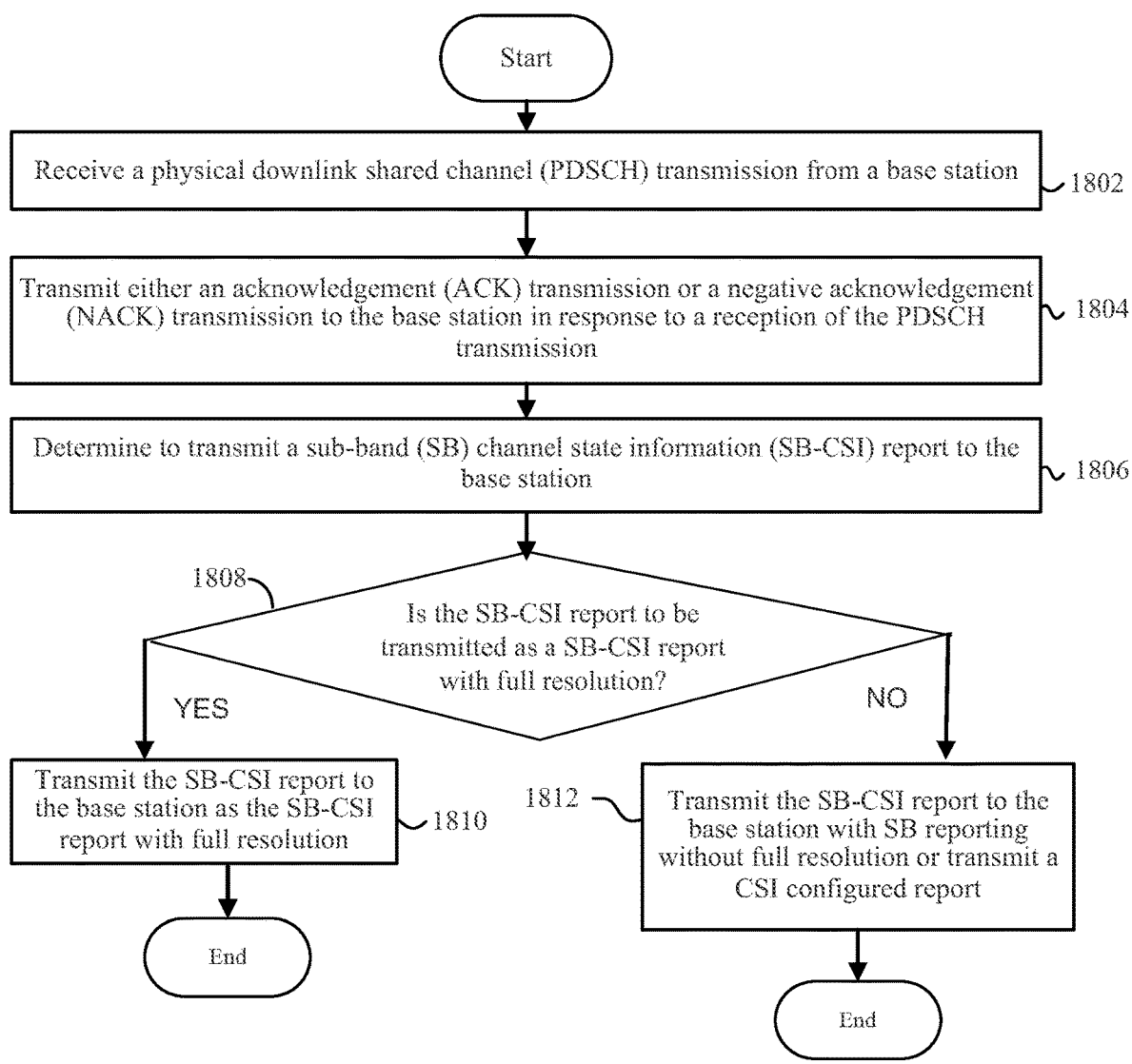
FIG. 18 is a flow chart of a fourth example method for reporting SB-CSI according to some aspects.

FIG. 18 is a flow chart 1800 of a method for reporting sub-band (SB) channel state information (SB-CSI) according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 1802, the UE 1400 may receive a physical downlink shared channel (PDSCH) transmission from a base station. The features of block 1802 may be the same as or at least similar to one or more features described herein at least with respect to block 1502 of FIG. 15. At block 1804, the UE 1400 may transmit either an acknowledgement (ACK) transmission or a negative acknowledgement (NACK) transmission to the base station in response to a reception of the PDSCH transmission. The features of block 1804 may be the same as or at least similar to one or more features described herein at least with respect to block 1504 of FIG. 15.

At block 1806, the UE 1400 may determine to transmit an SB-CSI report to the base station. For example, regardless of whether the UE 1400 transmits an ACK transmission or a NACK transmission, the UE 1400 may subsequently determine to transmit an SB-CSI report to the base station. At block 1808, the UE 1400 may determine whether the SB-CSI report is to be transmitted to the base station as a SB-CSI report with full resolution. If the UE 1400 determines that the SB-CSI report is to be transmitted to the base station as an SB-CSI report with full resolution, then, at block 1810, the UE 1400 may transmit the SB-CSI report to the base station as an SB-CSI report with full resolution. If the UE 1400 determines that the SB-CSI report is not to be transmitted to the base station as an SB-CSI report with full resolution, then, at block 1812, the UE 1400 may transmit the SB-CSI report to the base station with SB reporting without full resolution or the UE 1400 may transmit a CSI configured report.

Figure 19:
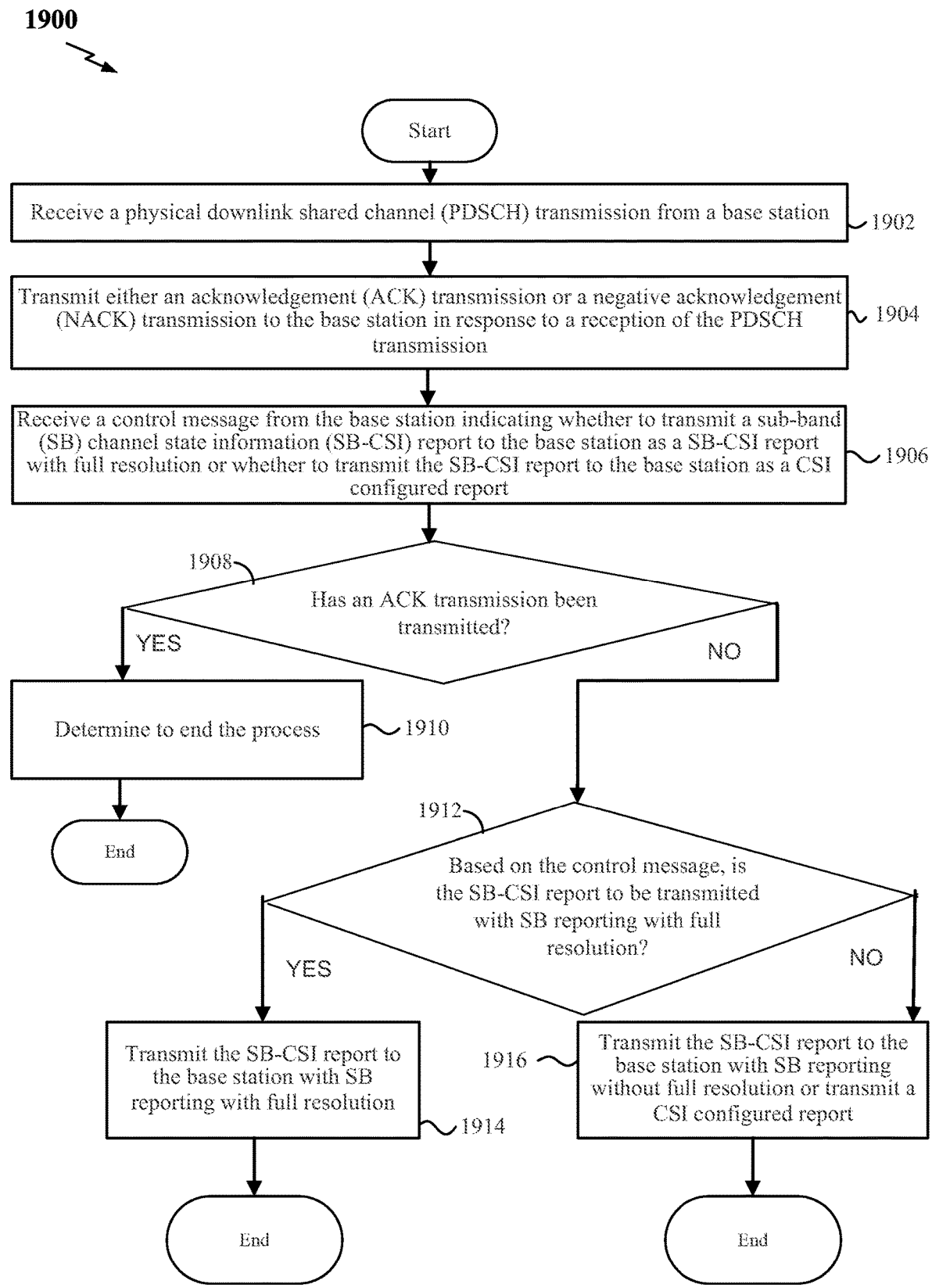
FIG. 19 is a flow chart of a fifth example method for reporting SB-CSI according to some aspects.

FIG. 19 is a flow chart 1900 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 1902, the UE 1400 may receive a physical downlink shared channel (PDSCH) transmission from a base station. The features of block 1902 may be the same as or at least similar to one or more features described herein at least with respect to block 1502 of FIG. 15. At block 1904, the UE 1400 may transmit either an acknowledgement (ACK) transmission or a negative acknowledgement (NACK) transmission to the base station in response to a reception of the PDSCH transmission. The features of block 1904 may be the same as or at least similar to one or more features described herein at least with respect to block 1504 of FIG. 15.

At block 1906, the UE 1400 may receive a control message from the base station indicating whether to transmit an SB-CSI report to the base station as an SB-CSI report with full resolution or whether to transmit the SB-CSI report as a CSI configured report. In some aspects, the control message may include at least one of a radio resource control (RRC) message, a medium access control (MAC) control element (MAC-CE), or a downlink control information (DCI).

At block 1908, the UE 1400 may determine whether an ACK transmission has been transmitted to the base station. If the UE 1400 determines that an ACK transmission has been transmitted to the base station, for example, in response to a reception of the PDSCH transmission, then, at block 1910, the UE 1400 may determine to end the process. For example, the UE 1400 may determine not to transmit an SB-CSI report to the base station. If the UE 1400 determines that an ACK transmission has not be transmitted to the base station, for example, in response to a reception of the PDSCH transmission, then, at block 1912, the UE 1400 may determine whether the SB-CSI report is to be transmitted to the base station is to include SB reporting with full resolution. If the UE 1400 determines that the SB-CSI report is to be transmitted to the base station including SB reporting with full resolution, then, at block 1914, the UE 1400 may transmit the SB-CSI report to the base station including SB reporting with full resolution. If the UE 1400 determines that the SB-CSI report is not to be transmitted to the base station including SB reporting with full resolution, then, at block 1916, the UE 1400 may transmit the SB-CSI report to the base station including SB reporting without full resolution or the UE 1400 may transmit a CSI configured report.

Figure 20:
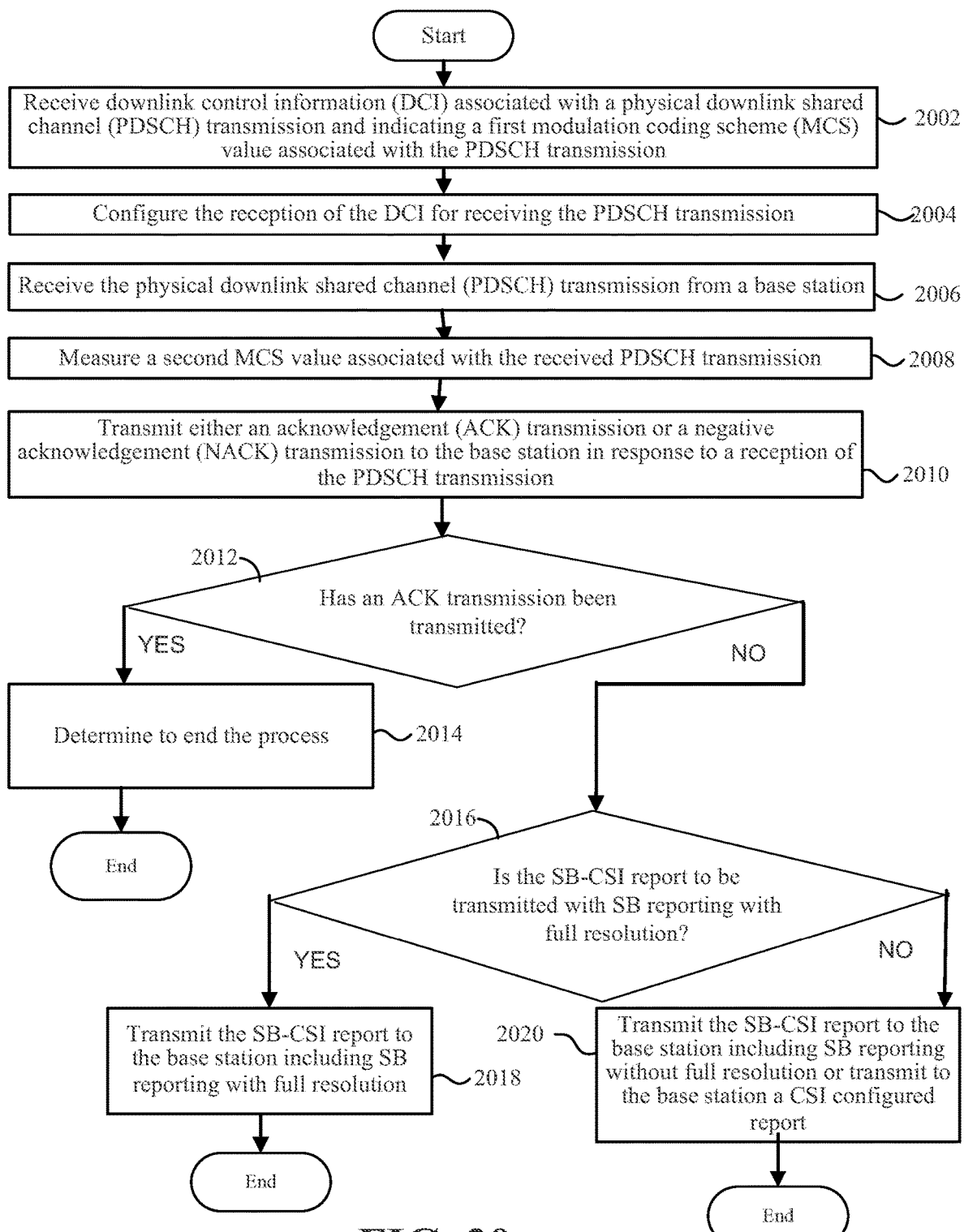
FIG. 20 is a flow chart of a sixth example method for reporting SB-CSI according to some aspects.

FIG. 20 is a flow chart 2000 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 2002, the UE 1400 may receive downlink control information (DCI) associated with a PDSCH transmission and indicating a first modulation code scheme (MCS) value associated with the PDSCH transmission. At block 2004, the UE 1400 may configure the reception of the DCI for receiving the PDSCH transmission. At block 2006, the UE 1400 may receive a physical downlink shared channel (PDSCH) transmission from a base station. The features of block 2006 may be the same as or at least similar to one or more features described herein at least with respect to block 1502 of FIG. 15. At block 2008, the UE 1400 may measure a second MCS value associated with the PDSCH transmission. At block 2010, the UE 1400 may transmit either an acknowledgement (ACK) transmission or a negative acknowledgement (NACK) transmission to the base station in response to a reception of the PDSCH transmission. The features of block 2010 may be the same as or at least similar to one or more features described herein at least with respect to block 1504 of FIG. 15.

At block 2012, the UE 1400 may determine whether an ACK transmission has been transmitted to the base station. If the UE 1400 determines that an ACK transmission has been transmitted to the base station, for example, in response to a reception of the PDSCH transmission, then, at block 2014, the UE 1400 may determine to end the process. For example, the UE 1400 may determine not to transmit an SB-CSI report to the base station. If the UE 1400 determines that an ACK transmission has not be transmitted to the base station, for example, in response to a reception of the PDSCH transmission, then, at block 2016, the UE 1400 may determine whether the SB-CSI report is to be transmitted to the base station with SB reporting with full resolution. If the UE 1400 determines that the SB-CSI report is to be transmitted to the base station with SB reporting with full resolution, then, at block 2018, the UE 1400 may transmit the SB-CSI report to the base station as an SB-CSI report with full resolution. If the UE 1400 determines that the SB-CSI report is not to be transmitted to the base station with SB reporting with full resolution, then, at block 2020, the UE 1400 may transmit the SB-CSI report to the base station with SB reporting without full resolution or the UE 1400 may transmit a CSI configured report.

Figure 21:
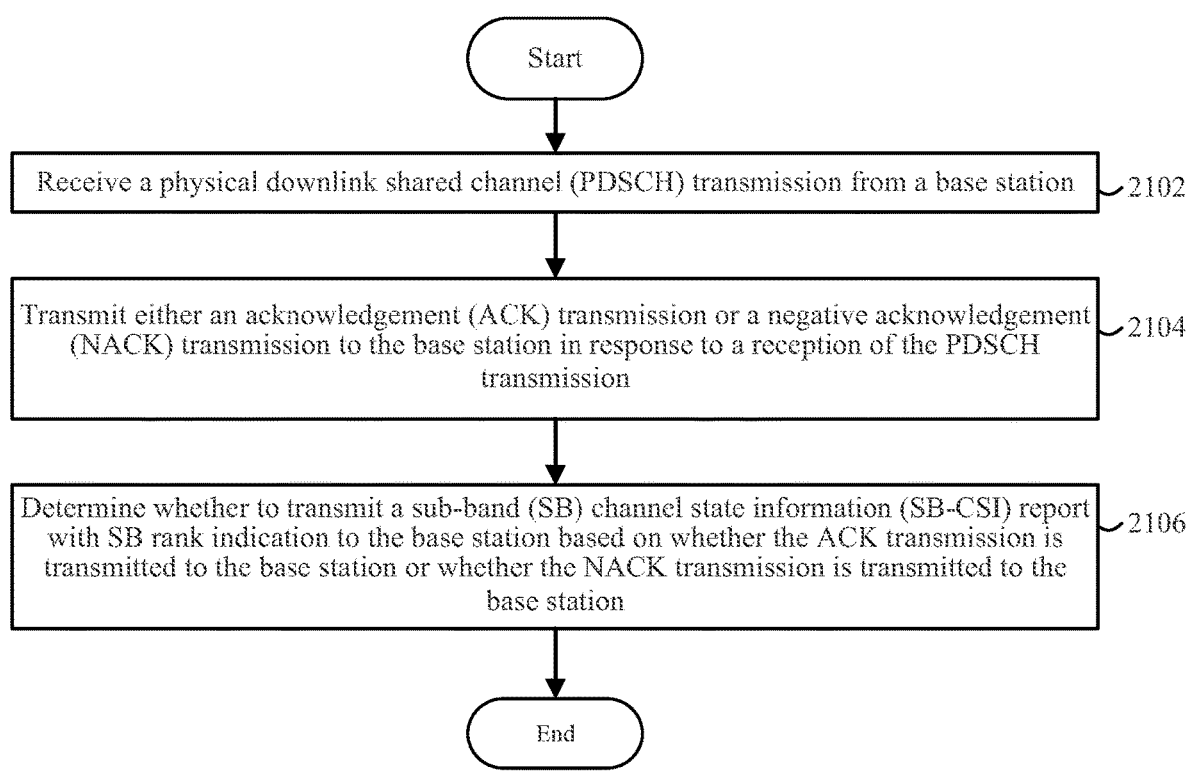
FIG. 21 is a flow chart of a seventh example method for reporting SB-CSI according to some aspects.

FIG. 21 is a flow chart 2100 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 2102, the UE 1400 may receive a physical downlink shared channel (PDSCH) transmission from a base station. At block 2104, the UE 1400 may transmit either an acknowledgement (ACK) transmission or a negative acknowledgement (NACK) transmission to the base station in response to a reception of the PDSCH transmission. At block 2106, the UE 1400 may determine whether to transmit an SB-CSI report with a rank indication (RI) to the base station based on whether the ACK transmission is transmitted to the base station or whether the NACK transmission is transmitted to the base station.

Figure 22:
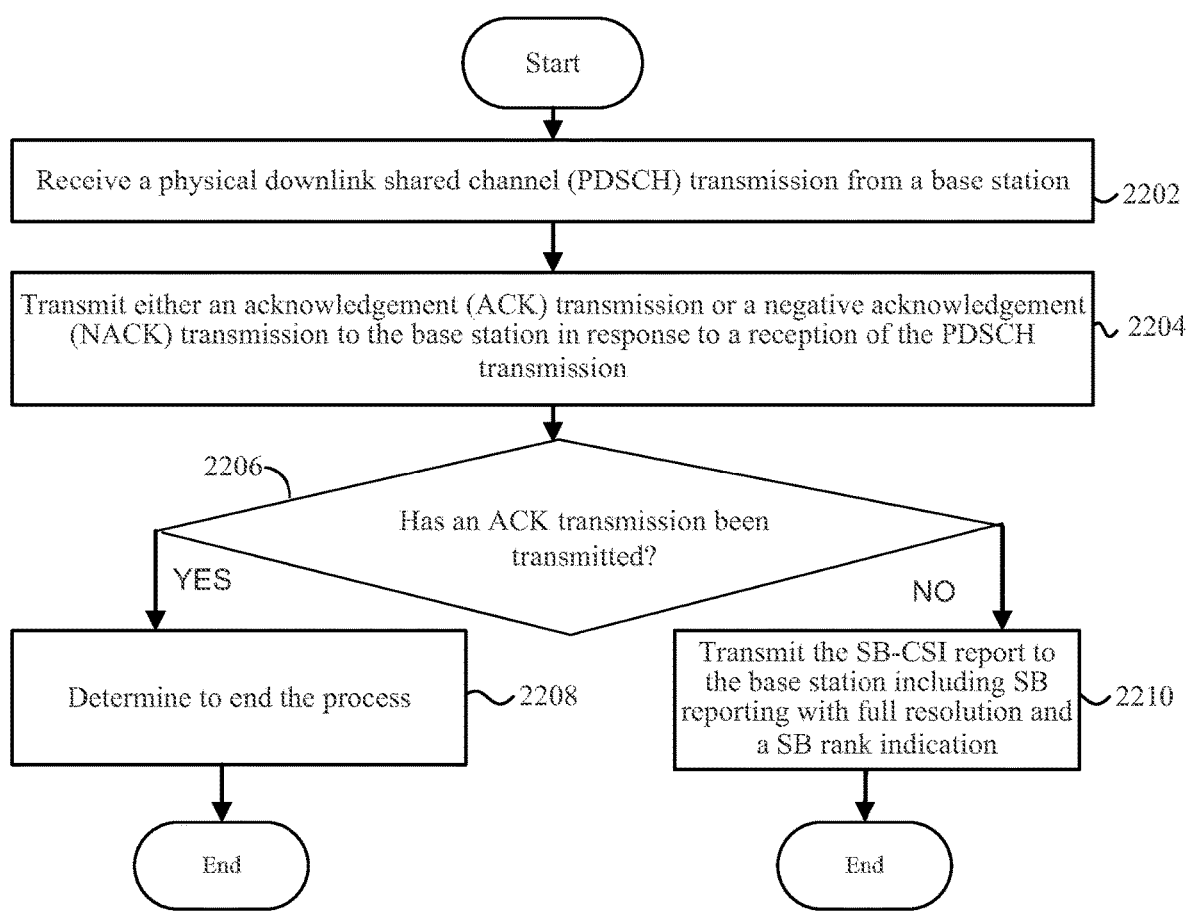
FIG. 22 is a flow chart of an eighth example method for reporting SB-CSI according to some aspects.

FIG. 22 is a flow chart 2200 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 2202, the UE 1400 may receive a physical downlink shared channel (PDSCH) transmission from a base station. The features of block 2202 may be the same as or at least similar to one or more features described herein at least with respect to block 1502 of FIG. 15. At block 2204, the UE 1400 may transmit either an acknowledgement (ACK) transmission or a negative acknowledgement (NACK) transmission to the base station in response to a reception of the PDSCH transmission. The features of block 2204 may be the same as or at least similar to one or more features described herein at least with respect to block 1504 of FIG. 15.

At block 2206, the UE 1400 may determine whether an ACK transmission has been transmitted to the base station. If the UE 1400 determines that an ACK transmission has been transmitted to the base station, for example, in response to a reception of the PDSCH transmission, then, at block 2208, the UE 1400 may determine to end the process. For example, the UE 1400 may determine not to transmit an SB-CSI report to the base station. If the UE 1400 determines that an ACK transmission has not be transmitted to the base station, for example, in response to a reception of the PDSCH transmission, then, at block 2210, the UE 1400 may transmit the SB-CSI report to the base station with SB reporting with full resolution and one or more SB rank indications.

Figure 23:
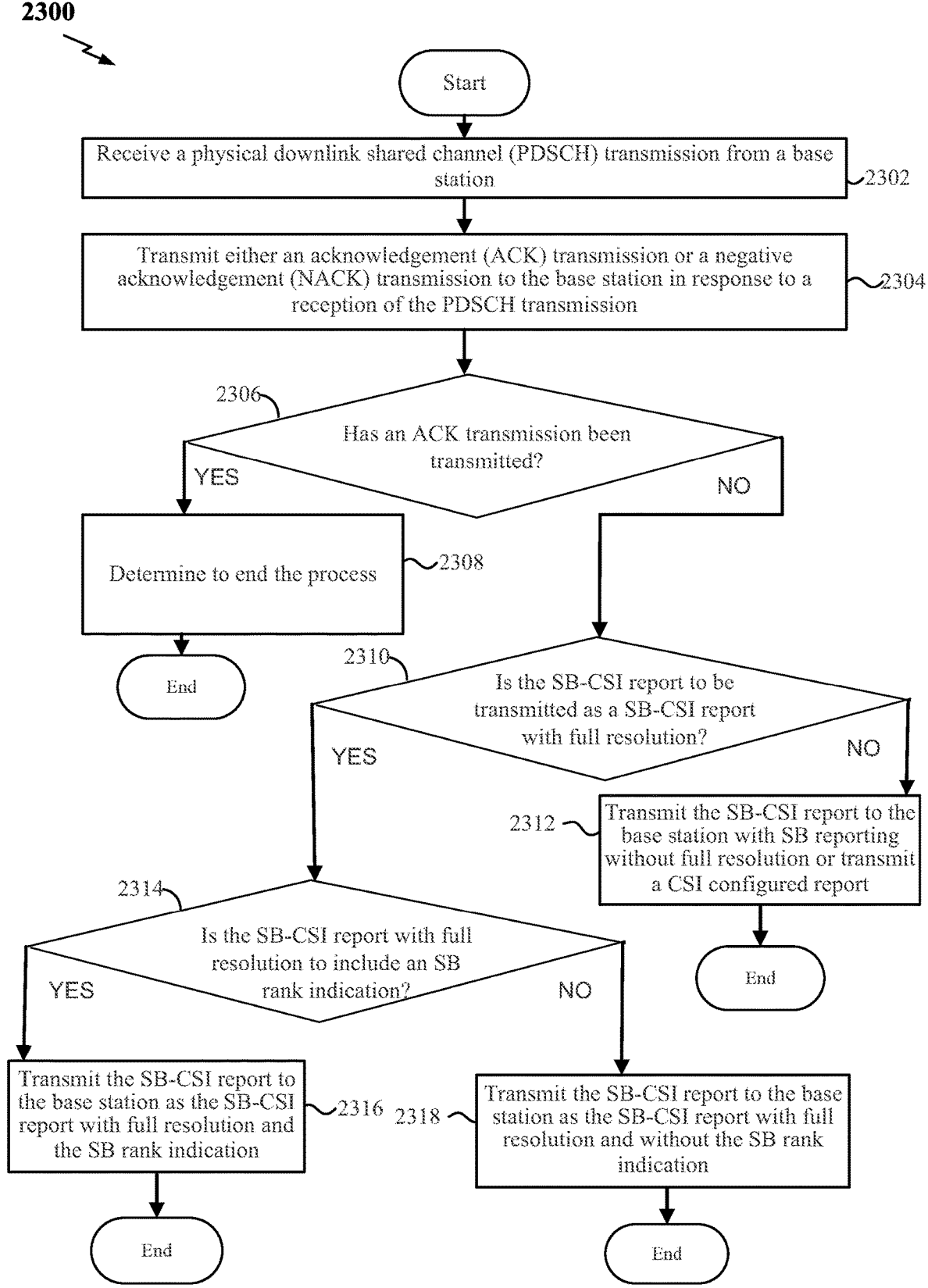
FIG. 23 is a flow chart of a ninth example method for reporting SB-CSI according to some aspects.

FIG. 23 is a flow chart 2300 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 2302, the UE 1400 may receive a physical downlink shared channel (PDSCH) transmission from a base station. The features of block 2302 may be the same as or at least similar to one or more features described herein at least with respect to block 1502 of FIG. 15. At block 2304, the UE 1400 may transmit either an acknowledgement (ACK) transmission or a negative acknowledgement (NACK) transmission to the base station in response to a reception of the PDSCH transmission. The features of block 2304 may be the same as or at least similar to one or more features described herein at least with respect to block 1504 of FIG. 15.

At block 2306, the UE 1400 may determine whether an ACK transmission has been transmitted to the base station. If the UE 1400 determines that an ACK transmission has been transmitted to the base station, for example, in response to a reception of the PDSCH transmission, then, at block 2308, the UE 1400 may determine to end the process. For example, the UE 1400 may determine not to transmit an SB-CSI report to the base station. If the UE 1400 determines that an ACK transmission has not be transmitted to the base station, for example, in response to a reception of the PDSCH transmission, then, at block 2310, the UE 1400 may determine whether the SB-CSI report is to be transmitted to the base station as a SB-CSI report with full resolution. If the UE 1400 determines that the SB-CSI report is not to be transmitted to the base station as an SB-CSI report with full resolution, then, at block 2312, the UE 1400 may transmit the SB-CSI report to the base station with SB reporting without full resolution or the UE 1400 may transmit a CSI configured report. If the UE 1400 determines that the SB-CSI report is to be transmitted to the base station as an SB-CSI report with full resolution, then, at block 2314, the UE 1400 may determine whether the SB-CSI report with full resolution is to include an SB rank indication (RI). If the UE 1400 determines that the SB-CSI report with full resolution is to include an SB RI, then, at block 2316, the UE 1400 may transmit the SB-CSI report to the base station as an SB-CSI report with full resolution and one or more SB rank indications. If the UE 1400 determines that the SB-CSI report with full resolution is not to include an RI, then, at block 2318, the UE 1400 may transmit the SB-CSI report to the base station as an SB-CSI report with full resolution and without SB rank indication.

Figure 24:
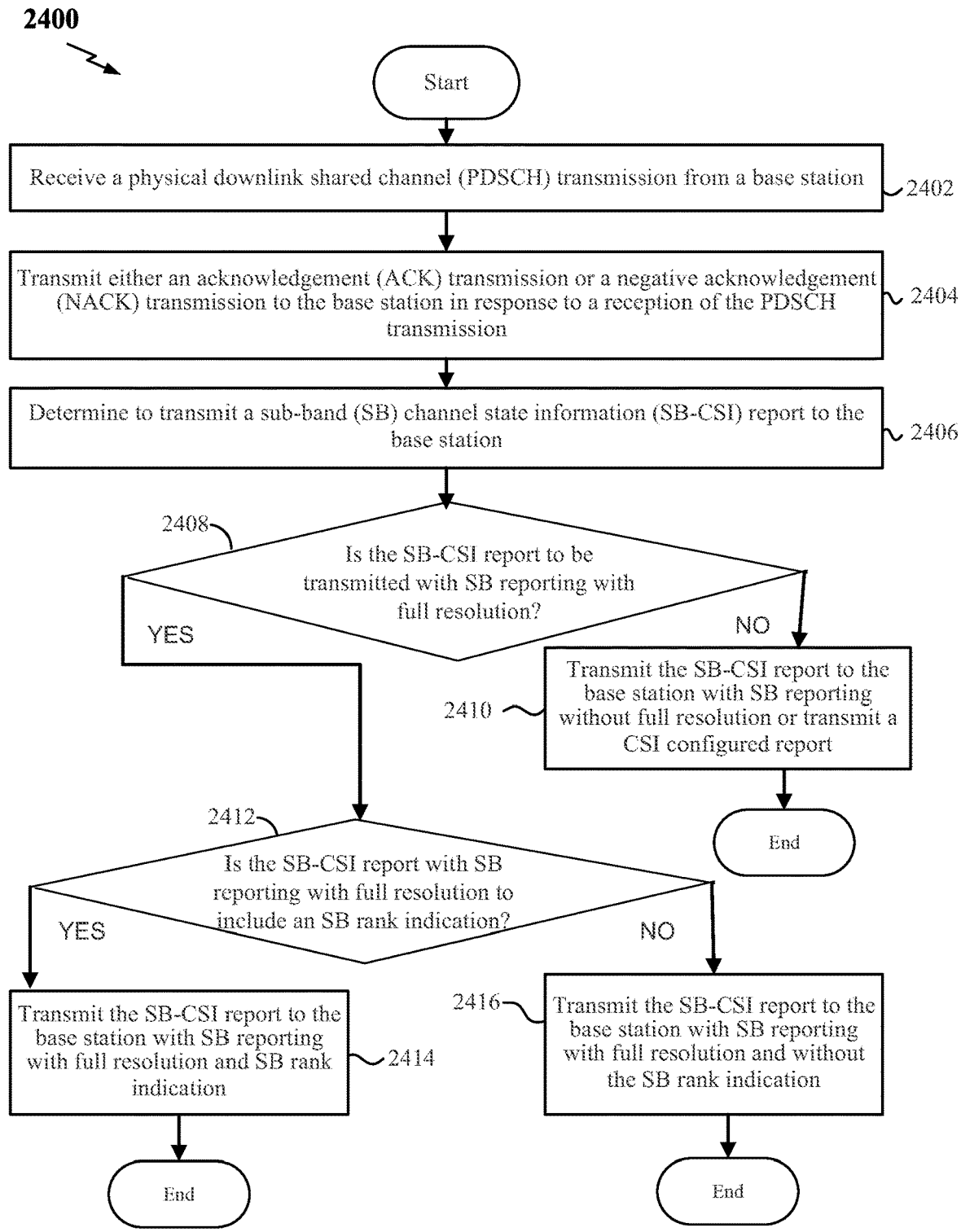
FIG. 24 is a flow chart of a tenth example method for reporting SB-CSI according to some aspects.

FIG. 24 is a flow chart 1800 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 2402, the UE 1400 may receive a physical downlink shared channel (PDSCH) transmission from a base station. The features of block 2402 may be the same as or at least similar to one or more features described herein at least with respect to block 1502 of FIG. 15. At block 2404, the UE 1400 may transmit either an acknowledgement (ACK) transmission or a negative acknowledgement (NACK) transmission to the base station in response to a reception of the PDSCH transmission. The features of block 2404 may be the same as or at least similar to one or more features described herein at least with respect to block 1504 of FIG. 15.

At block 2406, the UE 1400 may determine to transmit an SB-CSI report to the base station. For example, regardless of whether the UE 1400 transmits an ACK transmission or a NACK transmission, the UE 1400 may subsequently determine to transmit an SB-CSI report to the base station. At block 2408, the UE 1400 may determine whether the SB-CSI report is to be transmitted to the base station with SB reporting with full resolution. If the UE 1400 determines that the SB-CSI report is not to be transmitted to the base station with SB reporting with full resolution, then, at block 2410, the UE 1400 may transmit the SB-CSI report to the base station with SB reporting without full resolution or the UE 1400 may transmit a CSI configured report. If the UE 1400 determines that the SB-CSI report is to be transmitted to the base station with SB reporting with full resolution, then, at block 2412, the UE 1400 may determine whether the SB-CSI report with SB reporting with full resolution is to include an SB rank indication (RI). If the UE 1400 determines that the SB-CSI report with SB reporting with full resolution is to include an SB RI, then, at block 2414, the UE 1400 may transmit the SB-CSI report to the base station with SB reporting with full resolution and one or more SB rank indications. If the UE 1400 determines that the SB-CSI report with full resolution is not to include an SB RI, then, at block 2416, the UE 1400 may transmit the SB-CSI report to the base station with SB reporting with full resolution and without an SB rank indication.

Figure 25:
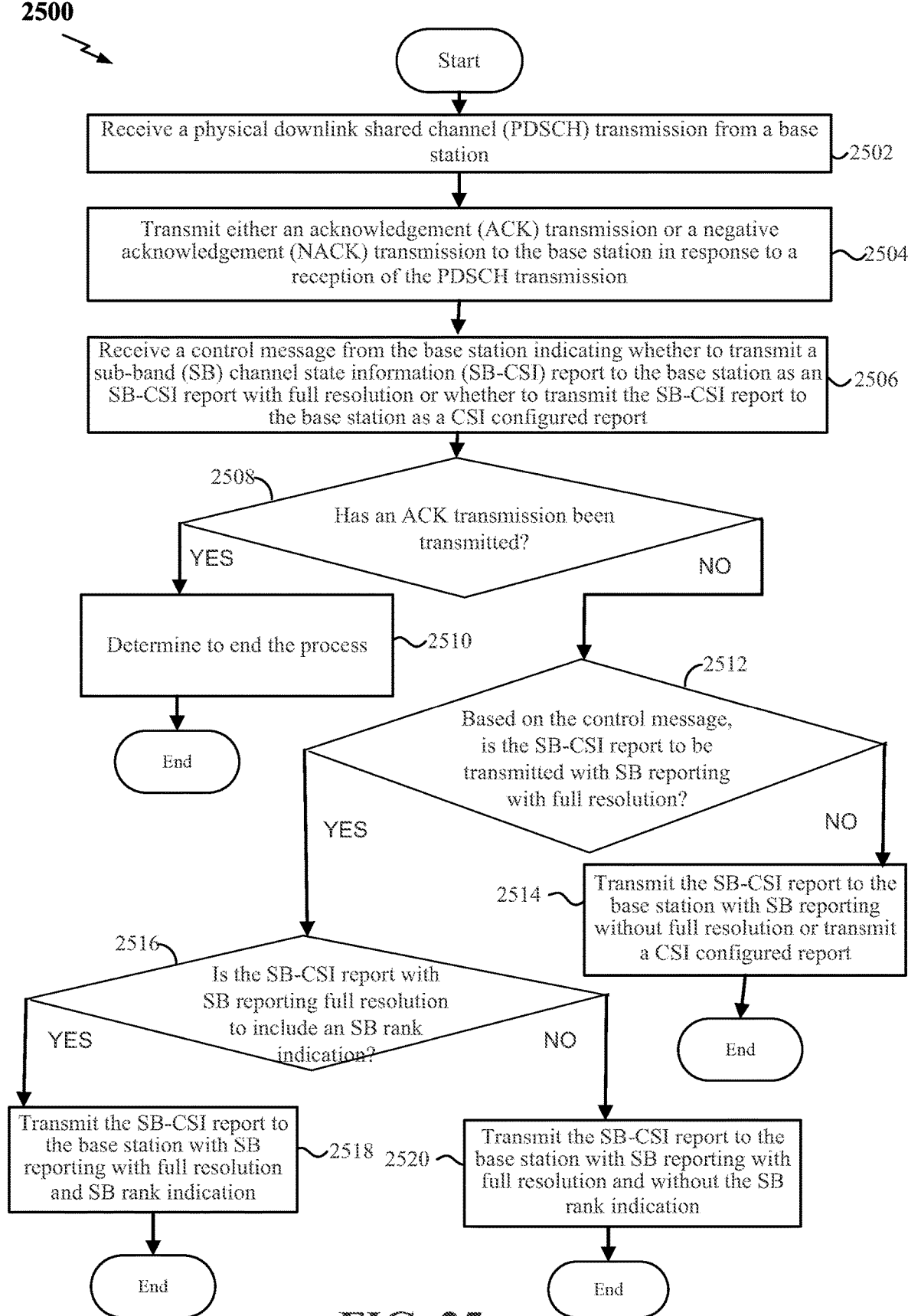
FIG. 25 is a flow chart of an eleventh example method for reporting SB-CSI according to some aspects.

FIG. 25 is a flow chart 2500 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 2502, the UE 1400 may receive a physical downlink shared channel (PDSCH) transmission from a base station. The features of block 2502 may be the same as or at least similar to one or more features described herein at least with respect to block 1502 of FIG. 15. At block 2504, the UE 1400 may transmit either an acknowledgement (ACK) transmission or a negative acknowledgement (NACK) transmission to the base station in response to a reception of the PDSCH transmission. The features of block 2504 may be the same as or at least similar to one or more features described herein at least with respect to block 1504 of FIG. 15.

At block 2506, the UE 1400 may receive a control message from the base station indicating whether to transmit an SB-CSI report to the base station as an SB-CSI report with full resolution or whether to transmit the SB-CSI report as a CSI configured report. In some aspects, the control message may include at least one of a radio resource control (RRC) message, a medium access control (MAC) control element (MAC-CE), or a downlink control information (DCI).

At block 2508, the UE 1400 may determine whether an ACK transmission has been transmitted to the base station. If the UE 1400 determines that an ACK transmission has been transmitted to the base station, for example, in response to a reception of the PDSCH transmission, then, at block 2510, the UE 1400 may determine to end the process. For example, the UE 1400 may determine not to transmit an SB-CSI report to the base station. If the UE 1400 determines that an ACK transmission has not be transmitted to the base station, for example, in response to a reception of the PDSCH transmission, then, at block 2512, the UE 1400 may, based on the control message, determine whether the SB-CSI report is to be transmitted to the base station with SB reporting with full resolution. If the UE 1400 determines that the SB-CSI report is not to be transmitted to the base station with SB reporting with full resolution, then, at block 2514, the UE 1400 may transmit the SB-CSI report to the base station with SB reporting without full resolution or the UE 1400 may transmit a CSI configured report. If the UE 1400 determines that the SB-CSI report is to be transmitted to the base station with SB reporting with full resolution, then, at block 2516, the UE 1400 may determine whether the SB-CSI report with SB reporting with full resolution is to include an SB rank indication (RI). If the UE 1400 determines that the SB-CSI report with SB reporting with full resolution is to include an SB RI, then, at block 2518, the UE 1400 may transmit the SB-CSI report to the base station with SB reporting with full resolution and one or more SB rank indications. If the UE 1400 determines that the SB-CSI report with SB reporting with full resolution is not to include an SB RI, then, at block 2520, the UE 1400 may transmit the SB-CSI report to the base station with SB reporting with full resolution and without an SB RI.

Figure 26:
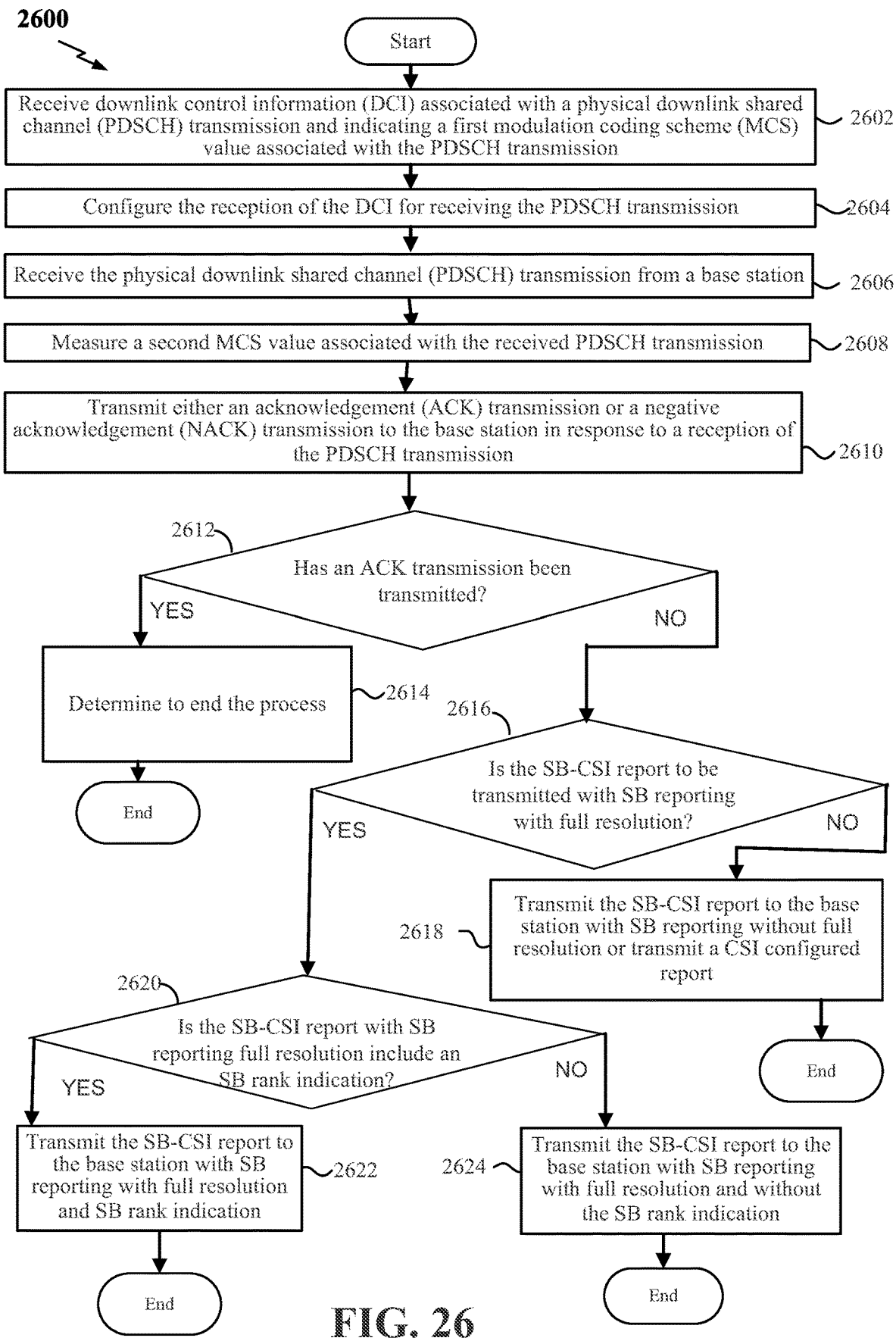
FIG. 26 is a flow chart of a twelfth example method for reporting SB-CSI according to some aspects.

FIG. 26 is a flow chart 2600 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 2602, the UE 1400 may receive downlink control information (DCI) associated with a PDSCH transmission and indicating a first modulation code scheme (MCS) value associated with the PDSCH transmission. At block 2604, the UE 1400 may configure the reception of the DCI for receiving the PDSCH transmission. At block 2606, the UE 1400 may receive a physical downlink shared channel (PDSCH) transmission from a base station. The features of block 2606 may be the same as or at least similar to one or more features described herein at least with respect to block 1502 of FIG. 15. At block 2608, the UE 1400 may measure a second MCS value associated with the PDSCH transmission. At block 2610, the UE 1400 may transmit either an acknowledgement (ACK) transmission or a negative acknowledgement (NACK) transmission to the base station in response to a reception of the PDSCH transmission. The features of block 2610 may be the same as or at least similar to one or more features described herein at least with respect to block 1504 of FIG. 15.

At block 2612, the UE 1400 may determine whether an ACK transmission has been transmitted to the base station. If the UE 1400 determines that an ACK transmission has been transmitted to the base station, for example, in response to a reception of the PDSCH transmission, then, at block 2614, the UE 1400 may determine to end the process. For example, the UE 1400 may determine not to transmit an SB-CSI report to the base station. If the UE 1400 determines that an ACK transmission has not be transmitted to the base station, for example, in response to a reception of the PDSCH transmission, then, at block 2616, the UE 1400 may determine whether the SB-CSI report is to be transmitted to the base station with SB reporting with full resolution. If the UE 1400 determines that the SB-CSI report is not to be transmitted to the base station with SB reporting with full resolution, then, at block 2618, the UE 1400 may transmit the SB-CSI report to the base station with SB reporting without full resolution or the UE 1400 may transmit a CSI configured report to the base station. If the UE 1400 determines that the SB-CSI report is to be transmitted to the base station with SB reporting with full resolution, then, at block 2620, the UE 1400 may determine whether the SB-CSI report with SB reporting with full resolution is to include an SB rank indication (RI). If the UE 1400 determines that the SB-CSI report with SB reporting with full resolution is to include SB RI, then, at block 2622, the UE 1400 may transmit the SB-CSI report to the base station with SB reporting with full resolution and one or more SB RIs. If the UE 1400 determines that the SB-CSI report with SB reporting with full resolution is not to include an SB RI, then, at block 2624, the UE 1400 may transmit the SB-CSI report to the base station with SB reporting with full resolution and without SB RI.

In one configuration, the UE 1400 includes means for performing the various functions and processes described in relation to FIGS. 15, 16, 17, 18, 19, 20, 21, 22, 23, 24, 25, and 26. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-4 and 7 and utilizing, for example, the processes and/or algorithms described herein in relation to FIGS. 15, 16, 17, 18, 19, 20, 21, 22, 23, 24, 25, and 26.

Figure 27:
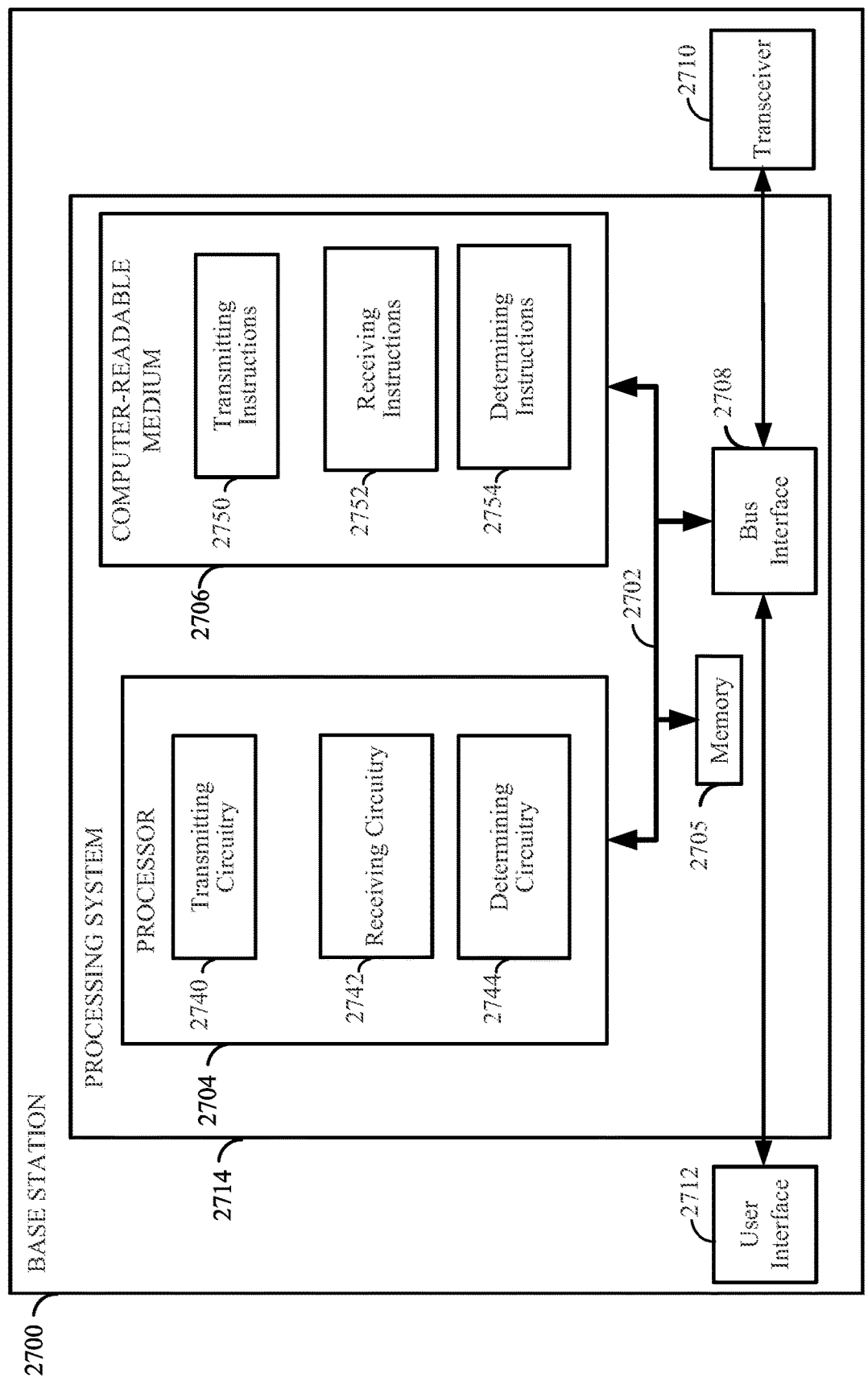
FIG. 27 is a block diagram conceptually illustrating an example of a hardware implementation for a base station according to some aspects.

FIG. 27 is a block diagram illustrating an example of a hardware implementation for a network entity or a base station 2700 employing a processing system 2714 according to some aspects. For example, the network entity or the base station 2700 may correspond to any of the devices or systems shown and described herein in any one or more of FIGS. 1-4 and 7.

In accordance with various aspects of the disclosure, an element, or any portion of an element, or any combination of elements may be implemented with a processing system 2714 that includes one or more processors 2704. The processing system 2714 may be substantially the same as the processing system 1414 illustrated in FIG. 14, including a bus interface 2708, a bus 2702, a processor 2704, and a computer-readable storage medium 2706. Furthermore, the base station 2700 may include a user interface 2712 and a transceiver 2710 substantially similar to those described above in FIG. 14. That is, the processor 2704, as utilized in the base station 2700, may be used to implement any one or more of the processes described herein.

In some aspects of the disclosure, the processor 2704 may include circuitry configured for various functions. For example, the processor 2704 may include transmitting circuitry 2740 configured to transmit a physical downlink shared channel (PDSCH) transmission to a user equipment (UE). The transmitting circuitry 2740 may also be configured to transmit downlink control information (DCI) associated with the PDSCH transmission, where the DCI indicates a first modulation coding scheme (MCS) value associated with the PDSCH transmission. The transmitting circuitry 2740 may further be configured to transmit a control message to the UE indicating whether the UE is to transmit the SB-CSI report as the SB-CSI report with full resolution or whether to the UE is to transmit the SB-CSI report as a CSI configured report. The transmitting circuitry 2740 may be configured to transmit downlink control information (DCI) associated with the PDSCH transmission, where the DCI includes a first modulation coding scheme (MCS) value associated with the PDSCH transmission. The transmitting circuitry 2740 may be configured to execute transmitting instructions 2750 stored in the computer-readable storage medium 2706 to implement any of the one or more of the functions described herein.

In some aspects of the disclosure, the processor 2704 may also include receiving circuitry 2742 configured to receive either an acknowledgement (ACK) transmission or a negative acknowledgement (NACK) transmission from the UE in response to the transmission of the PDSCH transmission. The receiving circuitry 2742 may also be configured to receive a sub-band (SB) channel state information (SB-CSI) report from the UE based on whether the ACK transmission is transmitted by the UE or the NACK transmission is transmitted by the UE. The receiving circuitry 2742 may further be configured to receive the SB-CSI report from the UE when the ACK transmission is received from the UE and receive the SB-CSI report from the UE when the NACK transmission is received from the UE. The receiving circuitry 2742 may be configured to receive receiving the SB-CSI report from the UE when the NACK transmission is received from the UE or determine that the SB-CSI report is not received from the UE when the ACK transmission is received from the UE. The receiving circuitry 2742 may further be configured to execute receiving instructions 2752 stored in the computer-readable storage medium 2706 to implement any of the one or more of the functions described herein.

In some aspects of the disclosure, the processor 2704 may further include determining circuitry 2744 configured to determine that the SB-CSI report is not received from the UE when the ACK transmission is received from the UE. The determining circuitry 2744 may further be configured to execute determining instructions 2754 stored in the computer-readable storage medium 2706 to implement any of the one or more of the functions described herein.

Figure 28:
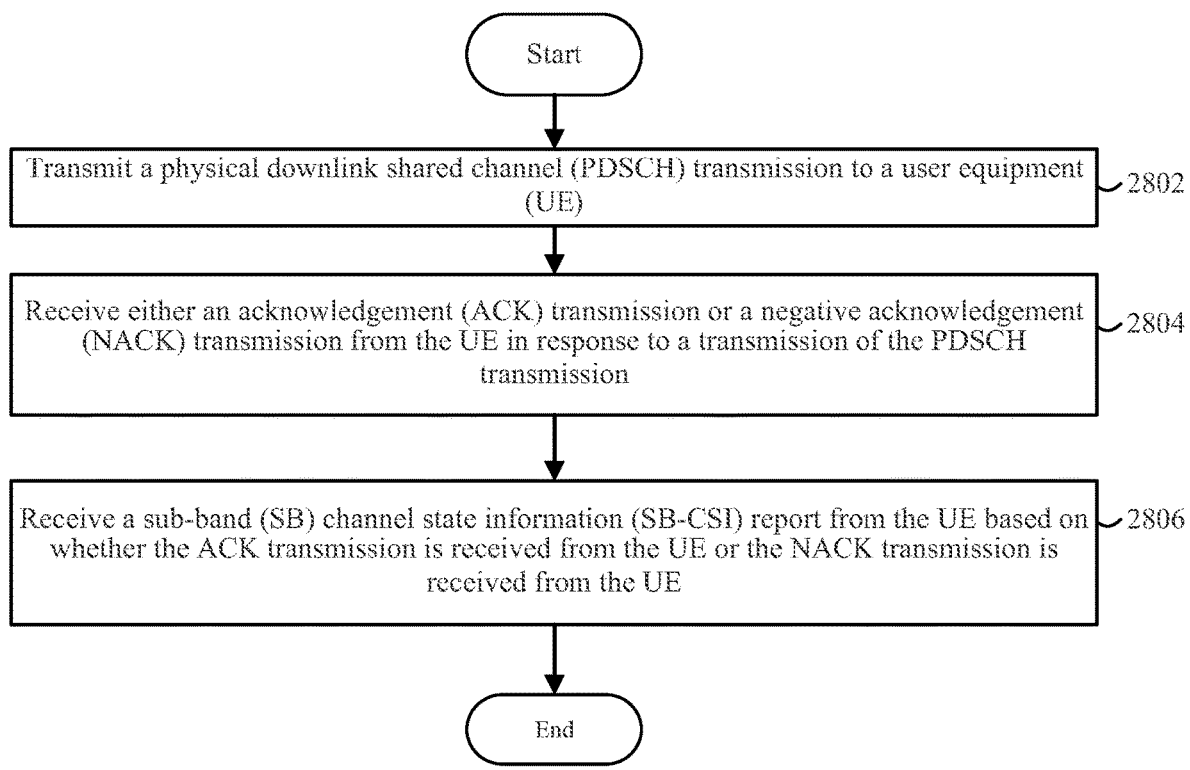
FIG. 28 is a flow chart of a thirteenth example method for reporting SB-CSI according to some aspects.

FIG. 28 is a flow chart 2800 of a method for reporting sub-band (SB) channel state information (SB-CSI) according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 2802, the base station 2700 may transmit a physical downlink shared channel (PDSCH) transmission to a UE. At block 2804, the base station 2700 may receive either an acknowledgement (ACK) transmission or a negative acknowledgement (NACK) transmission from the UE in response to a transmission of the PDSCH transmission. For example, the base station 2700 may transmit the PDSCH transmission to the UE. Subsequently, the UE may receive the PDSCH transmission and attempt to decode the PDSCH transmission. Based on an ability of the UE to decode the PDSCH transmission, the base station 2700 may receive from the UE either an ACK transmission or a NACK transmission. In some aspects, when the UE is unable to decode the PDSCH transmission, the base station 2700 may receive from the UE a NACK transmission and when the UE is able to decode the PDSCH transmission, the base station 2700 may receive from the UE an ACK transmission.

In some aspects, before receiving the PDSCH transmission from the base station 2700, the base station 2700 may transmit to the UE downlink control information (DCI) associated with the PDSCH transmission. The DCI may indicate a first modulation coding scheme (MCS) value associated with the PDSCH transmission. The UE may configure the reception of the DCI for receiving the PDSCH transmission. Subsequently, the base station 2700 may transmit the PDSCH transmission to the UE so that the UE may measure a second MCS value associated with the received PDSCH transmission. The base station 2700 may receive either the ACK transmission or the NACK transmission from the UE in response to transmitting the PDSCH transmission and based on a threshold difference between the first MCS value and the second MCS value. For example, when the difference between the first MCS value and the second MCS value is greater than the threshold difference, the base station 2700 may receive the NACK transmission. However, when the difference between the first MCS value and the second MCS value is no greater than the threshold difference, the base station 2700 may receive the ACK transmission.

At block 2806, the base station 2700 may receive an SB-CSI report from the UE based on whether the ACK transmission is received from the UE or whether the NACK transmission is received from the UE. In some aspects, the base station 2700 may receive an SB-CSI report from the UE when a NACK transmission is received from the UE and may not receive an SB-CSI report from the UE when an ACK transmission is received from the UE. In some examples, the base station 2700 may receive a CSI configured report from the UE, as described herein, when an SB-CSI report is not received from the UE. Alternatively, the base station 2700 may not receive a CSI configured report from the UE when an SB-CSI report is not received from the UE. In some aspects, the base station 2700 may receive an SB-CSI report from the UE when a NACK transmission is received from the UE and/or when an ACK transmission is received from the UE. For example, the base station 2700 may receive an SB-CSI report from the UE regardless of whether an ACK transmission or a NACK transmission is received from the UE.

In some aspects, when the base station 2700 receives the SB-CSI report from the UE, the SB-CSI report may include SB reporting with full resolution, where the SB-CSI report with full resolution indicates one or more channel quality information (CQI) values each associated with a sub-band of a plurality of sub-bands utilized by the PDSCH transmission or SB reporting without full resolution, where the SB reporting without full resolution indicates one or more spatial differential CQI values each associated with an offset level, and where the offset level includes a difference between a CQI value associated with a sub-band of the plurality of sub-bands utilized by the PDSCH transmission and an average CQI value associated with the plurality of sub-bands utilized by the PDSCH transmission. In some examples, the one or more CQI values may include at least one of a CQI index, a modulation scheme, a code rate, or an efficiency. In some examples, the base station 2700 receiving the SB-CSI report including the SB reporting with full resolution or the SB-CSI report including the SB reporting without full resolution and having one or more spatial differential CQI values each associated with an offset level may be based on at least a quality of a decoding of the PDSCH transmission.

In some aspects, a table may be used as SB reporting with full resolution and may include a column of CQI indices, a column of modulations, a column of code rates, and a column of efficiencies. Each modulation, code rate, and efficiency in a particular row aligns with a CQI index sharing that same particular row. Each of the CQI indexes may be indicative of a particular sub-band. Generally, the SB reporting with full resolution provides better resolution than SB reporting without full resolution but also occupies a greater payload during transmission, for example, on a physical uplink control channel (PUCCH). Because of this, the SB-CSI report may include the SB reporting with full resolution when there is a bad signal or decoding of the PDSCH transmission fails in order to provide the base station 2700 with the resolution needed to remedy the bad signal or the failed decoding.

In some aspects, a table may be used as SB reporting without full resolution and may include a column of spatial differential CQI values and a column of offset levels. Each offset level in a particular row aligns with a spatial differential CQI index value sharing that same particular row. Generally, the SB reporting without full resolution does not provide the same amount of resolution that the SB reporting with full resolution provides. However, the SB reporting without full resolution also occupies a lesser payload than the SB reporting with full resolution during transmission, for example, on a physical uplink control channel (PUCCH). Because of this, the SB-CSI report may include the SB reporting without full resolution when a signal is above a threshold or decoding of the PDSCH transmission is at least partially successful in order to provide the base station 2700 with some resolution at a reduced transmission payload.

In some aspects, the base station 2700 may not receive an SB-CSI report from the UE. For example, instead of receiving an SB-CSI report from the UE, the base station 2700 may receive a CSI configured report. A CSI configured report may include wideband (WB) reporting of CQI values and one or more WB rank indications (e.g., ranking a quantity or number of layers). In some aspects, a CSI configured report may include SB reporting without full resolution and also one or more WB rank indications.

In some examples, before the base station 2700 receives the SB-CSI report, the base station 2700 may transmit to the UE a control message indicating whether the UE is to transmit the SB-CSI report including the SB reporting with full resolution to the base station 2700 or whether the UE is to transmit the SB-CSI report including the SB reporting without full resolution to the base station 2700. The UE may receive the control message and determine whether to transmit the SB-CSI report including the SB reporting with full resolution to the base station 2700 or to transmit the SB-CSI report with the SB reporting without full resolution based at least on the control message. In some aspects, the base station 2700 may transmit the control message to the UE so that the UE may determine whether to transmit a CSI configured report instead of an SB-CSI report based at least on the control message. The control message may include at least one of a radio resource control (RRC) message, a medium access control (MAC) control element (MAC-CE), or a downlink control information (DCI).

In some examples, the SB-CSI report may include a rank indicator (RI). An RI may be on a per sub-band basis and indicate a rank of a particular sub-band amongst a plurality of sub-bands. For example, in response to the UE determining that a NACK transmission is transmitted to the base station, the base station 2700 may receive an SB-CSI report from the UE that includes an RI. In some aspects, the RI may indicate to the base station 2700 a quantity of sub-bands utilized by the PDSCH transmission that are able to be supported by the UE.

In some aspects, the base station 2700 may transmit to the UE a table through RRC signal or a medium access control (MAC) control element (MAC-CE) to correlate bit values with types of SB-CSI report transmissions. The base station 2700 may also receive from the UE an indication (e.g., one or more bit values) based on the table in an ACK transmission or a NACK transmission in response to transmitting the PDSCH transmission to the UE. By receiving the indication in the ACK transmission or the NACK transmission, the base station 2700 may expect to receive a particular type of SB-CSI report from the UE. FIGS. 10, 11, 12, 13A, and 13B, described herein, are illustrations of tables correlating bits values with acknowledgement (ACK) transmission and negative acknowledgement (NACK) transmission types according to some aspects. As described herein, based on the tables transmitted by the base station 2700 to the UE, the base station 2700 may receive a bit value from the UE indicating a NACK or an ACK and whether the base station 2700 should expect to receive SB reporting with full resolution, SB reporting without full resolution, or a CSI configured report as well as whether the base station 2700 should expect to receive a SB rank indication or a WB rank indication.

In some aspects, before the base station 2700 transmits the PDSCH transmission to the UE, the base station 2700 may transmit downlink control information (DCI) associated with the PDSCH transmission. The DCI may indicate a first modulation coding scheme (MCS) value associated with the PDSCH transmission. The UE may also configure the reception of the DCI for receiving the PDSCH transmission. Subsequently, the base station 2700 may transmit the PDSCH transmission to the UE so that the UE may measure a second MCS value associated with the PDSCH transmission. The UE may determine whether to transmit a rank indication (RI) per sub-band, for example, with an SB-CSI report with full resolution for reception by the base station 2700 based on a threshold difference between the first MCS value and the second MCS value. For example, when the difference between the first MCS value and the second MCS value is greater than the threshold difference, the base station 2700 may receive the rank indication per sub-band. However, when the difference between the first MCS value and the second MCS value is no greater than the threshold difference, the base station 2700 may not receive the rank indication per sub-band from the UE. In some examples, the UE 2700 may determine whether to transmit a wideband (WB) rank indication (RI), for example, with a CSI configured report for reception by the base station 2700 based on a threshold difference between the first MCS value and the second MCS value. For example, when the difference between the first MCS value and the second MCS value is greater than the threshold difference, the base station 2700 may receive the WB rank indication. However, when the difference between the first MCS value and the second MCS value is no greater than the threshold difference, the base station 2700 may not receive the WB rank indication from the UE. It should be understood that the threshold difference between the first MCS value and the second MCS value used to determine whether to include the RI per sub-band with the SB-CSI report may be the same threshold difference or a different threshold difference used to determine whether to include the WB RI with CSI configured report.

Figure 29:
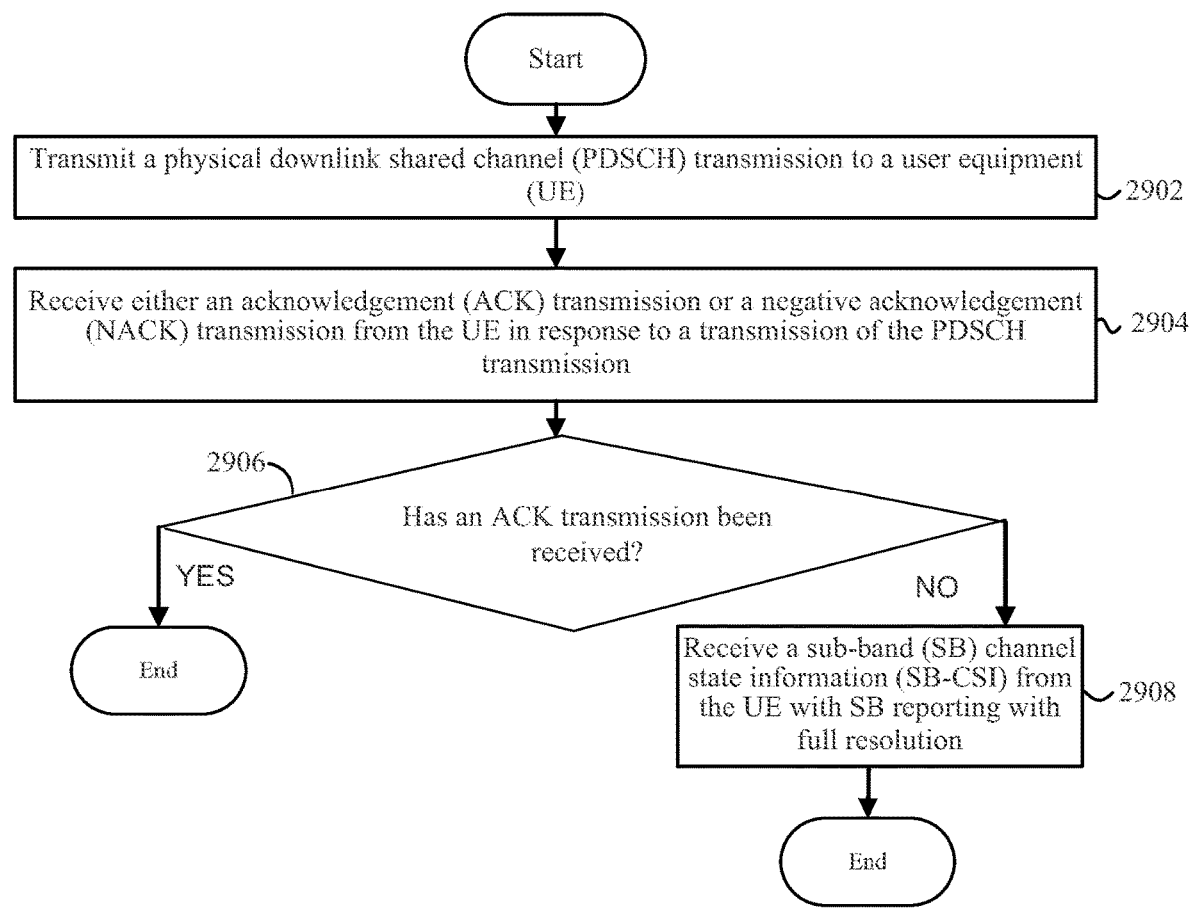
FIG. 29 is a flow chart of a fourteenth example method for reporting SB-CSI according to some aspects.

FIG. 29 is a flow chart 2900 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 2902, the base station 2700 may transmit a physical downlink shared channel (PDSCH) transmission to a UE. The features of block 2902 may be the same as or at least similar to one or more features described herein at least with respect to block 2802 of FIG. 28. At block 2904, the base station 2700 may receive either an acknowledgement (ACK) transmission or a negative acknowledgement (NACK) transmission from the UE in response to a transmission of the PDSCH transmission. The features of block 2904 may be the same as or at least similar to one or more features described herein at least with respect to block 2804 of FIG. 28. At block 2906, the base station 2700 may determine whether an ACK transmission has been received from the UE. If the base station 2700 determines that an ACK transmission has been received from the UE, for example, in response to a transmission of the PDSCH transmission, then the method ends. If the base station 2700 determines that an ACK transmission has not be received from the UE, for example, in response to a transmission of the PDSCH transmission, then, at block 2908, the base station 2700 may receive the SB-CSI report from the UE with SB reporting with full resolution.

Figure 30:
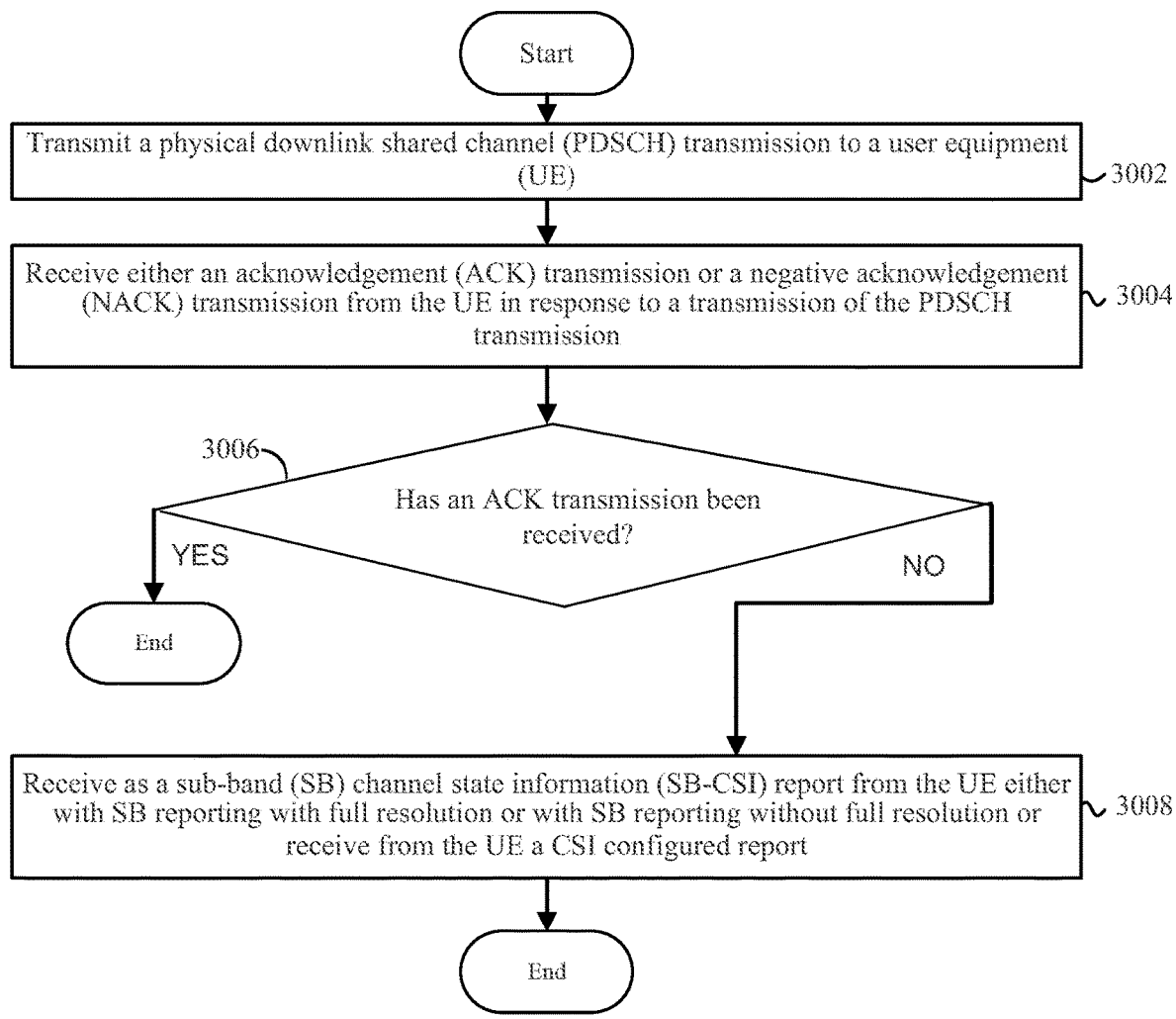
FIG. 30 is a flow chart of a fifteenth example method for reporting SB-CSI according to some aspects.

FIG. 30 is a flow chart 3000 of a method for reporting sub-band SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 3002, the base station 2700 may transmit a physical downlink shared channel (PDSCH) transmission to a user equipment (UE). The features of block 3002 may be the same as or at least similar to one or more features described herein at least with respect to block 2802 of FIG. 28. At block 3004, the base station 2700 may receive either an acknowledgement (ACK) transmission or a negative acknowledgement (NACK) transmission from the UE in response to a transmission of the PDSCH transmission. The features of block 3004 may be the same as or at least similar to one or more features described herein at least with respect to block 2804 of FIG. 28.

At block 3006, the base station 2700 may determine whether an ACK transmission has been received from the UE. If the base station 2700 determines that an ACK transmission has been received from the UE, for example, in response to a transmission of the PDSCH transmission, then the method ends. If the base station 2700 determines that an ACK transmission has not be received from the UE, for example, in response to a transmission of the PDSCH transmission, then, at block 3008, the base station 2700 may receive the SB-CSI report from the UE with SB reporting with full resolution or with SB reporting without full resolution or the base station 2700 may receive a CSI configured report from the UE.

Figure 31:
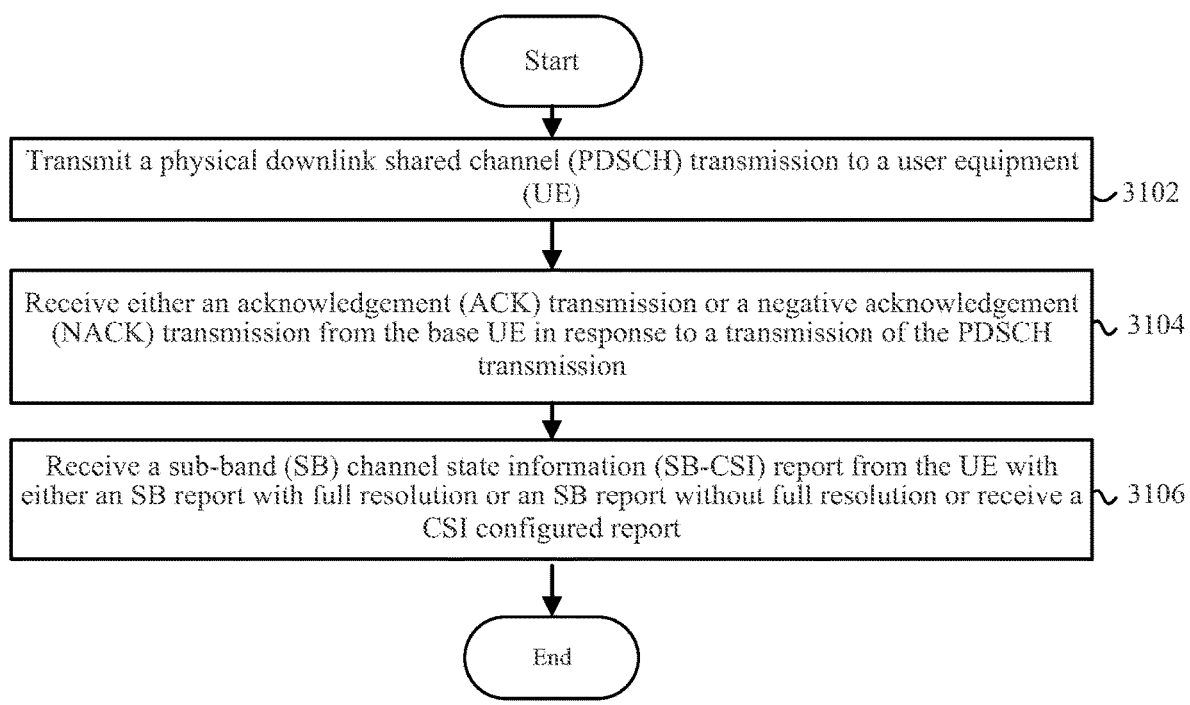
FIG. 31 is a flow chart of a sixteenth example method for reporting SB-CSI according to some aspects.

FIG. 31 is a flow chart 3100 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 3102, the base station 2700 may transmit a physical downlink shared channel (PDSCH) transmission to a UE. The features of block 3102 may be the same as or at least similar to one or more features described herein at least with respect to block 2802 of FIG. 28. At block 3104, the base station 2700 may receive either an acknowledgement (ACK) transmission or a negative acknowledgement (NACK) transmission from the UE in response to a transmission of the PDSCH transmission. The features of block 3104 may be the same as or at least similar to one or more features described herein at least with respect to block 2804 of FIG. 28. At block 3106, the base station 2700 may receive an SB-CSI report from the UE with either SB reporting with full resolution or with SB reporting without full resolution or the base station 2700 may receive a CSI configured report from the UE.

Figure 32:
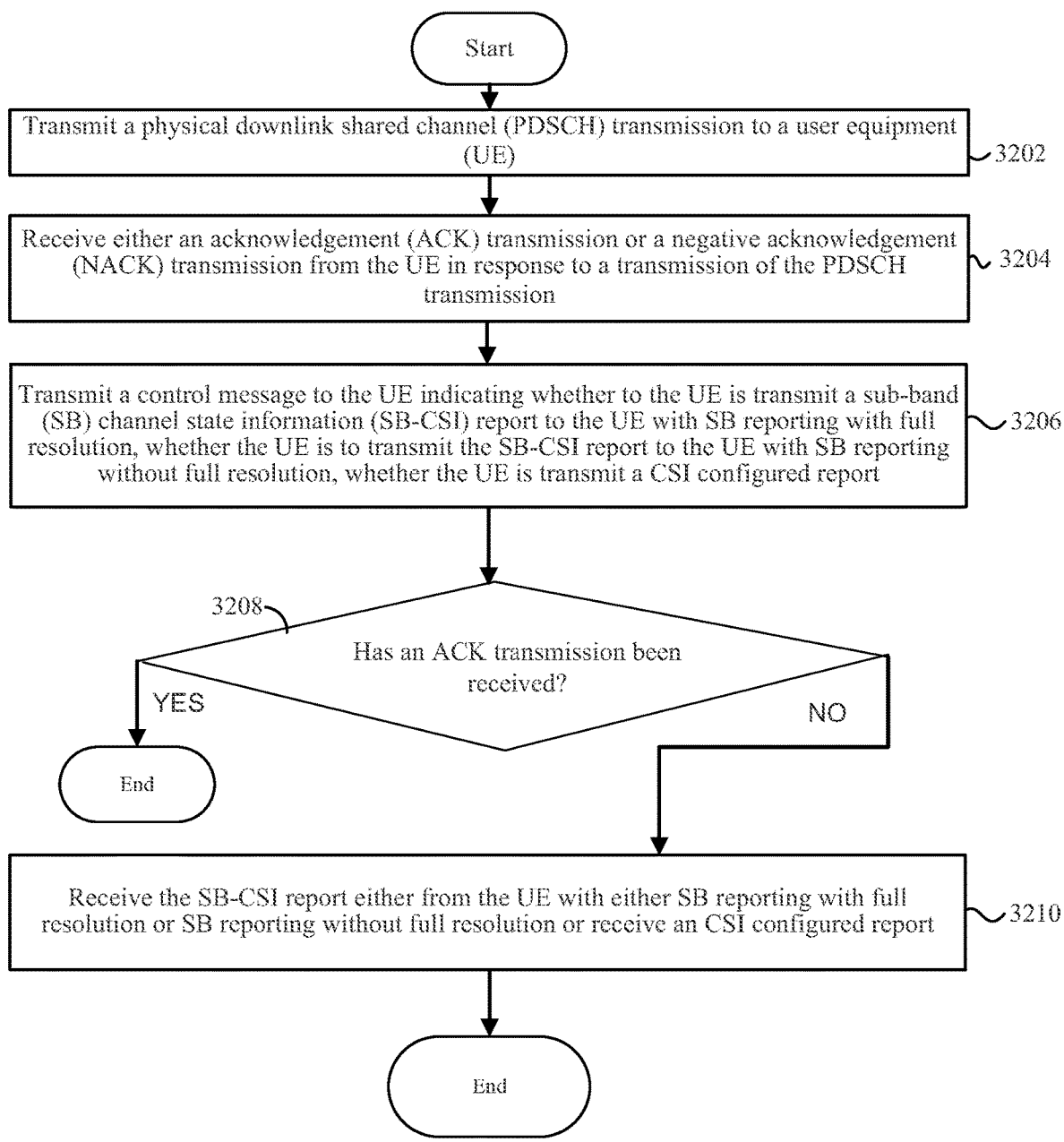
FIG. 32 is a flow chart of a seventeenth example method for reporting SB-CSI according to some aspects.

FIG. 32 is a flow chart 3200 of a method for reporting sub-band SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 3202, the base station 2700 may transmit a physical downlink shared channel (PDSCH) transmission to a user equipment (UE). The features of block 3202 may be the same as or at least similar to one or more features described herein at least with respect to block 2802 of FIG. 28. At block 3204, the base station 2700 may receive either an acknowledgement (ACK) transmission or a negative acknowledgement (NACK) transmission from the UE in response to a transmission of the PDSCH transmission. The features of block 3204 may be the same as or at least similar to one or more features described herein at least with respect to block 2804 of FIG. 28.

At block 3206, the base station 2700 may transmit a control message to the UE indicating whether the UE is to transmit an SB-CSI report to the base station with SB reporting with full resolution, whether the UE is to transmit an SB-CSI report to the base station with SB reporting without full resolution, or whether the UE is to transmit a CSI configured report. In some aspects, the control message may include at least one of a radio resource control (RRC) message, a medium access control (MAC) control element (MAC-CE), or a downlink control information (DCI). At block 3208, the base station 2700 may determine whether an ACK transmission has been received from the UE. If the base station 2700 determines that an ACK transmission has been received from the UE, for example, in response to a transmission of the PDSCH transmission, then the method ends. If the base station 2700 determines that an ACK transmission has not be received from the UE, for example, in response to a transmission of the PDSCH transmission, then, at block 3210, the base station 2700 may receive the SB-CSI report from the UE with SB reporting with full resolution or with SB reporting without full resolution or the base station 2700 may receive a CSI configured report from the UE.

Figure 33:
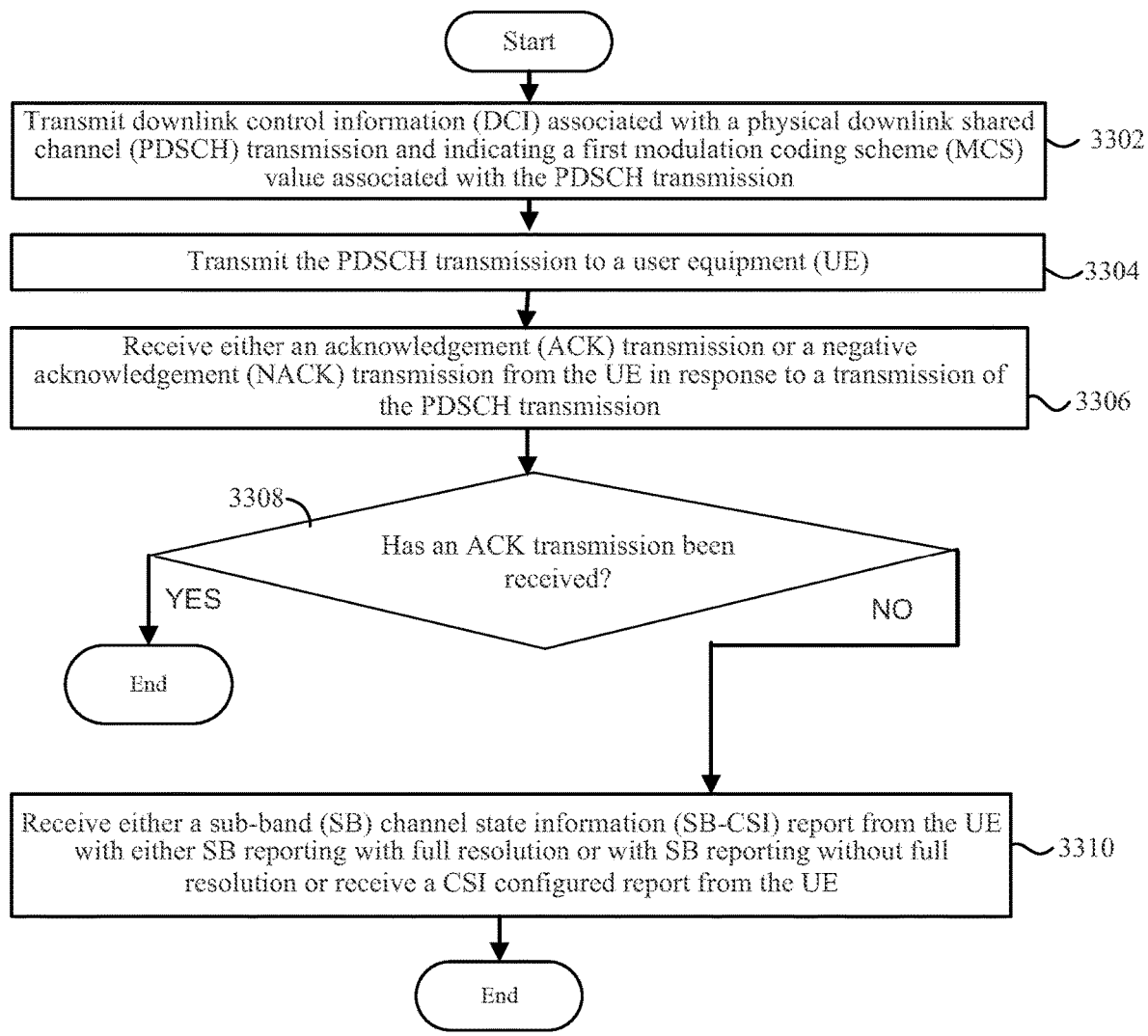
FIG. 33 is a flow chart of an eighteenth example method for reporting SB-CSI according to some aspects.

FIG. 33 is a flow chart 3300 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 3302, the base station 2700 may transmit downlink control information (DCI) associated with a PDSCH transmission and indicating a first modulation code scheme (MCS) value associated with the PDSCH transmission. At block 3304, the base station 2700 may transmit a physical downlink shared channel (PDSCH) transmission to a user equipment (UE). The features of block 3304 may be the same as or at least similar to one or more features described herein at least with respect to block 2802 of FIG. 28. At block 3306, the base station 2700 may receive either an acknowledgement (ACK) transmission or a negative acknowledgement (NACK) transmission from the UE in response to a transmission of the PDSCH transmission. The features of block 3306 may be the same as or at least similar to one or more features described herein at least with respect to block 2804 of FIG. 28.

At block 3308, the base station 2700 may determine whether an ACK transmission has been received from the UE. If the base station 2700 determines that an ACK transmission has been received from the UE, for example, in response to a transmission of the PDSCH transmission, then the method ends. If the base station 2700 determines that an ACK transmission has not be received from the UE, for example, in response to a transmission of the PDSCH transmission, then, at block 3310, the base station 2700 may receive the SB-CSI report from the UE with either SB reporting with full resolution or with SB reporting without full resolution or the base station 2700 may receive a CSI configured report from the UE.

Figure 34:
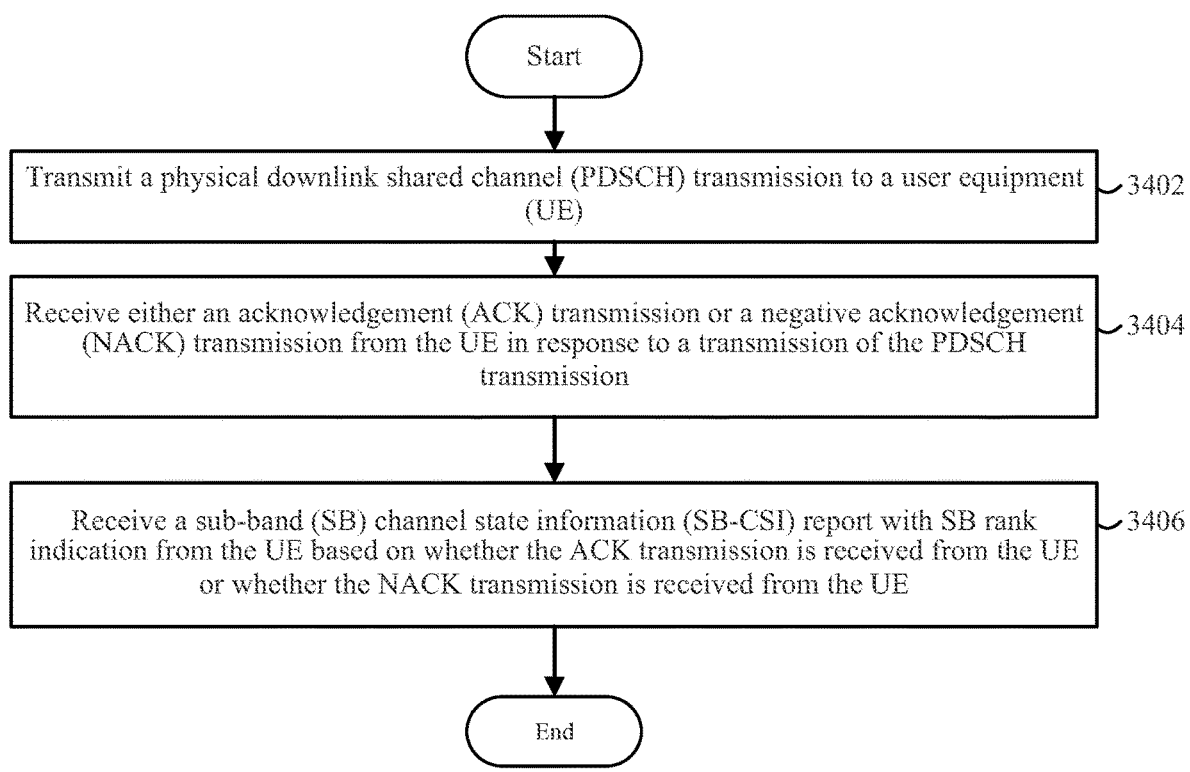
FIG. 34 is a flow chart of a nineteenth example method for reporting SB-CSI according to some aspects.

FIG. 34 is a flow chart 3400 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 3402, the base station 2700 may transmit a physical downlink shared channel (PDSCH) transmission to a UE. The features of block 3402 may be the same as or at least similar to one or more features described herein at least with respect to block 2802 of FIG. 28. At block 3404, the base station 2700 may receive either an acknowledgement (ACK) transmission or a negative acknowledgement (NACK) transmission from the UE in response to a transmission of the PDSCH transmission. The features of block 3204 may be the same as or at least similar to one or more features described herein at least with respect to block 2804 of FIG. 28. At block 3406, the base station 2700 may receive an SB-CSI report with a rank indication (RI) from the UE based on whether the ACK transmission is received from the UE or whether the NACK transmission is received from the UE.

Figure 35:
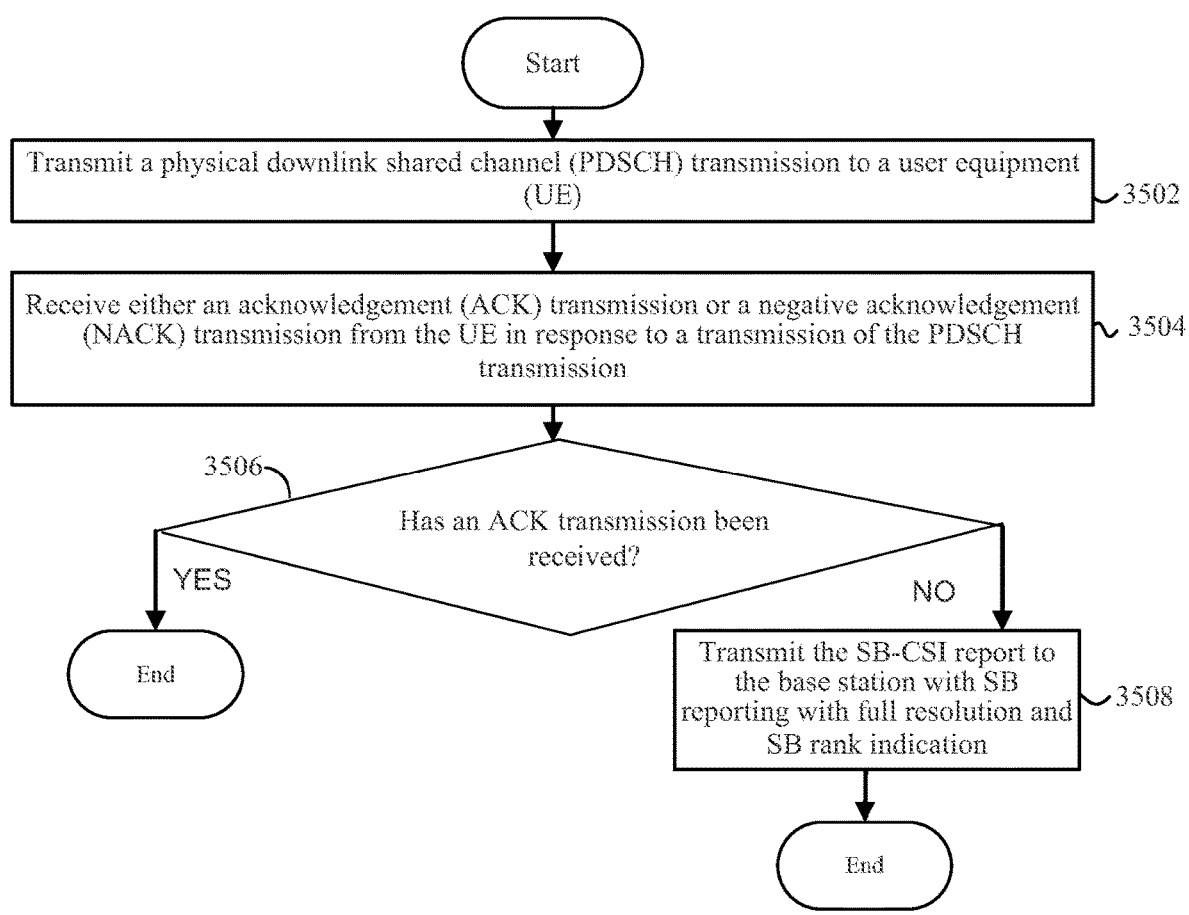
FIG. 35 is a flow chart of a twentieth example method for reporting SB-CSI according to some aspects.

FIG. 35 is a flow chart 2900 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 3502, the base station 2700 may transmit a physical downlink shared channel (PDSCH) transmission to a UE. The features of block 3502 may be the same as or at least similar to one or more features described herein at least with respect to block 2802 of FIG. 28. At block 3504, the base station 2700 may receive either an acknowledgement (ACK) transmission or a negative acknowledgement (NACK) transmission from the UE in response to a transmission of the PDSCH transmission. The features of block 3504 may be the same as or at least similar to one or more features described herein at least with respect to block 2804 of FIG. 28.

At block 3506, the base station 2700 may determine whether an ACK transmission has been received from the UE. If the base station 2700 determines that an ACK transmission has been received from the UE, for example, in response to a transmission of the PDSCH transmission, then the method ends. If the base station 2700 determines that an ACK transmission has not be received from the UE, for example, in response to a transmission of the PDSCH transmission, then, at block 3508, the base station 2700 may receive the SB-CSI report from the UE with SB reporting with full resolution and SB rank indication.

Figure 36:
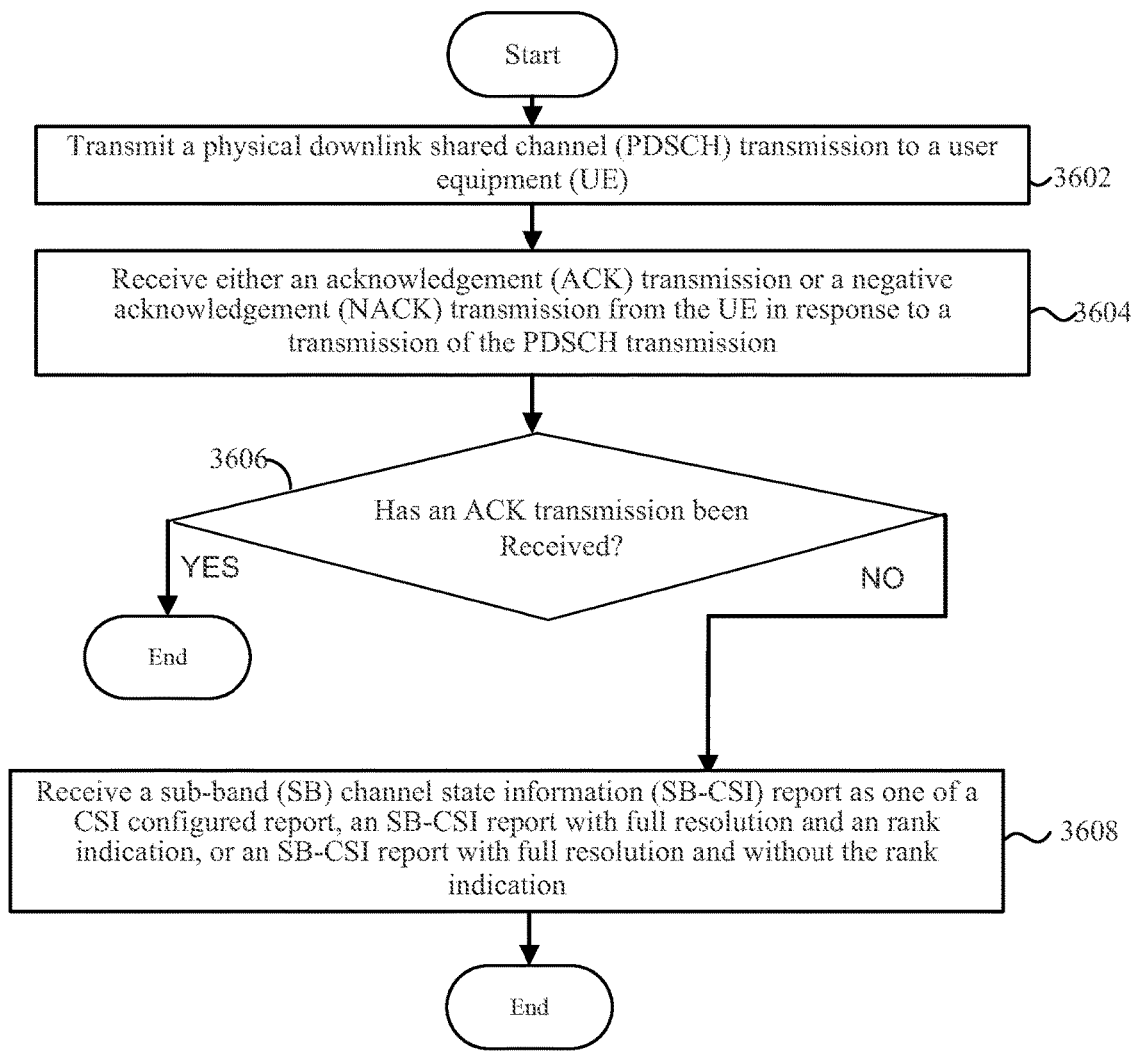
FIG. 36 is a flow chart of a twenty-first example method for reporting SB-CSI according to some aspects.

FIG. 36 is a flow chart 3600 of a method for reporting sub-band SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 3602, the base station 2700 may transmit a physical downlink shared channel (PDSCH) transmission to a user equipment (UE). The features of block 3602 may be the same as or at least similar to one or more features described herein at least with respect to block 2802 of FIG. 28. At block 3604, the base station 2700 may receive either an acknowledgement (ACK) transmission or a negative acknowledgement (NACK) transmission from the UE in response to a transmission of the PDSCH transmission. The features of block 3604 may be the same as or at least similar to one or more features described herein at least with respect to block 2804 of FIG. 28.

At block 3606, the base station 2700 may determine whether an ACK transmission has been received from the UE. If the base station 2700 determines that an ACK transmission has been received from the UE, for example, in response to a transmission of the PDSCH transmission, then the method ends. If the base station 2700 determines that an ACK transmission has not be received from the UE, for example, in response to a transmission of the PDSCH transmission, then, at block 3608, the base station 2700 may receive the SB-CSI report from the UE as a CSI configure report, an SB-CSI report with full resolution and an RI, or as an SB-CSI report with full resolution and without an RI.

Figure 37:
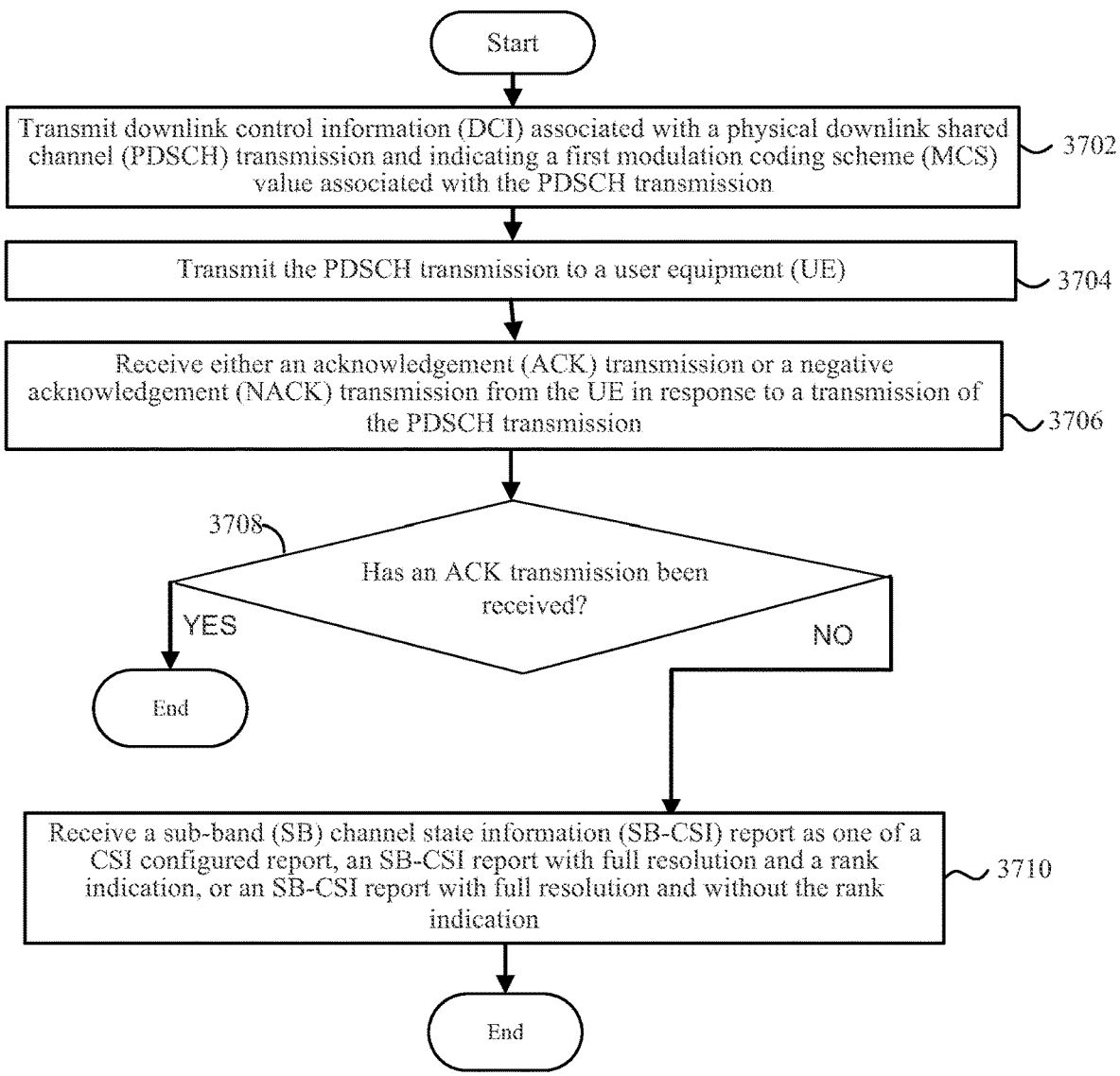
FIG. 37 is a flow chart of a twenty-second example method for reporting SB-CSI according to some aspects.

FIG. 37 is a flow chart 3700 of a method for reporting SB-CSI according to some aspects. As described below, some or all illustrated features may be omitted in a particular implementation within the scope of the present disclosure, and some illustrated features may not be required for implementation of all aspects. In some examples, the method may be performed by the base station 2700, as described above, and illustrated in FIG. 27, by a processor or processing system, or by any suitable means for carrying out the described functions.

At block 3702, the base station 2700 may transmit downlink control information (DCI) associated with a PDSCH transmission and indicating a first modulation code scheme (MCS) value associated with the PDSCH transmission. The features of block 3702 may be the same as or at least similar to one or more features described herein at least with respect to block 3302 of FIG. 33. At block 3704, the base station 2700 may transmit a physical downlink shared channel (PDSCH) transmission to a UE. The features of block 3704 may be the same as or at least similar to one or more features described herein at least with respect to block 2802 of FIG. 28. At block 3706, the base station 2700 may receive either an acknowledgement (ACK) transmission or a negative acknowledgement (NACK) transmission from the UE in response to a transmission of the PDSCH transmission. The features of block 3706 may be the same as or at least similar to one or more features described herein at least with respect to block 2804 of FIG. 28.

At block 3708, the base station 2700 may determine whether an ACK transmission has been received from the UE. If the base station 2700 determines that an ACK transmission has been received from the UE, for example, in response to a transmission of the PDSCH transmission, then the method ends. If the base station 2700 determines that an ACK transmission has not be received from the UE, for example, in response to a transmission of the PDSCH transmission, then, at block 3710, the base station 2700 may receive the SB-CSI report from the UE as a CSI configure report, an SB-CSI report with full resolution and an RI, or as an SB-CSI report with full resolution and without an RI.

In one configuration, the base station 2700 includes means for performing the various functions and processes described in relation to FIGS. 28, 29, 30, 31, 32, 33, 34, 35, 36, and 37. In one aspect, the aforementioned means may be the processor 2704 shown in FIG. 27 configured to perform the functions recited by the aforementioned means. In another aspect, the aforementioned means may be a circuit or any apparatus configured to perform the functions recited by the aforementioned means.

Of course, in the above examples, the circuitry included in the processor 2704 is merely provided as an example, and other means for carrying out the described functions may be included within various aspects of the present disclosure, including but not limited to the instructions stored in the computer-readable storage medium 2706, or any other suitable apparatus or means described in any one of the FIGS. 1-4 and 7 and utilizing, for example, the processes and/or algorithms described herein in relation to FIGS. 28, 29, 30, 31, 32, 33, 34, 35, 36, and 37.

In a first aspect, a wireless communication device (e.g., a UE) may receive a physical downlink shared channel (PDSCH) transmission from a base station. The wireless communication device may also transmit either an acknowledgement (ACK) transmission or a negative acknowledgement (NACK) transmission to the base station in response to a reception of the PDSCH transmission. The wireless communication device may further determine whether to transmit a sub-band (SB) channel state information (SB-CSI) report to the base station based on whether the ACK transmission is transmitted to the base station or whether the NACK transmission is transmitted to the base station.

In a second aspect, alone or in combination with the first aspect, the wireless communication device transmitting either the ACK transmission or the NACK transmission to the base station in response to the reception of the PDSCH transmission may include transmitting either the ACK transmission or the NACK transmission to the base station based on an ability of the UE to decode the PDSCH transmission.

In a third aspect, alone or in combination with one or more of the first and second aspects, the wireless communication device may receive downlink control information (DCI) associated with the PDSCH transmission, where the DCI indicates a first modulation coding scheme (MCS) value associated the PDSCH transmission. The wireless communication device may also configure the reception of the DCI for receiving the PDSCH transmission and measure a second MCS value associated with the received PDSCH transmission.

In a fourth aspect, alone or in combination with one or more of the first through third aspects, the wireless communication device transmitting either the ACK transmission or the NACK transmission to the base station in response to the reception of the PDSCH transmission may include transmitting either the ACK transmission or the NACK transmission to the base station based on a threshold difference between the first MCS value and the second MCS value.

In a fifth aspect, alone or in combination with one or more of the first through fourth aspects, the wireless communication device may transmit the SB-CSI report to the base station when the ACK transmission is transmitted to the base station and transmit the SB-CSI report to the base station when the NACK transmission is transmitted to the base station.

In a sixth aspect, alone or in combination with one or more of the first through fifth aspects, the wireless communication device may transmit the SB-CSI report to the base station when the NACK transmission is transmitted to the base station or abstain from transmitting the SB-CSI report when the ACK transmission is transmitted to the base station.

In a seventh aspect, alone or in combination with one or more of the first through sixth aspects, when determining to transmit the SB-CSI report to the base station, at least one of the ACK transmission or the NACK transmission includes an indication that the SB-CSI report is to be transmitted to the base station.

In an eighth aspect, alone or in combination with one or more of the first through seventh aspects, when determining to transmit the SB-CSI report to the base station, the wireless communication device determines whether to transmit the SB-CSI report including SB reporting with full resolution to the base station, where the SB-CSI report including SB reporting with full resolution includes one or more channel quality information (CQI) values each associated with a sub-band of a plurality of sub-bands utilized by the PDSCH transmission or transmit the SB-CSI report including SB reporting without full resolution including one or more spatial differential CQI values each associated with an offset level, where the offset level comprises a difference between a CQI value associated with a sub-band of the plurality of sub-bands utilized by the PDSCH transmission and an average CQI value associated with the plurality of sub-bands utilized by the PDSCH transmission.

In a ninth aspect, alone or in combination with one or more of the first through eighth aspects, the one or more CQI values include at least one of a CQI index, a modulation scheme, a code rate, or an efficiency.

In a tenth aspect, alone or in combination with one or more of the first through ninth aspects, determining whether to transmit the SB-CSI report including SB reporting with full resolution to the base station or transmit the SB-CSI report including SB reporting without full resolution including one or more spatial differential CQI values each associated with an offset level is based on at least a quality of a decoding of the PDSCH transmission.

In an eleventh aspect, alone or in combination with one or more of the first through tenth aspects, the wireless communication device receives a control message from the base station indicating whether to transmit the SB-CSI report including SB reporting with full resolution to the base station or whether to transmit the SB-CSI report including SB reporting without full resolution. Determining whether to transmit the SB-CSI report including SB reporting with full resolution to the base station or transmit the SB-CSI report including SB reporting without full resolution including one or more spatial differential CQI values each associated with an offset level is based at least on the control message.

In a twelfth aspect, alone or in combination with one or more of the first through eleventh aspects, the control message includes at least one of a radio resource control (RRC) message, a medium access control (MAC) control element (MAC-CE), or a downlink control information (DCI).

In a thirteenth aspect, alone or in combination with one or more of the first through twelfth aspects, when determining to transmit the SB-CSI report including SB reporting with full resolution to the base station, the wireless communication device determines whether to include a rank indication per sub-band with the SB-CSI report including SB reporting with full resolution for reception by the base station, where the rank indication per sub-band indicates a quantity of sub-bands utilized by the PDSCH transmission that are able to be supported by the UE.

In a fourteenth aspect, alone or in combination with one or more of the first through thirteenth aspects, at least one of the ACK transmission or the NACK transmission includes an indication that the rank indication is to be included with the SB-CSI report including SB reporting with full resolution.

In a fifteenth aspect, alone or in combination with one or more of the first through fourteenth aspects, the wireless communication device receiving downlink control information (DCI) associated with the PDSCH transmission, where the DCI indicates a first modulation coding scheme (MCS) value associated with the PDSCH transmission. The wireless communication device also configures the reception of the DCI for receiving the PDSCH transmission and measures a second MCS value associated with the received PDSCH transmission.

In a sixteenth aspect, alone or in combination with one or more of the first through fifteenth aspects, determining whether to include the rank indication per sub-band with the SB-CSI report with full resolution for reception by the base station is based on a threshold difference between the first MCS value and the second MCS value.

In a seventeenth aspect, a base station may transmit a physical downlink shared channel (PDSCH) transmission to a user equipment (UE). The base station may also receive either an acknowledgement (ACK) transmission or a negative acknowledgement (NACK) transmission from the UE in response to the transmission of the PDSCH transmission. The base station may further receive a sub-band (SB) channel state information (SB-CSI) report from the UE based on whether the ACK transmission is transmitted by the UE or the NACK transmission is transmitted by the UE.

In an eighteenth aspect, alone or in combination with the seventeenth aspect, receiving either the ACK transmission or the NACK transmission from the UE in response to the transmission of the PDSCH transmission includes receiving either the ACK transmission or the NACK transmission from the UE based on an ability of the UE to decode the PDSCH transmission.

In a nineteenth aspect, alone or in combination with one or more of the seventeenth through eighteenth aspects, the base station transmits downlink control information (DCI) associated with the PDSCH transmission, where the DCI indicates a first modulation coding scheme (MCS) value associated with the PDSCH transmission.

In a twentieth aspect, alone or in combination with one or more of the seventeenth through nineteenth aspects, receiving either the ACK transmission or the NACK transmission from the UE in response to the transmission of the PDSCH transmission includes receiving either the ACK transmission or the NACK transmission from the UE based on a threshold difference between the first MCS value and a second measured MCS value associated with the PDSCH transmission.

In a twenty-first aspect, alone or in combination with one or more of the seventeenth through twentieth aspects, the base station receives the SB-CSI report from the UE when the ACK transmission is received from the UE and receives the SB-CSI report from the UE when the NACK transmission is received from the UE.

In a twenty-second aspect, alone or in combination with one or more of the seventeenth through twenty-first aspects, the base station receives the SB-CSI report from the UE when the NACK transmission is received from the UE or determines that the SB-CSI report is not received from the UE when the ACK transmission is received from the UE.

In a twenty-third aspect, alone or in combination with one or more of the seventeenth through twenty-second aspects, when receiving the SB-CSI report from the UE, at least one of the ACK transmission or the NACK transmission includes an indication that the SB-CSI report is to be received from the UE.

In a twenty-fourth aspect, alone or in combination with one or more of the seventeenth through twenty-third aspects, the SB-CSI report comprises one of an SB-CSI report including SB reporting with full resolution, where the SB-CSI report with full resolution includes one or more channel quality information (CQI) values each associated with a sub-band of a plurality of sub-bands utilized by the PDSCH transmission or an SB-CSI report including SB reporting without full resolution including one or more spatial differential CQI values each associated with an offset level, where the offset level comprises a difference between a CQI value associated with a sub-band of the plurality of sub-bands utilized by the PDSCH transmission and an average CQI value associated with the plurality of sub-bands utilized by the PDSCH transmission.

In a twenty-fifth aspect, alone or in combination with one or more of the seventeenth through twenty-fourth aspects, the one or more CQI values comprise at least one of a CQI index, a modulation scheme, a code rate, or an efficiency.

In a twenty-sixth aspect, alone or in combination with one or more of the seventeenth through twenty-fifth aspects, the SB-CSI report including either the SB reporting with full resolution or the SB reporting without full resolution is based on at least a quality of a decoding of the PDSCH transmission by the UE.

In a twenty-seventh aspect, alone or in combination with one or more of the seventeenth through twenty-sixth aspects, the base station transmits a control message to the UE indicating whether the UE is to transmit the SB-CSI report including SB reporting with full resolution or whether to the UE is to transmit the SB-CSI report including SB reporting without full resolution. Receiving either the SB-CSI report including either SB reporting with full resolution or SB reporting without full resolution is based on at least the control message.

In a twenty-eighth aspect, alone or in combination with one or more of the seventeenth through twenty-seventh aspects, the control message includes at least one of a radio resource control (RRC) message, a medium access control (MAC) control element (MAC-CE), or a downlink control information (DCI).

In a twenty-ninth aspect, alone or in combination with one or more of the seventeenth through twenty-eighth aspects, the SB-CSI report including SB reporting with full resolution includes a rank indication per sub-band indicating a quantity of sub-bands utilized by the PDSCH transmission that are able to be supported by the UE.

In a thirtieth aspect, alone or in combination with one or more of the seventeenth through twenty-ninth aspects, when the SB-CSI report including SB reporting with full resolution includes the rank indication per sub-band, at least one of the ACK transmission or the NACK transmission includes an indication that the rank indication is to be included with the SB-CSI report including SB reporting with full resolution.

In a thirty-first aspect, alone or in combination with one or more of the seventeenth through thirtieth aspects, the base station transmits downlink control information (DCI) associated with the PDSCH transmission, where the DCI includes a first modulation coding scheme (MCS) value associated with the PDSCH transmission.

In a thirty-second aspect, alone or in combination with one or more of the seventeenth through thirty-first aspects, the SB-CSI report including SB reporting with full resolution includes the rank indication per sub-band based on a threshold difference between the first MCS value and a second measured MCS value associated with the PDSCH transmission.

In one configuration, a wireless communication device includes means for receiving a physical downlink shared channel (PDSCH) transmission from a base station, means for transmitting either an acknowledgement (ACK) transmission or a negative acknowledgement (NACK) transmission to the base station in response to a reception of the PDSCH transmission, and means for determining whether to transmit a sub-band (SB) channel state information (SB-CSI) report to the base station based on whether the ACK transmission is transmitted to the base station or whether the NACK transmission is transmitted to the base station.

In one aspect, the aforementioned means for receiving a physical downlink shared channel (PDSCH) transmission from a base station, means for transmitting either an acknowledgement (ACK) transmission or a negative acknowledgement (NACK) transmission to the base station in response to a reception of the PDSCH transmission, and means for determining whether to transmit a sub-band (SB) channel state information (SB-CSI) report to the base station based on whether the ACK transmission is transmitted to the base station or whether the NACK transmission is transmitted to the base station may be the processor(s) 1404 shown in FIG. 14 configured to perform the functions recited by the aforementioned means. For example, the aforementioned means for receiving a physical downlink shared channel (PDSCH) transmission from a base station may include the receiving circuitry 1440 and transceiver 1410 in FIG. 14. As another example, the aforementioned means for transmitting either an acknowledgement (ACK) transmission or a negative acknowledgement (NACK) transmission to the base station in response to a reception of the PDSCH transmission may include the transmitting circuitry 1442 and transceiver 1410 shown in FIG. 14. As yet another example, the aforementioned means for determining whether to transmit a sub-band (SB) channel state information (SB-CSI) report to the base station based on whether the ACK transmission is transmitted to the base station or whether the NACK transmission is transmitted to the base station may include the determining circuitry 1444 shown in FIG. 14. In another aspect, the aforementioned means may be a circuit or any apparatus configured to perform the functions recited by the aforementioned means.

In one configuration, a base station includes means for transmitting a physical downlink shared channel (PDSCH) transmission to a user equipment (UE), means for receiving either an acknowledgement (ACK) transmission or a negative acknowledgement (NACK) transmission from the UE in response to the transmission of the PDSCH transmission, and means for receiving a sub-band (SB) channel state information (SB-CSI) report from the UE based on whether the ACK transmission is transmitted by the UE or the NACK transmission is transmitted by the UE.

In one aspect, the aforementioned means for transmitting a physical downlink shared channel (PDSCH) transmission to a user equipment (UE), means for receiving either an acknowledgement (ACK) transmission or a negative acknowledgement (NACK) transmission from the UE in response to the transmission of the PDSCH transmission, and means for receiving a sub-band (SB) channel state information (SB-CSI) report from the UE based on whether the ACK transmission is transmitted by the UE or the NACK transmission is transmitted by the UE may be the processor(s) 2704 shown in FIG. 27 configured to perform the functions recited by the aforementioned means. For example, the aforementioned means for transmitting a physical downlink shared channel (PDSCH) transmission to a user equipment (UE) may include the transmitting circuitry 2740 and transceiver 2710 shown in FIG. 27. As another example, the aforementioned means for receiving either an acknowledgement (ACK) transmission or a negative acknowledgement (NACK) transmission from the UE in response to the transmission of the PDSCH transmission may include the receiving circuitry 2742 and transceiver 2710 shown in FIG. 27. As another example, the aforementioned means for receiving a sub-band (SB) channel state information (SB-CSI) report from the UE based on whether the ACK transmission is transmitted by the UE or the NACK transmission is transmitted by the UE may include the receiving circuitry 2742 and transceiver 2710 shown in FIG. 27. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-37 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-37 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, where reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication by a user equipment (UE), comprising:
   receiving downlink control information (DCI) associated with a physical downlink shared channel (PDSCH) transmission, wherein the DCI indicates a first modulation coding scheme (MCS) value associated with the PDSCH transmission;
   receiving the PDSCH transmission from a base station;
   measuring a second MCS value associated with the received PDSCH transmission;
   transmitting either an acknowledgement (ACK) transmission or a negative acknowledgement (NACK) transmission to the base station, based on a threshold difference between the first MCS value and the second MCS value, in response to the receiving the PDSCH transmission, the ACK transmission or the NACK transmission comprising an indication specifying a type of a sub-band (SB) channel state information (SB-CSI) report to be sent to the base station; and
   transmitting the SB-CSI report to the base station.

2. The method of claim 1, wherein transmitting either the ACK transmission or the NACK transmission to the base station in response to the reception of the PDSCH transmission comprises:
   transmitting either the ACK transmission or the NACK transmission to the base station based on an ability of the UE to decode the PDSCH transmission.

3. The method of claim 1, wherein transmitting the SB-CSI report to the base station comprises:
   transmitting the SB-CSI report to the base station when the ACK transmission is transmitted to the base station, and
   transmitting the SB-CSI report to the base station when the NACK transmission is transmitted to the base station.

4. The method of claim 1, wherein transmitting the SB-CSI report to the base station comprises:
   transmitting the SB-CSI report to the base station only when the NACK transmission is transmitted to the base station.

5. The method of claim 1, wherein the method further comprises:
   determining whether to include with the SB-CSI report:
      SB reporting with full channel quality information (CQI) value resolution, wherein the SB reporting with full CQI value resolution indicates one or more channel quality information (CQI) values each associated with a sub-band of a plurality of sub-bands utilized by the PDSCH transmission; or
      SB reporting without full CQI value resolution, wherein the SB reporting without full CQI value resolution indicates one or more spatial differential CQI values each associated with a respective offset level, and wherein each offset level includes a difference between a CQI value associated with a sub-band of the plurality of sub-bands utilized by the PDSCH transmission and an average CQI value associated with the plurality of sub-bands utilized by the PDSCH transmission.

6. A user equipment (UE) for wireless communication in a wireless communication network, comprising:
   a wireless transceiver;
   a memory; and
   a processor communicatively coupled to the wireless transceiver and the memory, wherein the processor and the memory are configured to:
      receive downlink control information (DCI) associated with a physical downlink shared channel (PDSCH) transmission, wherein the DCI indicates a first modulation coding scheme (MCS) value associated with the PDSCH transmission,
      receive the PDSCH transmission from a base station,
      measure a second MCS value associated with the received PDSCH transmission,
      transmit either an acknowledgement (ACK) transmission or a negative acknowledgement (NACK) transmission to the base station, based on a threshold difference between the first MCS value and the second MCS value, in response to the reception of the PDSCH transmission, the ACK transmission or the NACK transmission comprising an indication specifying a type of a sub-band (SB) channel state information (SB-CSI) report to be sent to the base station, and
      transmit the SB-CSI report to the base station.

7. The UE of claim 6, wherein the processor and the memory are further configured to:

transmit either the ACK transmission or the NACK transmission to the base station based on an ability of the UE to decode the PDSCH transmission.

8. The UE of claim 6, wherein the processor and the memory are further configured to:
   transmit the SB-CSI report to the base station when the NACK transmission is transmitted to the base station, or
   abstain from transmitting the SB-CSI report when the ACK transmission is transmitted to the base station.

9. The UE of claim 6, wherein, the processor and the memory are further configured to:
   determine whether to include with the SB-CSI report:
      SB reporting with full channel quality information (CQI) value resolution, wherein the SB reporting with full QCI value resolution indicates one or more QCI values each associated with a sub-band of a plurality of sub-bands utilized by the PDSCH transmission, or
      SB reporting without full QCI value resolution, wherein the SB reporting without full QCI value resolution indicates one or more spatial differential CQI values each associated with a respective offset level, and wherein each offset level includes a difference between a CQI value associated with a sub-band of the plurality of sub-bands utilized by the PDSCH transmission and an average CQI value associated with the plurality of sub-bands utilized by the PDSCH transmission.

10. A method for wireless communication by a network entity, comprising:
   transmitting downlink control information (DCI) associated with a physical downlink shared channel (PDSCH) transmission, wherein the DCI indicates a first modulation coding scheme (MCS) value associated with the PDSCH transmission;
   transmitting the PDSCH transmission to a user equipment (UE);
   receiving either an acknowledgement (ACK) transmission or a negative acknowledgement (NACK) transmission from the UE, based on a threshold difference between the first MCS value and a second measured MCS value associated with the PDSCH transmission, in response to the transmission of the PDSCH transmission, the ACK transmission or the NACK transmission comprising an indication specifying a type of a sub-band (SB) channel state information (SB-CSI) report to be sent to the network entity; and
   receiving the SB-CSI report from the UE based on the indication specifying the type of the SB-CSI report.

11. The method of claim 10, wherein receiving either the ACK transmission or the NACK transmission from the UE in response to the transmission of the PDSCH transmission comprises:
   receiving either the ACK transmission or the NACK transmission from the UE based on an ability of the UE to decode the PDSCH transmission.

12. The method of claim 10, wherein receiving the SB-CSI report comprises:
   receiving the SB-CSI report from the UE when the ACK transmission is received from the UE, and
   receiving the SB-CSI report from the UE when the NACK transmission is received from the UE.

13. The method of claim 10, wherein the SB-CSI report comprises one of:
   SB reporting with full channel quality information (CQI) value resolution, wherein the SB reporting with full CQI value resolution indicates one or more CQI values each associated with a sub-band of a plurality of sub-bands utilized by the PDSCH transmission; or
   SB reporting without full CQI value resolution, wherein the SB reporting without full CQI value resolution indicates one or more spatial differential CQI values each associated with a respective offset level, and wherein each offset level includes a difference between a CQI value associated with a sub-band of the plurality of sub-bands utilized by the PDSCH transmission and an average CQI value associated with the plurality of sub-bands utilized by the PDSCH transmission.

14. A base station for wireless communication in a wireless communication network, comprising:
   a wireless transceiver;
   a memory; and
   a processor communicatively coupled to the wireless transceiver and the memory, wherein the processor and the memory are configured to:
      transmit downlink control information (DCI) associated with a physical downlink shared channel (PDSCH) transmission, wherein the DCI indicates a first modulation coding scheme (MCS) value associated with the PDSCH transmission,
      transmit the PDSCH transmission to a user equipment (UE),
      receive either an acknowledgement (ACK) transmission or a negative acknowledgement (NACK) transmission from the UE, based on a threshold difference between the first MCS value and a second measured MCS value associated with the PDSCH transmission, in response to the transmission of the PDSCH transmission, the ACK transmission or the NACK transmission comprising an indication specifying a type of a sub-band (SB) channel state information (SB-CSI) report to be sent to the base station, and
      receive the SB-CSI report from the UE based on the indication specifying the type of the SB-CSI report.

15. The base station of claim 14, wherein the processor and the memory are further configured to:
   receive either the ACK transmission or the NACK transmission from the UE based on an ability of the UE to decode the PDSCH transmission.

16. The base station of claim 14, wherein the processor and the memory are further configured to:
   receive the SB-CSI report from the UE when the ACK transmission is received from the UE, and
   receive the SB-CSI report from the UE when the NACK transmission is received from the UE.

17. The base station of claim 14, wherein the SB-CSI report comprises one of:
   SB reporting with full channel quality information (CQI) value resolution, wherein the SB reporting with full CQI value resolution indicates one or more CQI values each associated with a sub-band of a plurality of sub-bands utilized by the PDSCH transmission; or
   SB reporting without full CQI value resolution, wherein the SB reporting without full CQI value resolution indicates one or more spatial differential CQI values each associated with a respective offset level, and wherein each offset level includes a difference between a CQI value associated with a sub-band of the plurality of sub-bands utilized by the PDSCH transmission and an average CQI value associated with the plurality of sub-bands utilized by the PDSCH transmission.

18. The method of claim 1, wherein the indication specifies that the SB-CSI report includes one of:

full resolution channel state information (CSI) values for each sub-band associated with the PDSCH transmission; or for each sub-band associated with the PDSCH transmission, a respective differential CSI value associated with a corresponding CSI offset level.

19. The method of claim 1, wherein the indication specifies that the SB-CSI report includes one of:

full resolution channel state information (CSI) values for each sub-band associated with the PDSCH transmission;

for each sub-band associated with the PDSCH transmission, a respective differential CSI value associated with a corresponding CSI offset level; or CSI according to a configured SB-CSI report.

20. The method of claim 1, wherein the indication specifies that the SB-CSI report includes a respective rank indication for each sub-band associated with the PDSCH transmission.

* * * * *